US011113540B2

(12) United States Patent
Funaki et al.

(10) Patent No.: US 11,113,540 B2
(45) Date of Patent: Sep. 7, 2021

(54) VEHICLE MONITORING SYSTEM AND VEHICLE MONITORING METHOD

(71) Applicant: PANASONIC I-PRO SENSING SOLUTIONS CO., LTD., Fukuoka (JP)

(72) Inventors: Toshimasa Funaki, Saga (JP); Michinori Kishimoto, Fukuoka (JP); Hiroaki Jodan, Fukuoka (JP); Toshiyuki Sano, Fukuoka (JP); Masahiro Yamashita, Fukuoka (JP); Yuma Kobayashi, Fukuoka (JP); Yuji Arima, Fukuoka (JP); Hideaki Takahashi, Fukuoka (JP)

(73) Assignee: PANASONIC I-PRO SENSING SOLUTIONS CO., LTD., Fukuoka (JP)

( * ) Notice: Subject to any disclaimer, the term of this patent is extended or adjusted under 35 U.S.C. 154(b) by 0 days.

(21) Appl. No.: 16/875,412

(22) Filed: May 15, 2020

(65) Prior Publication Data

US 2020/0372257 A1    Nov. 26, 2020

(30) Foreign Application Priority Data

May 20, 2019  (JP) .............................. JP2019-094824

(51) Int. Cl.
*H04N 5/232* (2006.01)
*G06K 9/00* (2006.01)
(Continued)

(52) U.S. Cl.
CPC ..... *G06K 9/00771* (2013.01); *G06K 9/00255* (2013.01); *H04N 5/2351* (2013.01);
(Continued)

(58) Field of Classification Search
CPC .................................................. G06K 9/00771
(Continued)

(56) References Cited

U.S. PATENT DOCUMENTS 8,077,995 B1 * 12/2011 Terre ..................... G06T 5/009
382/254
2002/0186297 A1 * 12/2002 Bakewell ............. G08G 1/0175
348/118
(Continued)

FOREIGN PATENT DOCUMENTS

JP          2007-174016         7/2007

*Primary Examiner* — Amir Shahnami
(74) *Attorney, Agent, or Firm* — Greenblum & Bernstein, P.L.C.

(57) ABSTRACT

A vehicle monitoring system includes at least one camera, and a server that is communicably connected to a client terminal. The camera performs capturing a vehicle while switching a first capturing condition including an image parameter for capturing a number of the vehicle entering an angle of view of the camera and a second capturing condition including an image parameter for capturing an occupant's face of the vehicle, and transmits a first captured video under the first capturing condition and a second captured video under the second capturing condition to the server. The server arranges reproduction screens for the first captured video and the second captured video that are reproduceable in the client terminal and displays the reproduction screens on the client terminal based on the first captured video and the second captured video.

8 Claims, 32 Drawing Sheets

(51) Int. Cl.
*H04N 7/18* (2006.01)
*H04N 5/235* (2006.01)

(52) U.S. Cl.
CPC ....... *H04N 5/2353* (2013.01); *H04N 5/23209* (2013.01); *H04N 5/23245* (2013.01); *H04N 7/181* (2013.01); *G06K 2209/15* (2013.01); *G06K 2209/23* (2013.01)

(58) Field of Classification Search
USPC ........................................................ 348/143
See application file for complete search history.

(56) References Cited

U.S. PATENT DOCUMENTS

| | | | | |
|---|---|---|---|---|
| 2012/0002045 A1* | 1/2012 | Tony | ................... | G06K 9/209 348/143 |
| 2015/0286883 A1* | 10/2015 | Xu | ................... | G06K 9/6202 382/103 |
| 2020/0234067 A1* | 7/2020 | Hayashi | ............. | H04N 5/23267 |

\* cited by examiner

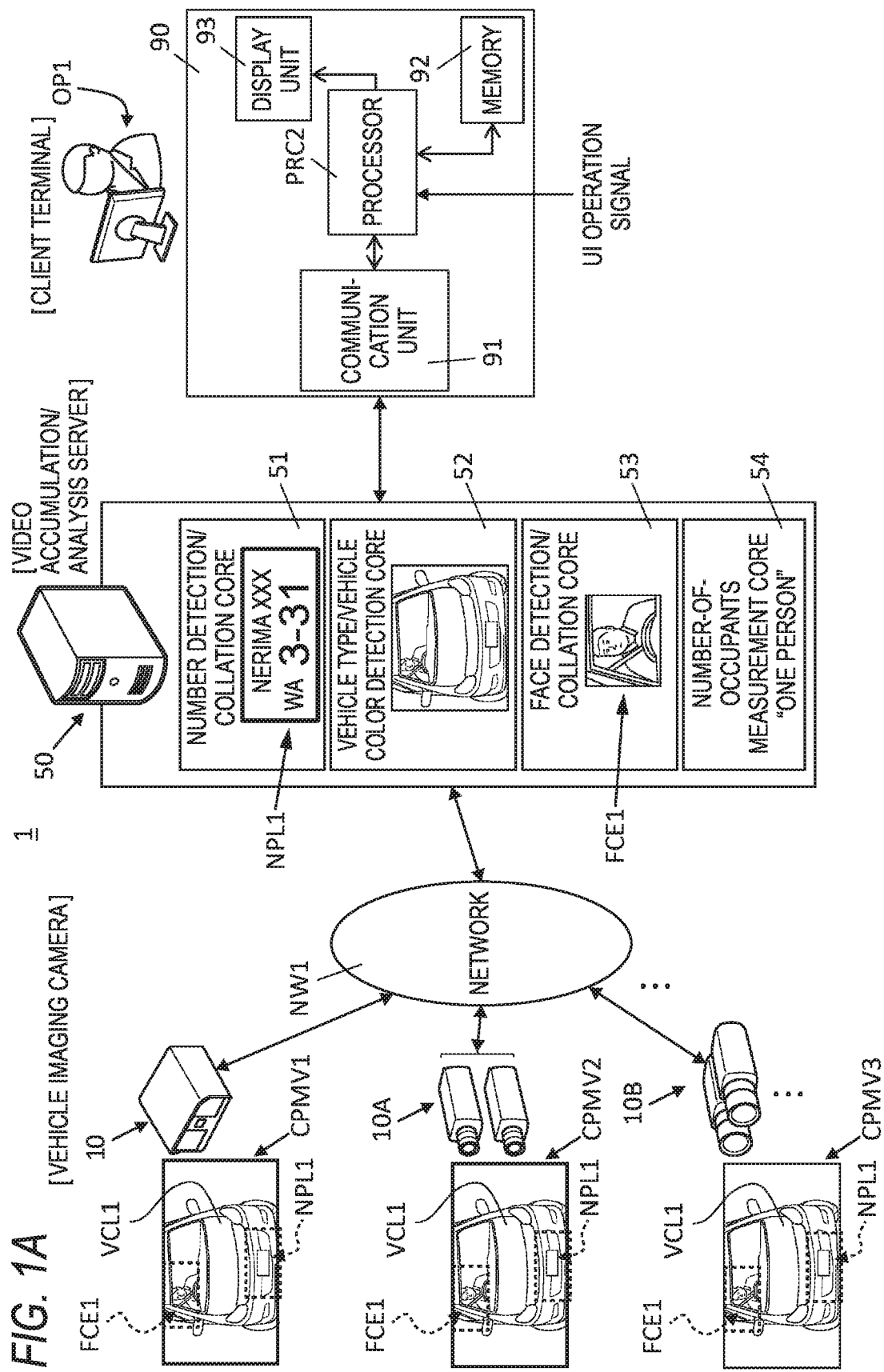

FIG. 3D

|  | DAYTIME MODE | NIGHTTIME MODE |
|---|---|---|
| FRONT FILTER SWITCHING MODULE | POLARIZATION FILTER | BAND-PASS FILTER |
| IN-LENS FILTER SWITCHING MODULE | IR-CUT FILTER | PLAIN GLASS |
| NIGHTTIME SHORT-WAVELENGTH LIGHTING (LED) | TURN OFF | TURN ON |

TBL1

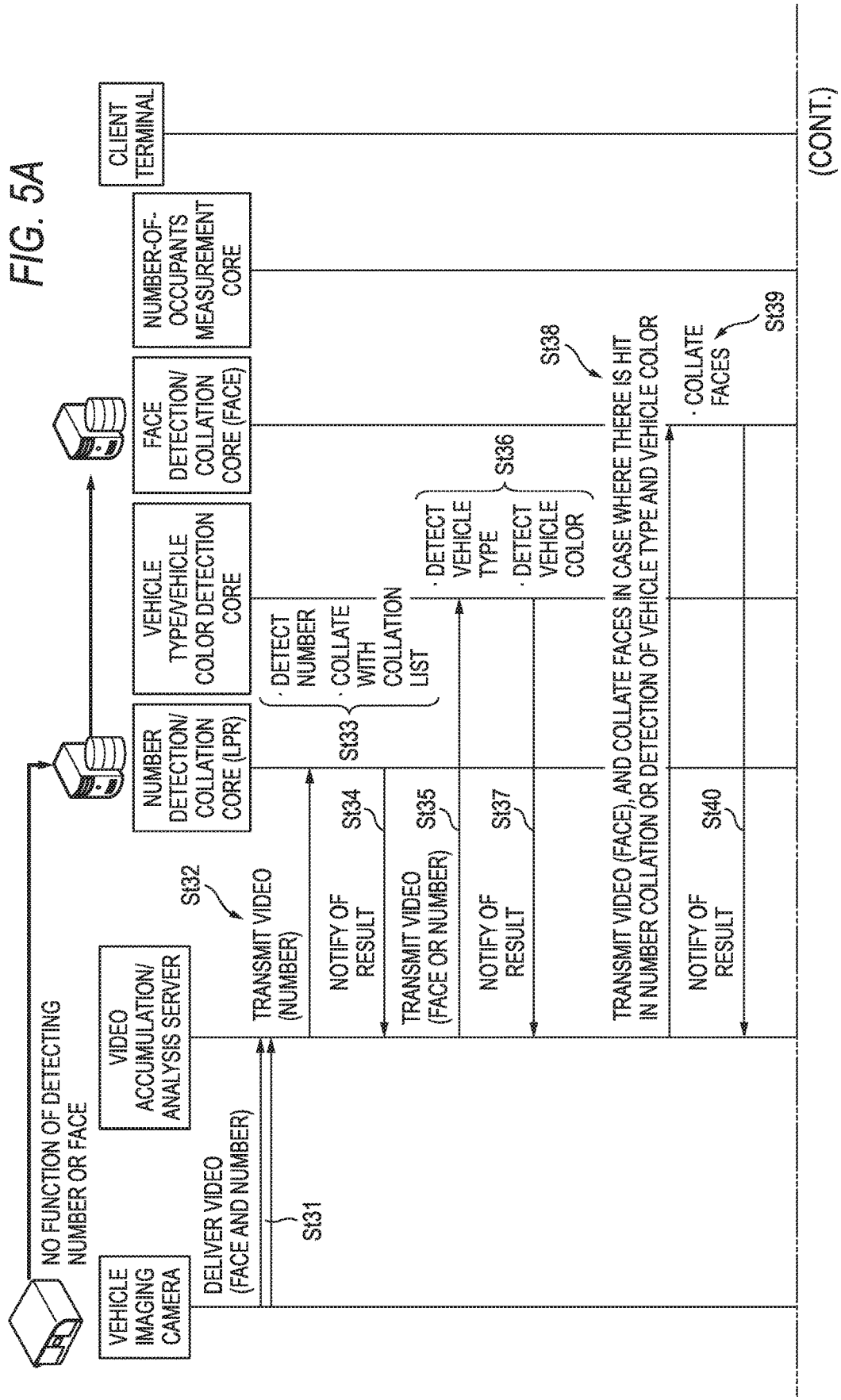

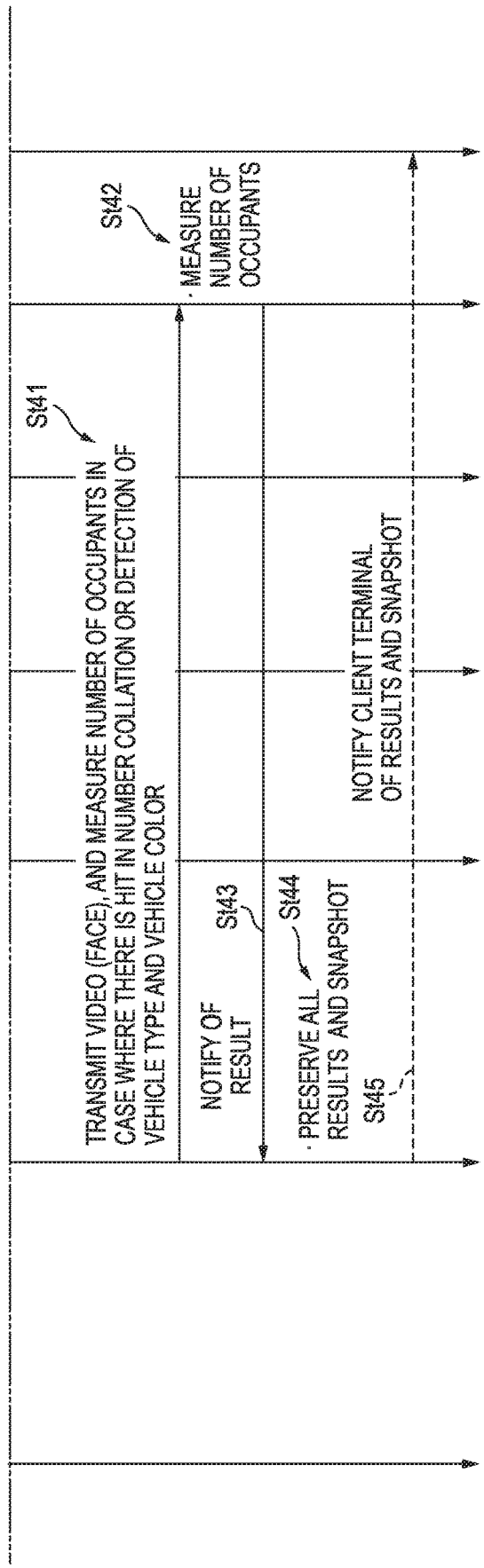

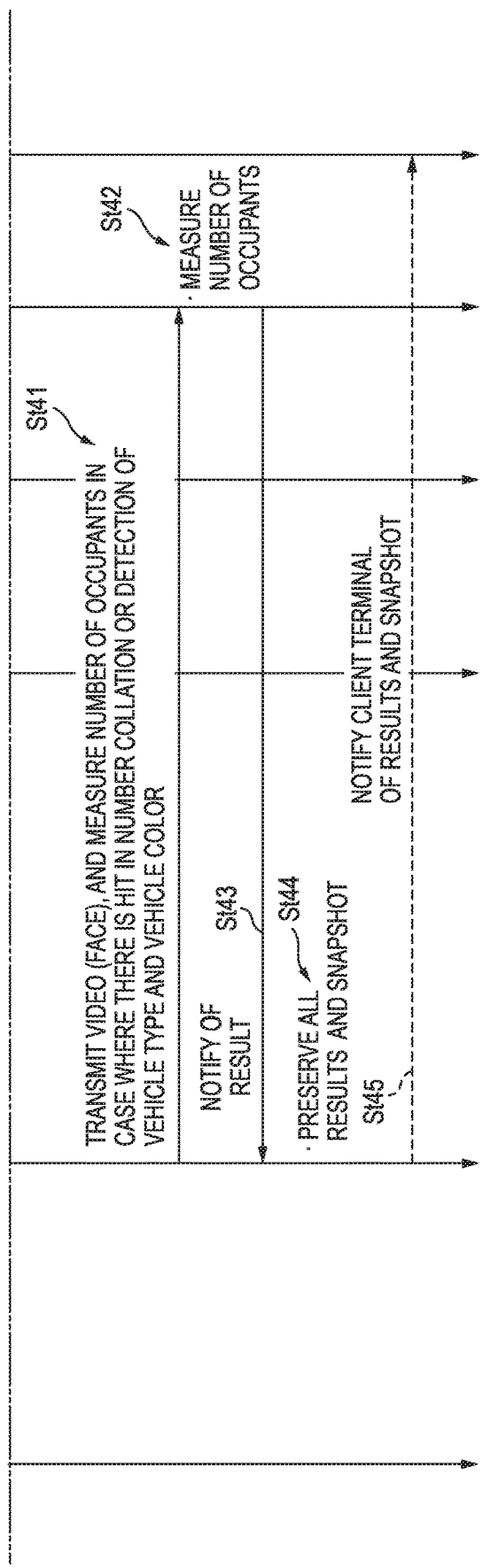

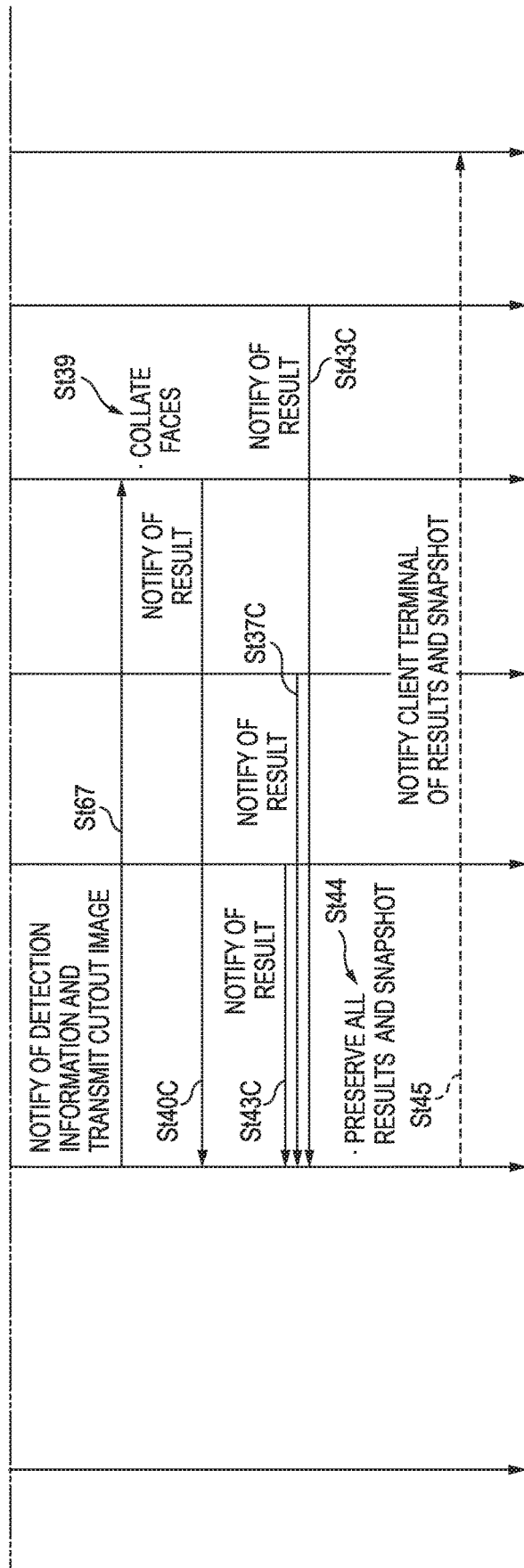

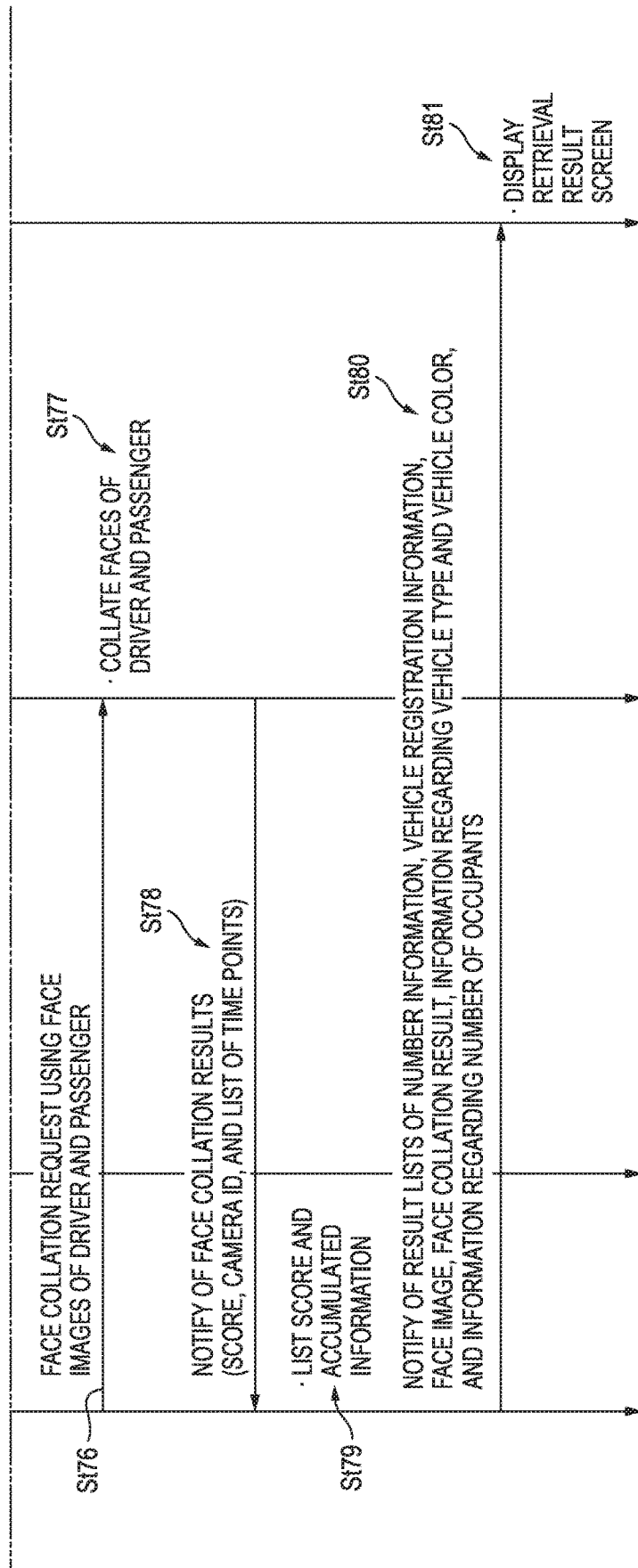

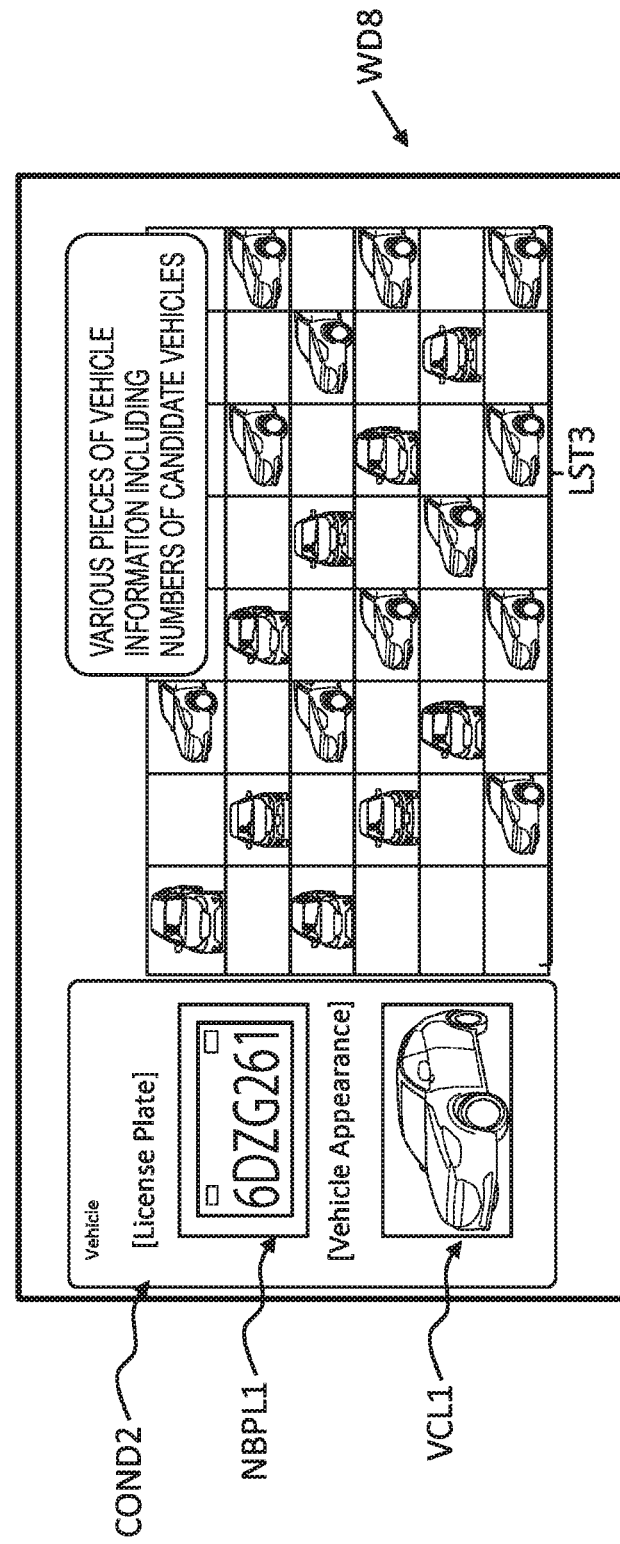

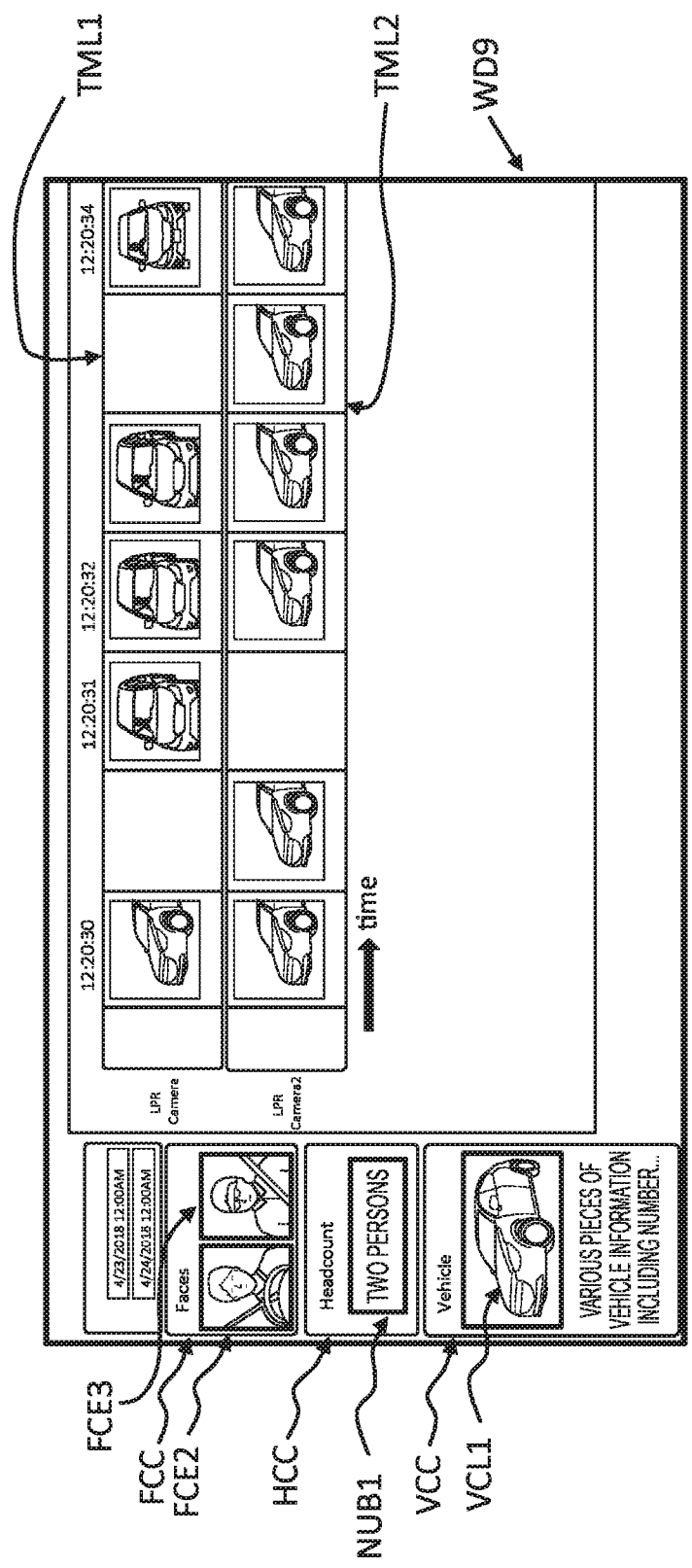

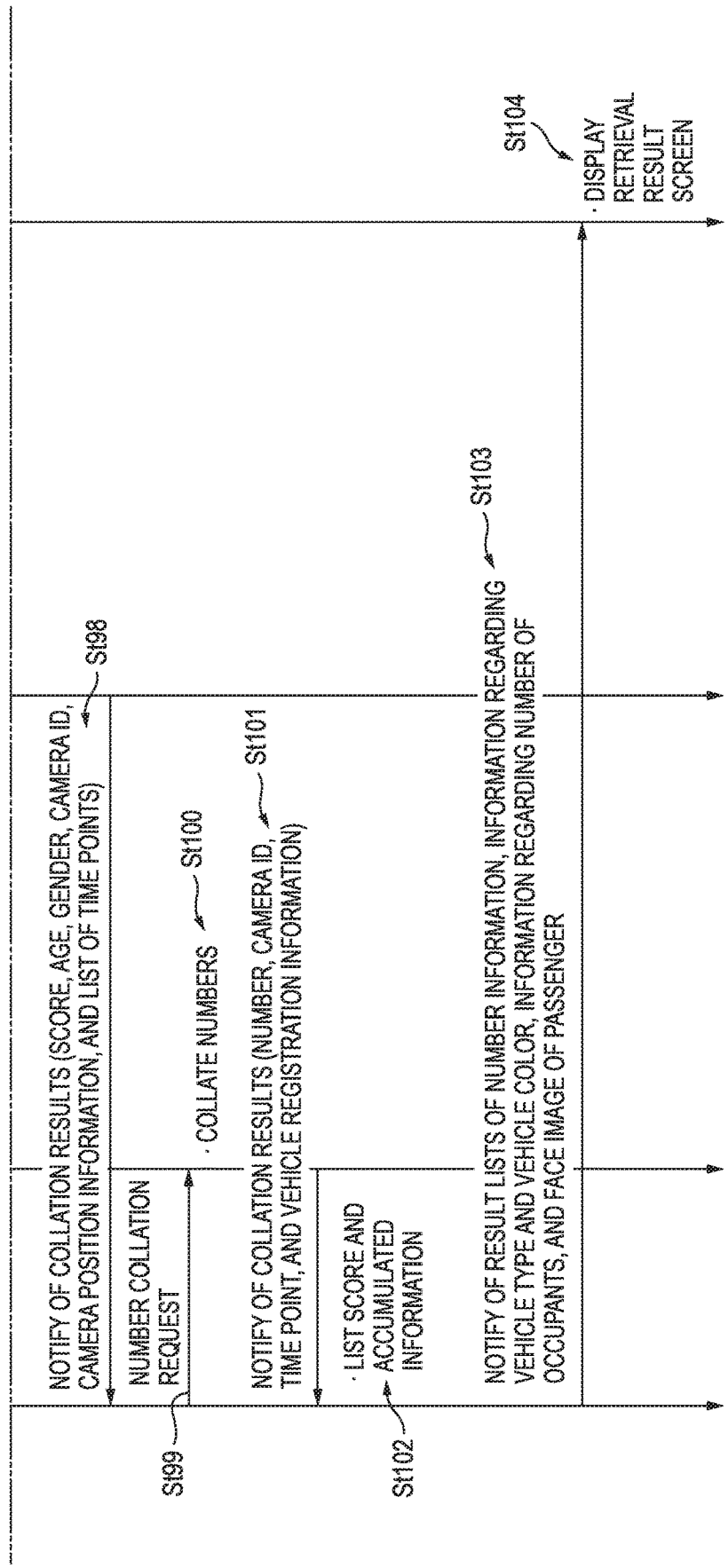

VEHICLE MONITORING SYSTEM AND VEHICLE MONITORING METHOD

BACKGROUND OF THE INVENTION

1. Field of the Invention

The present disclosure relates to a vehicle monitoring system and a vehicle monitoring method capable of imaging and monitoring a vehicle as a subject.

2. Background Art

There is a technique in which a plurality of cameras are disposed at a predetermined location on a traveling path of a vehicle, and camera image information captured by each camera is displayed on a display device of a terminal apparatus mounted on the vehicle via a network and a wireless information exchanging apparatus (for example, refer to JP-A-2007-174016). According to JP-A-2007-174016, a user can obtain real-time camera images with a large information amount on the basis of the camera image information captured by the plurality of cameras disposed on the traveling path of the vehicle.

SUMMARY OF THE INVENTION

In JP-A-2007-174016, in a case where a vehicle as a subject is imaged to be used for monitoring, it is not taken into consideration that the vehicle is imaged while switching different imaging conditions such that a monitoring person (for example, a police officer) can recognize unique features (for example, a face of an in-vehicle occupant such as a driver driving the vehicle and a number plate of the vehicle) of the traveling vehicle, and captured moving images are displayed in a contrasted manner. For example, in a case where a case or the like occurs, a suspect who has caused the case or the like may ride on a vehicle and escape, and thus it is necessary to identify a face of an occupant and a number plate of a runaway vehicle in an early stage in police investigation. However, even though the technique in JP-A-2007-174016 is used, when an investigator (for example, a police officer) checks a captured video of each camera one by one, there is a problem in that the investigation takes time, which is not efficient, and it is difficult to detect a suspect early.

The present disclosure has been made in light of the circumstances of the related art, and is directed to providing a vehicle monitoring system and a vehicle monitoring method capable of assisting a police officer in identifying unique features of a runaway vehicle on which a suspect having caused a case or the like is riding in an early stage and visually, and thus improving convenience of police investigation.

According to the present disclosure, there is provided a vehicle monitoring system including at least one camera; and a server that is communicably connected to a client terminal, in which the camera performs capturing a vehicle while switching a first capturing condition including an image parameter for capturing a number of the vehicle entering an angle of view of the camera and a second capturing condition including an image parameter for capturing an occupant's face of the vehicle, and transmits, to the server, a first captured video under the first capturing condition and a second captured video under the second capturing condition, and in which the server arranges reproduction screens for the first captured video and the second captured video that are reproduceable in the client terminal and displays the reproduction screens on the client terminal based on the first captured video and the second captured video.

According to the present disclosure, there is provided a vehicle monitoring method performed by a vehicle monitoring system including at least one camera, and a server that is communicably connected to a client terminal, the vehicle monitoring method including by the camera, performing capturing a vehicle while switching a first capturing condition including an image parameter for capturing a number of the vehicle entering an angle of view of the camera and a second capturing condition including an image parameter for capturing an occupant's face of the vehicle, and transmit, to the server, a first captured video under the first capturing condition and a second captured video under the second capturing condition; and by the server, arranging reproduction screens for the first captured video and the second captured video that are reproduceable in the client terminal and display the reproduction screens on the client terminal based on the first captured video and the second captured video.

According to the present disclosure, it is possible to identify unique features of a runaway vehicle on which a suspect having caused a case or the like is riding with high efficiency and thus to improve convenience of police investigation.

BRIEF DESCRIPTION OF THE DRAWINGS

FIG. 1A is a diagram illustrating a first example of a system configuration of a vehicle monitoring system according to Embodiment 1.

FIG. 3D is a table illustrating various operation control examples in each of a daytime mode and a nighttime mode.

FIG. 5A is a sequence diagram illustrating a first example of an operation procedure regarding video analysis in the vehicle monitoring system.

FIG. 16A is a diagram illustrating a second example of a retrieval result screen displayed subsequently to the retrieval result screen in FIG. 14.

FIG. 16B is a diagram illustrating a third example of a retrieval result screen displayed subsequently to the retrieval result screen in FIG. 14.

Figure 1B:
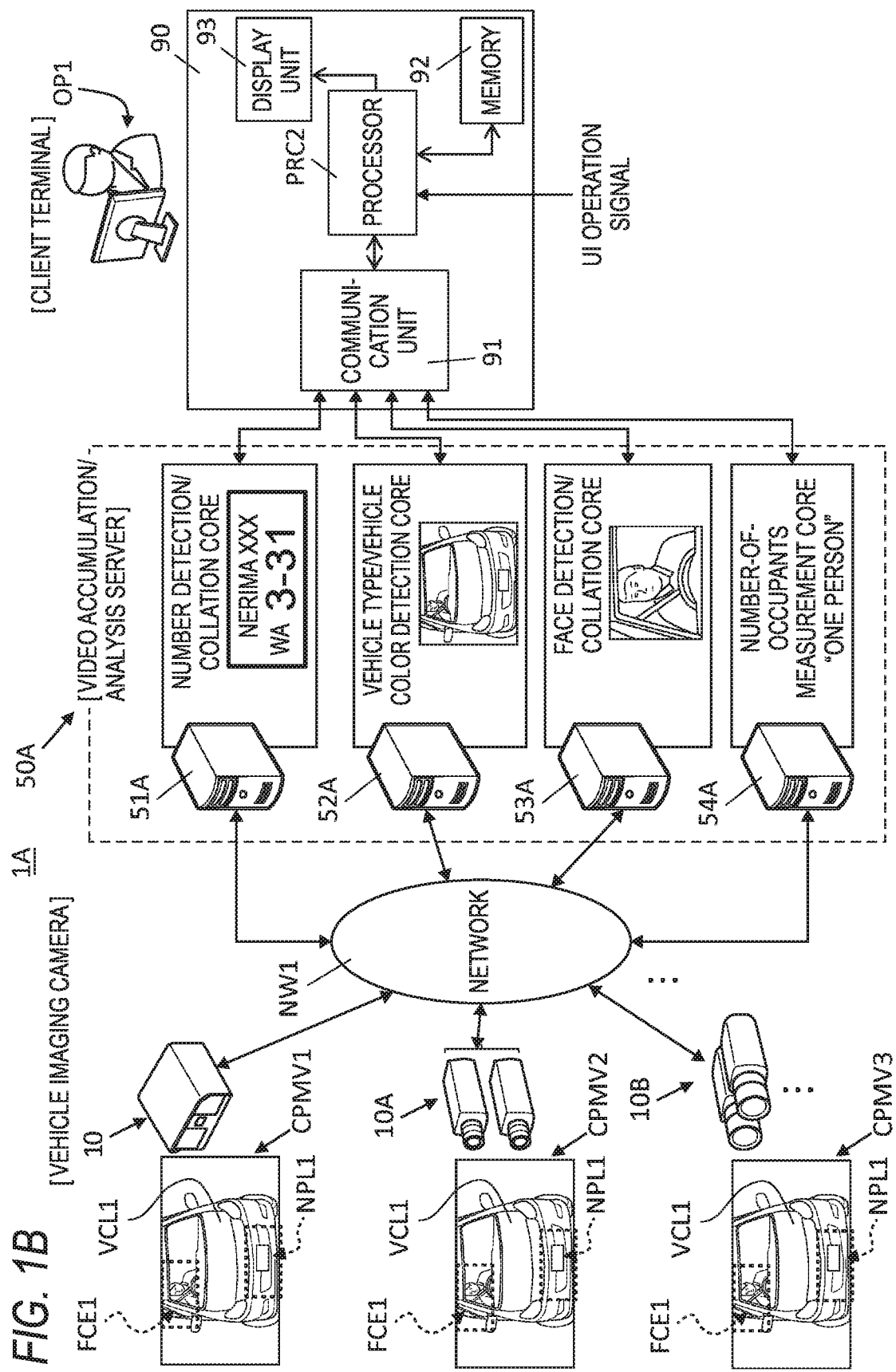
FIG. 1B is a diagram illustrating a second example of a system configuration of a vehicle monitoring system according to Embodiment 1.

DETAILED DESCRIPTION OF THE EXEMPLARY EMBODIMENT (Details Leading to Present Disclosure)

In JP-A-2007-174016, since camera image information captured by each of a plurality of cameras is displayed on the display device of the terminal apparatus mounted on the vehicle, a user (for example, a driver) can check the camera image information in real time at a location where each camera is disposed. However, in JP-A-2007-174016, it is not taken into consideration that, in a case where a vehicle as a subject is imaged to be used for monitoring, an image captured by the camera is subjected to image processing such that unique features (for example, a face of an in-vehicle occupant such as a driver driving the vehicle and a number plate of the vehicle) of the traveling vehicle can be specifically identified. For example, in a case where a case or the like occurs, a suspect who has caused the case or the like may ride a vehicle and escape, it is necessary to efficiently narrow a runaway vehicle in police investigation. However, even though the technique in JP-A-2007-174016 is used, when an investigator (for example, a police officer) checks a captured video of each camera one by one, there is a problem in that the investigation takes time, which is not efficient, and it is difficult to detect a suspect early.

Therefore, in the following embodiment, a description will be made of a vehicle monitoring system and a vehicle monitoring method capable of efficiently identify unique features of a runaway vehicle on which a suspect having caused a case or the like is riding and thus improving convenience of police investigation.

Meanwhile, in JP-A-2007-174016, in a case where a vehicle as a subject is imaged to be used for monitoring, it is not taken into consideration that the vehicle is imaged while switching different imaging conditions such that a monitoring person (for example, a police officer) can recognize unique features (for example, a face of an in-vehicle occupant such as a driver driving the vehicle and a number plate of the vehicle) of the traveling vehicle, and captured moving images are displayed in a contrasted manner. For example, in a case where a case or the like occurs, a suspect who has caused the case or the like may ride on a vehicle and escape, and thus it is necessary to identify a face of an occupant and a number plate of a runaway vehicle in an early stage in police investigation. However, even though the technique in JP-A-2007-174016 is used, when an investigator (for example, a police officer) checks a captured video of each camera one by one, there is a problem in that the investigation takes time, which is not efficient, and it is difficult to detect a suspect early.

Therefore, in the following embodiment, a description will be made of a vehicle monitoring system and a vehicle monitoring method capable of assisting a police officer in identifying unique features of a runaway vehicle on which a suspect having caused a case or the like is riding in an early stage and visually, and thus improving convenience of police investigation.

(Vehicle Monitoring System According to Present Disclosure)

Hereinafter, with reference to the accompanying drawings as appropriate, an embodiment in which a vehicle monitoring system and a vehicle monitoring method according to the present disclosure are specifically disclosed will be described in detail. However, a detailed description more than necessary may be omitted. For example, a detailed description of a well-known content or a repeated description of the substantially same configuration will be omitted. This is to prevent the following description from being unnecessarily redundant and to facilitate understanding of a person skilled in the art. The accompanying drawings and the following description are provided to enable a person skilled in the art to fully understand the present disclosure and are not intended to limit the subject matter disclosed in the claims.

Embodiment 1

FIG. 1A is a diagram illustrating a first example of a system configuration of a vehicle monitoring system 1 according to Embodiment 1. FIG. 1B is a diagram illustrating a second example of a system configuration of a vehicle monitoring system 1A according to Embodiment 1. In description of the vehicle monitoring system 1A in FIG. 1B, the same constituent element as that of the vehicle monitoring system 1 in FIG. 1A will be given the same reference numeral, description thereof will be simplified or omitted, and different contents will be described.

The vehicle monitoring system 1 is configured to include a plurality of vehicle imaging cameras 10, 10A, 10B, ..., and a video accumulation/analysis server 50. The vehicle monitoring system 1 may be configured to further include a client terminal 90. The vehicle imaging cameras 10, 10A, 10B, ..., and the video accumulation/analysis server 50 are communicably connected to each other via a network NW1 such as a communication line of an intranet. The network NW1 is configured with a wired communication line (for example, an optical communication network using optical fibers), but may be configured with a wireless communication network. The video accumulation/analysis server 50 may be built as an on-premise server in a police station, and may be provided as a cloud server connected to a network such as the Internet.

Each of the video accumulation/analysis server 50 and the client terminal 90 is illustrated alone, but each thereof may be provided in a plurality. The vehicle monitoring system 1 may not be used for only a single police station, and may be applied to an example of cooperative investigation among a plurality of police stations.

Each of the vehicle imaging cameras 10, 10A, 10B, ... as an example of a camera is provided in a stationary manner on a pole (not illustrated) erected from a corner of an intersection for each intersection, has a predetermined angle of view, and images a vehicle VCL1 (an example of a subject) entering the intersection. Therefore, intersections where the respective vehicle imaging cameras 10, 10A, 10B, ... are provided are different from each other. The respective vehicle imaging cameras may be provided not at all intersections but at some intersections, or may be provided at a location (a major arterial road such as a national road or a prefectural road) other than an intersection. Each of the vehicle imaging cameras 10, 10A, 10B, ... sends a captured video to the video accumulation/analysis server 50 via the network NW1. In the following description, the captured video includes not only captured video data but also information regarding a camera identification (ID) (in other words, position information of the intersection where the camera is provided) of the camera having generated the captured video and the imaging date and time. Each of the vehicle imaging cameras 10, 10A, 10B, ... performs imaging while switching a first imaging condition including an image parameter (which will be described later) appropriate for imaging a number plate NPL1 of the vehicle VCL1 and a second imaging condition including an image parameter (which will be described later) appropriate for imaging a face FCE1 of an occupant of the vehicle VCL1.

Internal configurations of the vehicle imaging cameras 10, 10A, 10B, ... may be the same as each other except a configuration of a lens block 17 (refer to FIG. 2) or a configuration of a camera casing. For example, the vehicle imaging camera 10 has a monocular lens configuration, and generates two video streams such as a captured video (an example of a first captured video) appropriate for imaging a number plate and a captured video (an example of a second captured video) appropriate for imaging a face of an occupant. The vehicle imaging camera 10A is configured with two cameras each having a monocular camera, and each camera generates a captured video (an example of a first captured video) appropriate for imaging a number plate and a captured video (an example of a second captured video) appropriate for imaging a face of an occupant. The vehicle imaging camera 10B has a binocular lens configuration, and generates a captured video (an example of a first captured video) appropriate for imaging a number plate and a captured video (an example of a second captured video) appropriate for imaging a face of an occupant. Thus, in the following description, a configuration of the vehicle imaging camera 10 will be described as an example.

Figure 4:
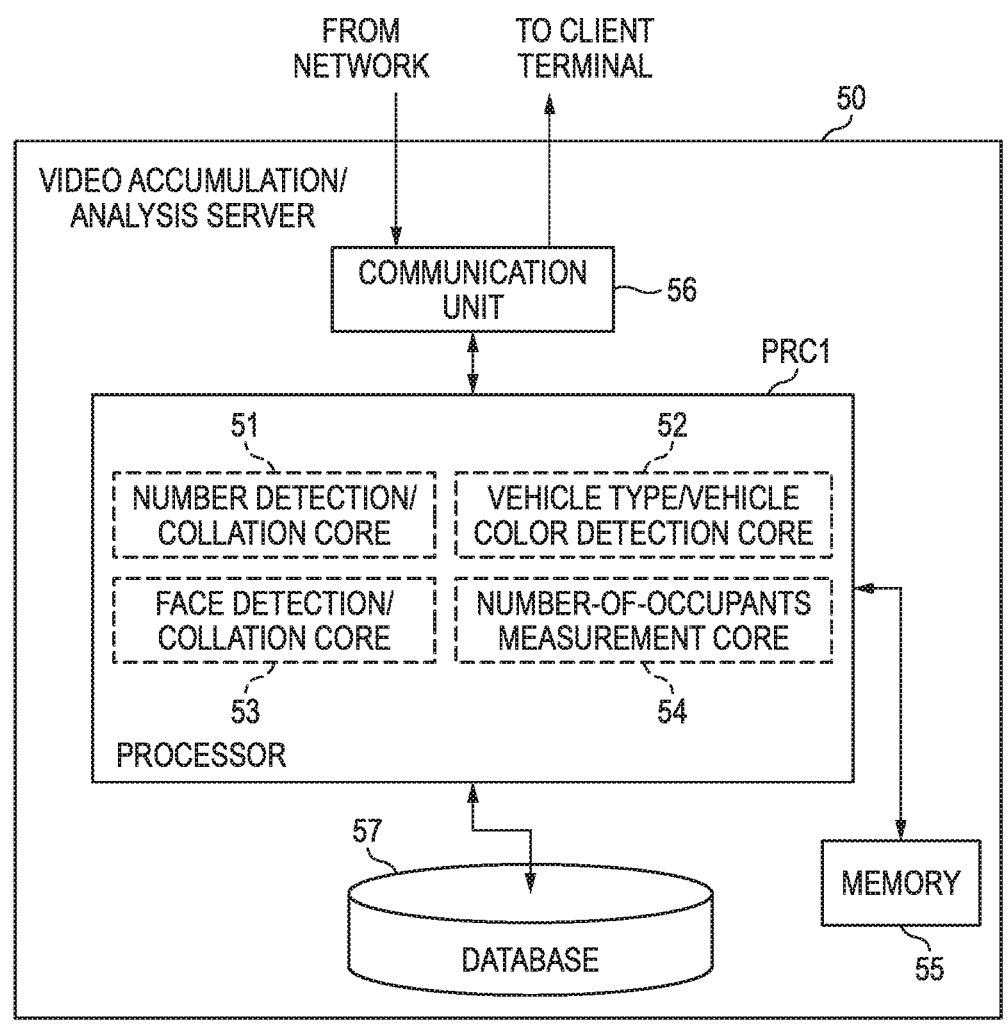
FIG. 4 is a block diagram illustrating a hardware configuration example of a video accumulation/analysis server in detail.

The video accumulation/analysis server 50 as an example of a server is provided in a police station, and is configured to include, for example, at least a number detection/collation core 51, a vehicle type/vehicle color detection core 52, a face detection/collation core 53, and a number-of-occupants measurement core 54 (refer to FIG. 4). The video accumulation/analysis server 50 receives and accumulates captured videos sent from the respective vehicle imaging cameras 10, 10A, 10B, ... provided at installation locations (for example, intersections) in a jurisdiction area of the police station, and executes an analysis process (for example, refer to FIGS. 5A, 5B, 5C, and 5D) which will be described later. The video accumulation/analysis server 50 provided in the police station and the client terminal 90 are communicably connected to each other via a network (not illustrated) such as an intranet in the police station.

The number detection/collation core 51 is, for example, a processing unit realized by a processor (which will be described later) configuring the video accumulation/analysis server 50. The number detection/collation core 51 performs a process of detecting a number plate of a vehicle reflected in captured videos sent from the respective vehicle imaging cameras 10, 10A, 10B, ..., or performs a process of collating numbers with each other by using a number collation list (not illustrated) preserved in the video accumulation/analysis server 50, at a predetermined timing (for example, refer to FIGS. 5A to 5D). The number detection/collation core 51 stores a processing result of the detection process or the collation process in a database 57 (refer to FIG. 4). The processing result may include, for example, not only a number detection result or a number collation result but also the imaging date and time for a captured video that is a target of the detection process or the collation process and a camera ID.

The vehicle type/vehicle color detection core 52 is, for example, a processing unit realized by a processor (which will be described later) configuring the video accumulation/analysis server 50. The vehicle type/vehicle color detection core 52 performs a process (analysis process) of detecting a vehicle type (for example, a sedan, a wagon, a bus, or a truck) and a vehicle color (for example, red, blue, white, or black) of a vehicle reflected in captured videos sent from the respective vehicle imaging cameras 10, 10A, 10B, ... at a predetermined timing (for example, refer to FIGS. 5A to 5D). The vehicle type/vehicle color detection core 52 stores a processing result (analysis result) of the detection process in the database 57 (refer to FIG. 4). The processing result may include, for example, not only analysis results of a vehicle type and a vehicle color but also the imaging date and time for a captured video that is a target of the detection process or the collation process and a camera ID.

The face detection/collation core 53 is, for example, a processing unit realized by a processor (which will be described later) configuring the video accumulation/analysis server 50. The face detection/collation core 53 performs a process of detecting a face (for example, a driver on a driver seat or a passenger on a passenger seat) of an in-vehicle occupant of a vehicle reflected in captured videos sent from the respective vehicle imaging cameras 10, 10A, 10B, ..., or performs a process of collating faces with each other by using a face collation list (for example, a blacklist in which face images of ex-convicts are registered; not illustrated) preserved in the video accumulation/analysis server 50, at a predetermined timing (for example, refer to FIGS. 5A to 5D). The face detection/collation core 53 stores a processing result of the detection process or the collation process in a database 57 (refer to FIG. 4). The processing result may include, for example, not only a face detection result or a face collation result but also the imaging date and time for a captured video that is a target of the detection process or the collation process and a camera ID.

The number-of-occupants measurement core 54 is, for example, a processing unit realized by a processor (which will be described later) configuring the video accumulation/analysis server 50. The number-of-occupants measurement core 54 performs a process (analysis process) of measuring the number of in-vehicle occupants of a vehicle reflected in captured videos sent from the respective vehicle imaging cameras 10, 10A, 10B, . . . at a predetermined timing (for example, refer to FIGS. 5A to 5D). The number-of-occupants measurement core 54 stores a processing result (analysis result) of the measurement process in the database 57 (refer to FIG. 4). The processing result may include, for example, not only analysis results of the number of occupants but also the imaging date and time for a captured video that is a target of the detection process or the collation process and a camera ID.

The client terminal 90, which is provided in the police station, is used by an operator OP1 (a police officer in the station) in the police station, and is configured by using a laptop or desktop personal computer (PC). For example, in a case where a case or the like occurs, the operator OP1 listens to various pieces of witness information regarding the case through an incoming call from a reporter (for example, a witness) who has reported the occurrence of the case or the like to the police station, and operates the client terminal 90 to input and record data. The client terminal 90 is not limited to the PC, and may be a computer having a communication function, such as a smartphone or a tablet terminal. The client terminal 90 sends, for example, a retrieval request for causing the video accumulation/analysis server 50 to retrieve (for example, refer to FIG. 13 or 17) a vehicle (that is, a runaway vehicle on which a suspect of the case or the like is riding) matching witness information to the video accumulation/analysis server 50, and receives a retrieval result and displays the retrieval result on a display unit 93.

The client terminal 90 is configured to include a communication unit 91, a memory 92, the display unit 93, and a processor PRC2. Although not illustrated in FIGS. 1A and 1B, an operation unit (for example, a mouse or a keyboard) receiving an operation from the operator OP1 may be connected to the client terminal 90. A user interface (UI) operation signal from the operation unit is input to the processor PRC2 of the client terminal 90 due to an operation of the operator OP1. For example, in a case where the operator OP1 listens to the date and time and a location where a case or the like occurred, and a number through an incoming call from a witness, a UI operation signal for designating the date and time, the location, and the number as retrieval conditions is input to the client terminal 90 on the basis of an operation of the operator OP1.

The communication unit 91 performs wired or wireless communication with the video accumulation/analysis server 50 connected thereto via a network such as an intranet.

The memory 92 is configured by using, for example, a random access memory (RAM) and a read only memory (ROM), and temporarily stores a program required to execute an operation of the client terminal 90, and data or information generated during an operation thereof. The RAM is, for example, a work memory used during an operation of the processor PRC2. The ROM stores in advance, for example, a program for controlling the processor PRC2. The memory 92 may include, for example, a hard disk drive or a solid state drive. The memory 92 records road map data indicating positions where the respective vehicle imaging cameras 10, 10A, 10B, . . . are provided, and records updated road map data, for example, in a case where the road map data is updated due to construction of a new road or road maintenance work.

The display unit 93 is configured by using a display device such as a liquid crystal display (LCD) or an organic electroluminescence (EL) display, and displays various pieces of data sent from the processor PRC2.

The processor PRC2 is configured by using, for example, a central processing unit (CPU), a digital signal processor (DSP), or a field programmable gate array (FPGA), and functions as a control unit of the client terminal 90, and performs a control process for integrally controlling operations of the respective units of the client terminal 90, and data input and output processes, a data calculation process, and a data storage process with the respective units of the client terminal 90. The processor PRC2 operates according to the program stored in the memory 92. The processor PRC2 displays a retrieval result (for example, refer to FIGS. 7, 8, 9, 10, 11, 12, 14, 15, 16A, and 16B) sent from the video accumulation/analysis server 50 or captured video data on the display unit 93 by using the memory 92 during an operation thereof. The processor PRC2 generates a retrieval request including a retrieval condition corresponding to a UI operation signal, and sends the retrieval request to the video accumulation/analysis server 50 via the communication unit 91.

The processor PRC2 reads and executes the program stored in the memory 92, and thus functionally realizes a reproduction unit (not illustrated) and a retrieval unit (not illustrated). The reproduction unit (not illustrated) outputs captured video data sent from the video accumulation/analysis server 50 to the display unit 93 such that the captured video data is reproduced, in response to an operation of the operator OP1. The retrieval unit (not illustrated) generates a retrieval request including a retrieval condition that is input through an operation of the operator OP1.

In the vehicle monitoring system 1A illustrated in FIG. 1B, a configuration difference from the vehicle monitoring system 1 illustrated in FIG. 1A is a configuration of a video accumulation/analysis server 50A. In FIG. 1B, the video accumulation/analysis server 50A is not configured by a single server unlike the video accumulation/analysis server 50 illustrated in FIG. 1A, and is configured by, for example, four servers. In other words, in FIG. 1B, the video accumulation/analysis server 50A is configured by a single number detection/collation server 51A having the number detection/collation core 51 illustrated in FIG. 1A, a single vehicle type/vehicle color detection server 52A having the vehicle type/vehicle color detection core 52 illustrated in FIG. 1A, a single face detection/collation server 53A having the face detection/collation core 53 illustrated in FIG. 1A, and a number-of-occupants measurement server 54A having the number-of-occupants measurement core 54 illustrated in FIG. 1A.

Respective processes in the number detection/collation server 51A, the vehicle type/vehicle color detection server 52A, the face detection/collation server 53A, and the number-of-occupants measurement server 54A are the same as the corresponding processes in the number detection/collation core 51, the vehicle type/vehicle color detection core 52, the face detection/collation core 53, and the number-of-occupants measurement core 54, and thus detailed description thereof will be omitted. In other words, the video accumulation/analysis server 50 illustrated in FIG. 1A may not be configured by a single server, and may be configured by a plurality of servers in the same manner as the video accumulation/analysis server 50A illustrated in FIG. 1B. The same database as the database 57 of the video accumulation/analysis server 50 may be provided in each of the number detection/collation server 51A, the vehicle type/vehicle color detection server 52A, the face detection/collation server 53A, and the number-of-occupants measurement server 54A.

Figure 2:
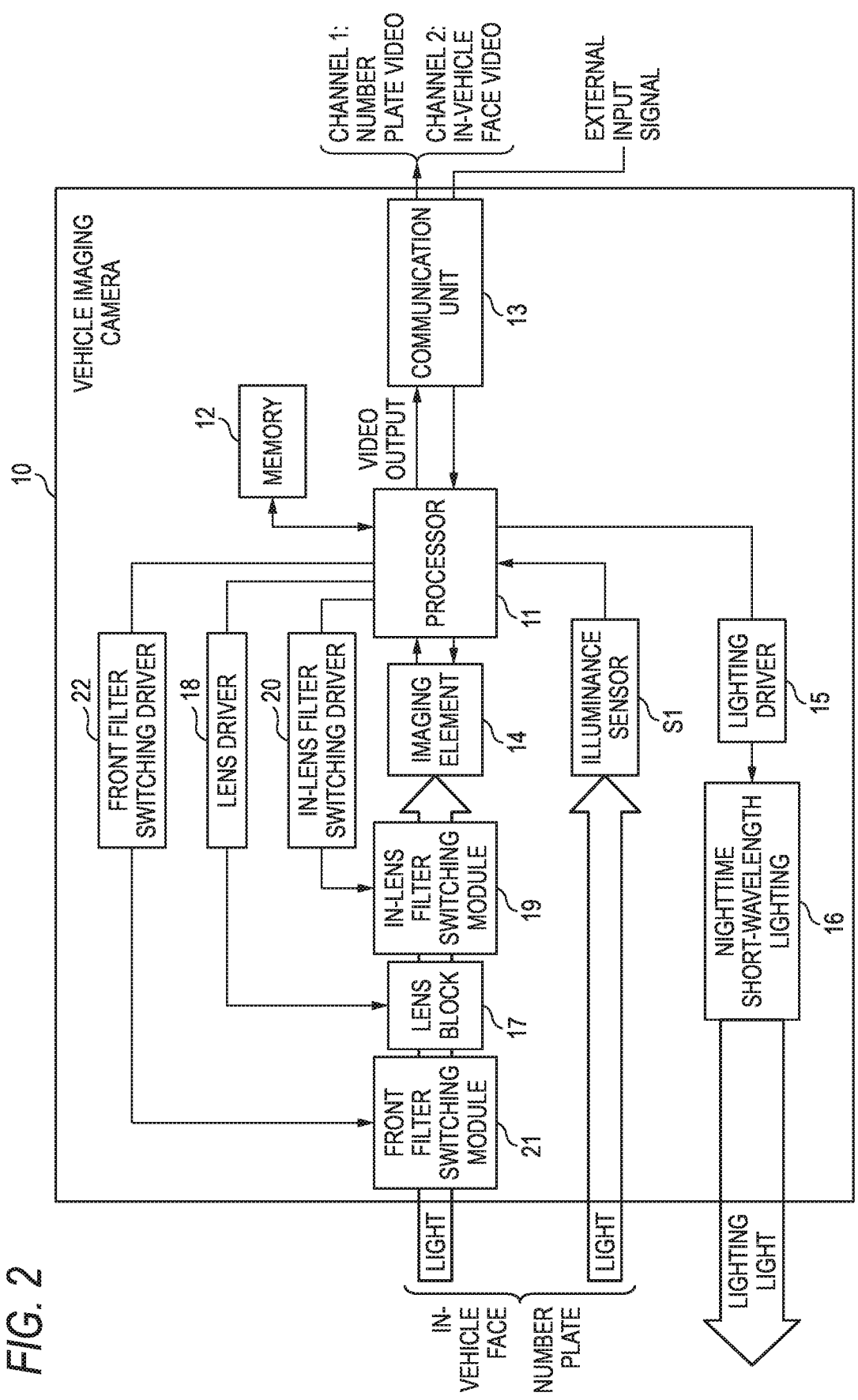
FIG. 2 is a block diagram illustrating a hardware configuration example of a vehicle imaging camera in detail.

FIG. 2 is a block diagram illustrating an example of a hardware configuration of each of the vehicle imaging cameras 10, 10A, 10B, . . . . As described above, the respective internal configurations of the vehicle imaging cameras 10, 10A, 10B, . . . may be the same as each other except a configuration of the lens block 17 (refer to FIG. 2) or a configuration of the camera casing, and thus the vehicle imaging camera 10 will be described as an example in FIG. 2. The vehicle imaging camera 10 is configured to include a processor 11, a memory 12, a communication unit 13, an imaging element 14, a lighting driver 15, a nighttime short-wavelength lighting 16, the lens block 17, a lens driver 18, an in-lens filter switching module 19, an in-lens filter switching driver 20, a front filter switching module 21, a front filter switching driver 22, and an illuminance sensor S1.

The processor 11 is configured by using, for example, a CPU, a DSP, or an FPGA. The processor 11 functions as a controller controlling the overall operation of the vehicle imaging camera 10, and performs a control process for controlling operations of the respective units of the vehicle imaging camera 10, and data input and output processes, a data calculation process, and a data storage process with the respective units of the vehicle imaging camera 10. The processor 11 operates according to the program stored in the memory 12. The processor 11 temporarily stores data or information generated or acquired by the processor 11 into the memory 12 by using the memory 12 during an operation thereof.

The memory 12 is configured by using, for example, a RAM and a ROM, and temporarily preserves a program required to execute an operation of the vehicle imaging camera 10, and data or information generated during an operation thereof. The RAM is, for example, a work memory used during an operation of the vehicle imaging camera 10. The ROM stores and preserves in advance, for example, a program for controlling the vehicle imaging camera 10.

The communication unit 13 can perform communication with the video accumulation/analysis server 50 via the network NW1 such as a wired communication line or a wireless communication network (for example, a wireless local area network (LAN)). The communication unit 13 delivers (transmits), for example, a captured video (also referred to as a "number plate video" in some cases) as a channel 1 under a first imaging condition appropriate for imaging a number plate of a vehicle to the video accumulation/analysis server 50. The communication unit 13 delivers (transmits) a captured video (also referred to as an "in-vehicle face video") as a channel 2 under a second imaging condition appropriate for imaging a face of an in-vehicle occupant of a vehicle to the video accumulation/analysis server 50.

The communication unit 13 receives an external input signal transmitted from the client terminal 90 via the video accumulation/analysis server 50, and outputs the external input signal to the processor 11. The external input signal is, for example, a command for changing image parameters for increasing or decreasing brightness of a captured video through an operation of the operator OP1 viewing the captured video displayed on the client terminal 90. Here, the image parameters are, for example, an exposure time using an electronic shutter, a gain for amplifying an electrical signal for a captured image in the imaging element 14, and the intensity of lighting from the nighttime short-wavelength lighting 16, and may not be limited thereto. The processor 11 changes and sets a value of a corresponding image parameter in response to the external input signal. The set image parameter is set for the imaging element 14 or the nighttime short-wavelength lighting 16 according to a content thereof.

The imaging element 14 is, for example, an image sensor that can capture a high definition video of 2K, 4K, or 8K, and is configured by a solid-state imaging element such as a charged coupled device (CCD) or a complementary metal oxide semiconductor (CMOS). The solid-state imaging element generates an electrical signal for a captured image corresponding to an optical image on the basis of photoelectric conversion of the optical image formed on an imaging surface. The imaging element 14 may be configured with an integrated circuit board mounted with the solid-state imaging element, an amplifier amplifying an electrical signal output from the solid-state imaging element, a gain adjustment unit that can adjust a gain (sensitivity) of the amplifier, an electronic shutter (simply referred to as a "shutter" in some cases) that can control an imaging time (so-called exposure time), and an exposure control circuit controlling an exposure time of the electronic shutter. An output from the imaging element 14 may be input to the processor 11 to be subjected to predetermined signal processing such that captured video data is generated, and a control circuit that executes the predetermined signal processing in the imaging element 14 such that the captured video data is generated may be provided.

The lighting driver 15 is configured by using, for example, a switching circuit switching turning-on and turning-off of each of a plurality of nighttime short-wavelength lightings 16. The lighting driver 15 switches each of the plurality of nighttime short-wavelength lightings 16 to turning-on or turning-off in response to a control instruction from the processor 11. The lighting driver 15 may further include a variable amplification circuit that can adjust a light emission amount (intensity) of the nighttime short-wavelength lighting 16. In this case, the lighting driver 15 can perform light control by adjusting a light emission amount (intensity) of the nighttime short-wavelength lighting 16 in response to a control instruction from the processor 11.

The nighttime short-wavelength lighting 16 as an example of an IR lighting unit is configured by using, for example, a light emission diode (LED), and is disposed in a plurality (for example, ten to twenty). The nighttime short-wavelength lighting 16 applies IR light (near-infrared light) that is lighting light having an intensity based on the control of the lighting driver 15 in order to enable a subject (for example, a vehicle) within an angle of view to be imaged when an operation mode of the vehicle imaging camera 10 is a nighttime mode.

The lens block 17 includes a focus lens that forms an optical image of a subject on the imaging surface of the imaging element 14. The lens block 17 may include not only the focus lens but also a zoom lens that can change magnification from a telephoto to a wide angle.

The lens driver 18 is configured by using an electric circuit adjusting a position of at least one lens configuring the lens block 17. The lens driver 18 adjusts a position of the focus lens of the lens block 17 in response to a control instruction from the processor 11. In a case where the lens block 17 has the zoom lens, the lens driver 18 may adjust the magnification of the zoom lens in response to a control instruction from the processor 11.

The in-lens filter switching module 19 is disposed on the rear side (that is, an opposite object side) of the lens block 17 and front side (that is, an object side) of the imaging element 14. The in-lens filter switching module 19 is disposed to be able to switch an IR-cut filter (not illustrated) and a plain glass (not illustrated), and alternately switches and disposes the IR-cut filter and the plain glass on an optical axis of an optical system. The in-lens filter switching module 19 disposes, for example, the IR-cut filter on the optical axis during a daytime mode. Consequently, during the daytime mode, red, green, and blue (RGB) light from which an IR band component is cut is received at the imaging element 14, and thus a visible light image having favorable quality is obtained. On the other hand, the in-lens filter switching module 19 disposes, for example, the plain glass on the optical axis during a nighttime mode. Consequently, during the nighttime mode, incident light passing through the plain glass without the IR band component being cut by the IR-cut filter is received at the imaging element 14, and an IR image having constant brightness (in other words, not too dark) is obtained on the basis of the received incident light.

The in-lens filter switching driver 20 is configured by using an electric circuit driving the in-lens filter switching module 19. The in-lens filter switching driver 20 drives the in-lens filter switching module 19 to dispose either the IR-cut filter or the plain glass on the optical axis in response to a control instruction from the processor 11.

The front filter switching module 21 alternately switches a band-pass filter and a polarization filter (for example, by slidably moving the band-pass filter and the polarization filter), and thus disposes the band-pass filter or the polarization filter on the optical axis. The front filter switching module 21 is disposed further toward a subject side (that is, an object side) on the optical axis than the lens block 17, and thus mechanical adjustment (for example, maintenance) of the front filter switching module 21 is facilitated.

The front filter switching driver 22 is configured by using an electric circuit driving a motor (not illustrated) for the front filter switching module. The front filter switching driver 22 drives the motor for the front filter switching module to move the front filter switching module 21 such that the band-pass filter or the polarization filter is disposed on the optical axis, in response to a control instruction from the processor 11.

The illuminance sensor S1 as an example of a sensor detects the illuminance of ambient light of the vehicle imaging camera 10. For example, a photodiode or a phototransistor is used for the illuminance sensor S1. The illuminance sensor S1 is attached to a front surface of a casing of the vehicle imaging camera 10 such that the illuminance of light in a direction in which a vehicle as a subject of the vehicle imaging camera 10 is present can be detected. Illuminance information (specifically, illuminance value data) detected by the illuminance sensor S1 is input to the processor 11. The processor 11 determines whether an operation mode of the vehicle imaging camera 10 at the present time is the nighttime mode or the daytime mode on the basis of the illuminance information.

For example, in a case where it is determined that the illuminance information is more than a default threshold value (that is, the surrounding is bright), the processor 11 sets an operation mode of the vehicle imaging camera 10 to transition to the daytime mode. In a case where it is determined that the illuminance information is less than the default threshold value (that is, the surrounding is dark), the processor 11 sets an operation mode of the vehicle imaging camera 10 to transition to the nighttime mode. In a case where the illuminance information at the present time is not more than or not less than the default threshold value, an operation mode at the present time is maintained. Information (for example, a flag) indicating the daytime mode or the nighttime mode is temporarily preserved in, for example, the memory 12.

Figure 3A:
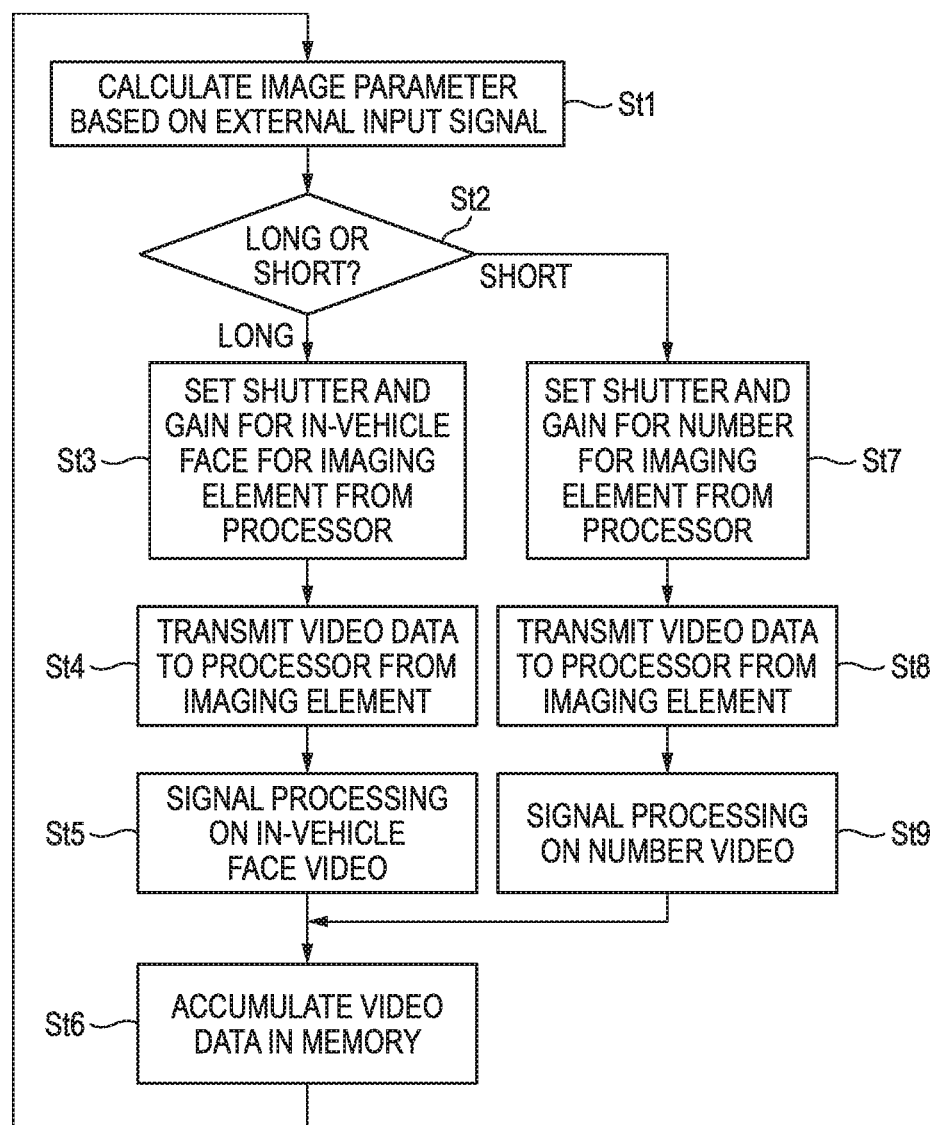
FIG. 3A is a flowchart illustrating an operation procedure example related to imaging performed by the vehicle imaging camera.
Figure 3B:
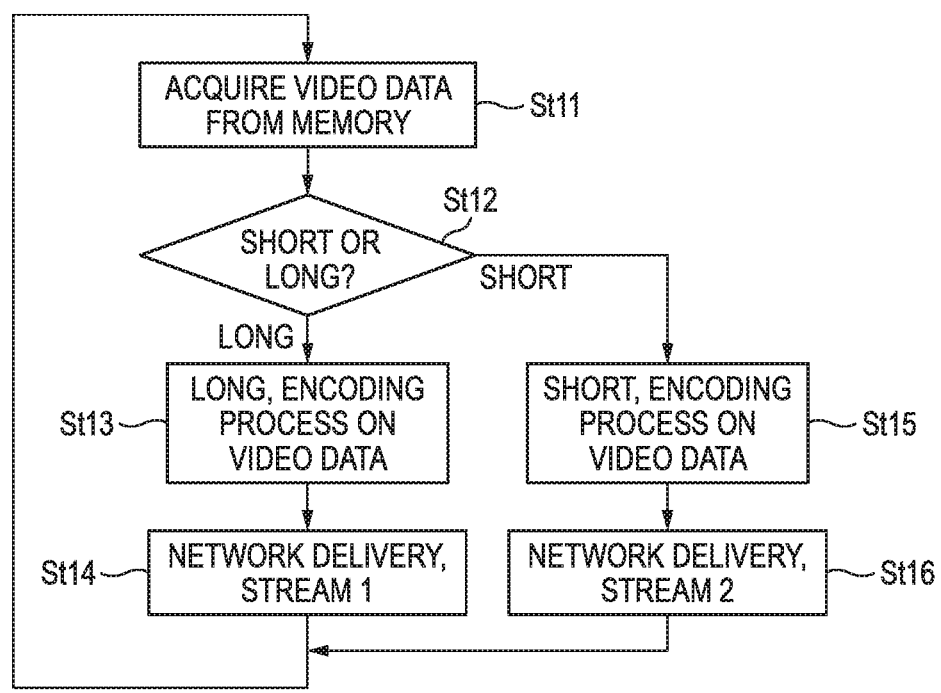
FIG. 3B is a flowchart illustrating an operation procedure example related to data transmission performed by the vehicle imaging camera.
Figure 3C:
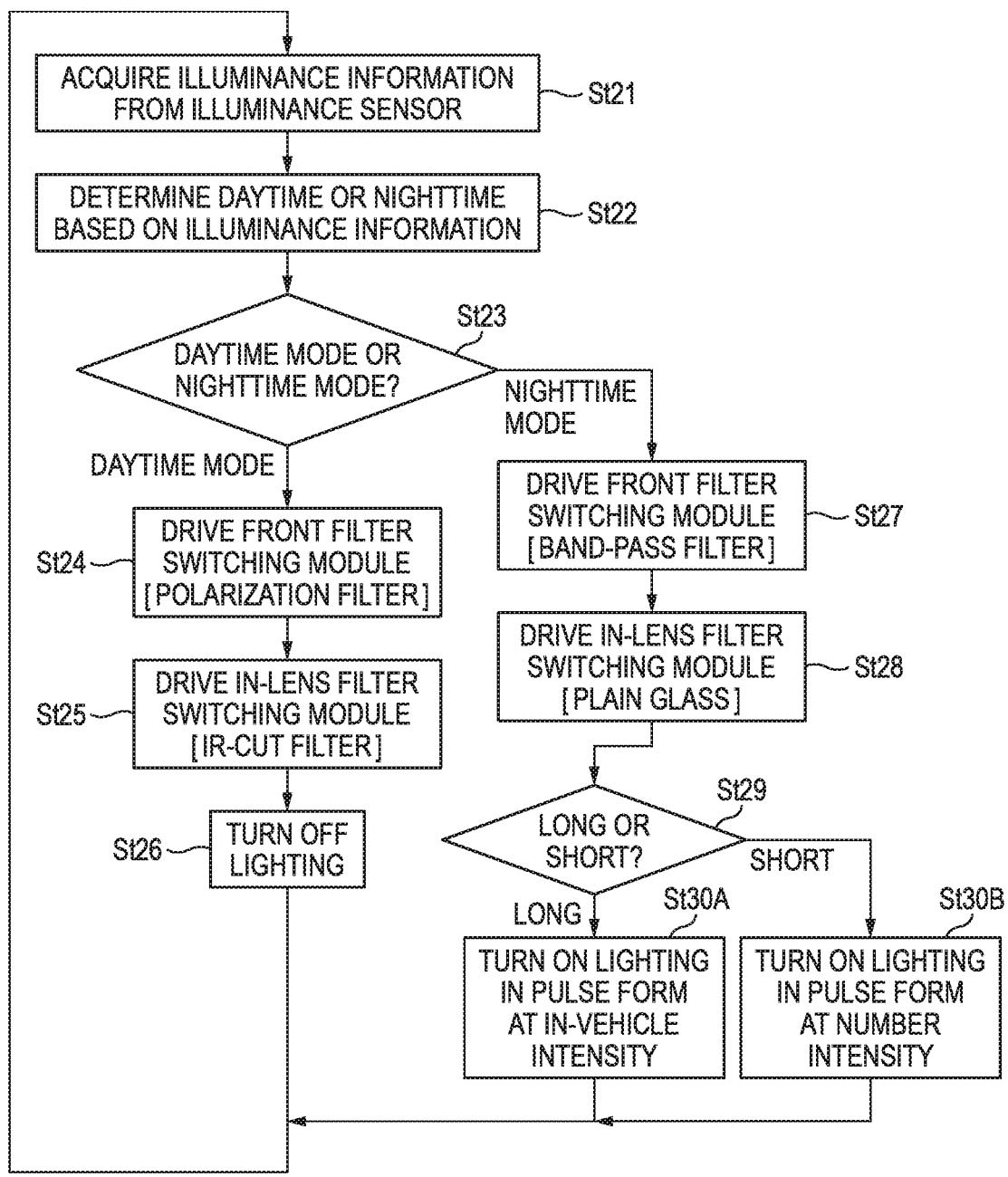
FIG. 3C is a flowchart illustrating an operation procedure example related to lighting control performed by the vehicle imaging camera.

FIG. 3A is a flowchart illustrating an operation procedure example related to imaging performed by the vehicle imaging cameras 10, 10A, 10B, . . . . FIG. 3B is a flowchart illustrating an operation procedure example related to data transmission performed by the vehicle imaging cameras 10, 10A, 10B, . . . . FIG. 3C is a flowchart illustrating operation procedure example related to lighting control performed by the vehicle imaging cameras 10, 10A, 10B, . . . . FIG. 3D is a table illustrating various operation control examples in each of the daytime mode and the nighttime mode. In description of each of FIGS. 3A to 3D, the vehicle imaging camera 10 is also exemplified in the same manner.

The process illustrated in FIG. 3A is repeatedly executed, for example, from turning-on of a power supply of the vehicle imaging camera 10 to turning-off of the power supply thereof. In FIG. 3A, the processor 11 calculates an image parameter under the first imaging condition or an image parameter under the second imaging condition on the basis of an external input signal from the communication unit 13 (St1), and sets the calculation result (image parameter) for the memory 12. The vehicle imaging camera 10 switches and captures a number plate video and an in-vehicle face video in a time division manner (for example, every frame). In this case, for example, the processor 11 captures a number plate video (number plate image) as an odd-numbered frame (captured image), and captures an in-vehicle face video (in-vehicle face image) as an even-numbered frame (captured image).

After step St1, the processor 11 determines whether an exposure time of the electronic shutter for the imaging element 14 is "long" or "short" (St2).

The processor 11 determines that the exposure time of the electronic shutter corresponding to an in-vehicle face image is "long" when an even-numbered frame is captured (Long in St2), and sets image parameters (for example, an exposure time of the electronic shutter and a gain) appropriate for capturing the in-vehicle face image for the imaging element 14 (St3). The imaging element 14 transmits in-vehicle face image data to the processor 11 on the basis of the image parameters set in step St3 (St4). The processor 11 executes predetermined signal processing (for example, noise removal, white balancing, and image compression) on the in-vehicle face image data from the imaging element 14 (St5), and temporarily accumulates the in-vehicle face image data subjected to the signal processing into the memory 12 (St6). After step St6, the process in the vehicle imaging camera 10 returns to step St1.

On the other hand, the processor 11 determines that the exposure time of the electronic shutter corresponding to a number plate image is "short" when an odd-numbered frame is captured (Short in St2), and sets image parameters (for example, an exposure time of the electronic shutter and a gain) appropriate for capturing the number plate image for the imaging element 14 (St7). The imaging element 14 transmits number plate image data to the processor 11 on the basis of the image parameters set in step St7 (St8). The processor 11 executes predetermined signal processing (for example, noise removal, white balancing, and image compression) on the number plate image data from the imaging element 14 (St9), and temporarily accumulates the number plate image data subjected to the signal processing into the memory 12 (St6). Consequently, the vehicle imaging camera 10 can generate an in-vehicle face image captured on the basis of image parameters appropriate for imaging a face of an occupant in a vehicle and can generate a number plate image captured on the basis of image parameters appropriate for imaging a number plate by switching the image parameters for the in-vehicle face image and the image parameters for the number plate image every frame.

The process illustrated in FIG. 3B is repeatedly executed, for example, from turning-on of the power supply of the vehicle imaging camera 10 to turning-off of the power supply thereof. In FIG. 3B, the processor 11 reads and acquires the in-vehicle face video data or the number plate video data that is temporarily accumulated in step St6 (St11).

The processor 11 determines whether an exposure time of the electronic shutter for the imaging element 14 corresponding to the video data acquired in step St11 is "long" or "short" (St12).

In a case where it is determined that the exposure time is "long" (Long in St12), the processor 11 performs an encoding process appropriate for the exposure time (St13). For example, in a case where an occupant's face viewed through a windshield of a vehicle is acquired as a clear face image, the processor 11 performs the encoding process at a low compression ratio. The processor 11 delivers the in-vehicle face video data subjected to the encoding process in step St13 as a stream 1 to the video accumulation/analysis server 50 via the communication unit 13 (St14). After step St14, the process in the vehicle imaging camera 10 returns to step St11.

On the other hand, in a case where it is determined that the exposure time is "short" (Short in St12), the processor 11 performs an encoding process appropriate for the exposure time (St15). For example, in a case where a number plate image is acquired, the processor 11 may perform the encoding process at a high compression ratio. The processor 11 delivers the number plate video data subjected to the encoding process in step St15 as a stream 2 to the video accumulation/analysis server 50 via the communication unit 13 (St16). After step St16, the process in the vehicle imaging camera 10 returns to step St11. Consequently, the vehicle imaging camera 10 can perform an encoding process at a compression ratio corresponding to in-vehicle face video data or number plate video data according to an exposure time of the electronic shutter for the imaging element 14, and can deliver the data to the video accumulation/analysis server 50.

A table TBL1 illustrated in FIG. 3D is registered in, for example, the memory 12 in advance. In the table TBL1, in the daytime mode, there are commands for instruction information indicating that the front filter switching module 21 disposes the polarization filter (not illustrated) on the optical axis, the in-lens filter switching module 19 disposes the IR-cut filter on the optical axis, and the nighttime short-wavelength lighting 16 is turned off. On the other hand, in the nighttime mode, there are commands for instruction information indicating that the front filter switching module 21 disposes the band-pass filter (not illustrated) on the optical axis, the in-lens filter switching module 19 disposes the plain glass on the optical axis, and the nighttime short-wavelength lighting 16 is turned on. Switching between the daytime mode and the nighttime mode illustrated in FIG. 3C is performed by the processor 11 on the basis of the command contents in the table TBL1.

The process illustrated in FIG. 3C is repeatedly executed, for example, from turning-on of a power supply of the vehicle imaging camera 10 to turning-off of the power supply thereof. In FIG. 3C, the processor 11 acquires ambient illuminance information detected by the illuminance sensor S1 (St21). The processor 11 determines whether the present time is the daytime (for example, the morning or the afternoon) or the nighttime (for example, the evening or the night) on the basis of the illuminance information acquired in step St21 (St22).

The processor 11 determines whether an operation mode of the vehicle imaging camera 10 is set to the daytime mode or the nighttime mode on the basis of a determination result in step St22 (St23). For example, the memory 12 stores and preserves a threshold value regarding predetermined illuminance. The processor 11 sets the operation mode to the daytime mode in a case where the illuminance information is more than the threshold value, and sets the operation mode to the nighttime mode in a case where the illuminance information is less than the threshold value.

In a case of the daytime mode (daytime mode in St23), on the basis of the table TBL1 illustrated in FIG. 3D, the processor 11 generates a control instruction for executing a process during the daytime mode, and sends the control instruction to the front filter switching driver 22 so as to drive the front filter switching module 21 via the front filter switching driver 22 (St24). In the daytime mode, the front filter switching module 21 is moved such that the polarization filter (not illustrated) is located on the optical axis. The processor 11 sends the control instruction for the daytime mode to the in-lens filter switching driver 20, and thus drives the in-lens filter switching module 19 via the in-lens filter switching driver 20 (St25). In the daytime mode, the in-lens filter switching module 19 is moved such that the IR-cut filter is located on the optical axis in order to clarify an RGB image captured by the imaging element 14.

The processor 11 similarly sends the control instruction for the daytime mode to the lighting driver 15, and thus turns off the plurality of nighttime short-wavelength lightings 16 via the lighting driver 15 (St26). After step St26, the process in the vehicle imaging camera 10 returns to step St21.

On the other hand, in a case of the nighttime mode (nighttime mode in St23), on the basis of the table TBL1 illustrated in FIG. 3D, the processor 11 generates a control instruction for executing a process during the nighttime mode, and sends the control instruction to the front filter switching driver 22 so as to drive the front filter switching module 21 via the front filter switching driver 22 (St27). In the nighttime mode, the front filter switching module 21 is moved such that the band-pass filter (not illustrated) is located on the optical axis. The processor 11 sends the control instruction for the nighttime mode to the in-lens filter switching driver 20, and thus drives the in-lens filter switching module 19 via the in-lens filter switching driver 20 (St28). In the nighttime mode, the in-lens filter switching module 19 is moved such that the plain glass is located on the optical axis in order not to cut IR light incident to the vehicle imaging camera 10.

The processor 11 determines whether an exposure time of the electronic shutter for the imaging element 14 during imaging is "long" or "short" (St29).

The processor 11 determines that the exposure time of the electronic shutter corresponding to an in-vehicle face image is "long" when an even-numbered frame is captured (Long in St29), and sends a control instruction for image parameters (for example, the intensity of IR light from the nighttime short-wavelength lighting 16) appropriate for capturing the in-vehicle face image during the nighttime mode to the lighting driver 15, so that the plurality of nighttime short-wavelength lightings 16 are turned on in a pulse form via the lighting driver 15 on the basis of the control instruction (St30A). After step St30A, the process in the vehicle imaging camera 10 returns to step St21.

On the other hand, the processor 11 determines that the exposure time of the electronic shutter corresponding to a number plate image is "short" when an odd-numbered frame is captured (Short in St29), and sends a control instruction for image parameters (for example, the intensity of IR light from the nighttime short-wavelength lighting 16) appropriate for capturing the number plate image during the nighttime mode to the lighting driver 15, so that the plurality of nighttime short-wavelength lightings 16 are turned on in a pulse form via the lighting driver 15 on the basis of the control instruction (St30B). After step St30B, the process in the vehicle imaging camera 10 returns to step St21. Consequently, since the vehicle imaging camera 10 adaptively switches turning-on and turning-off of the front filter switching module 21, the in-lens filter switching module 19, and the nighttime short-wavelength lighting 16 according to the daytime mode or the nighttime mode, highly accurate imaging can be achieved in both the daytime mode and the nighttime mode, and thus it is possible to generate an in-vehicle face video and a number plate video of a vehicle as a subject.

FIG. 4 is a block diagram illustrating a hardware configuration example of the video accumulation/analysis server 50 in detail. The video accumulation/analysis server 50 is configured to include a processor PRC1, a memory 55, a communication unit 56, and the database 57.

The processor PRC1 is configured by using, for example, a CPU, a DSP, or an FPGA. The processor PRC1 functions as a control unit of the video accumulation/analysis server 50, and performs a control process for integrally controlling operations of the respective units of the video accumulation/analysis server 50, and data input and output processes, a data calculation process, and a data storage process with the respective units of the video accumulation/analysis server 50. The processor PRC1 operates according to the program stored in the memory 55. The processor PRC1 reads and executes the program stored in the memory 55, and thus functionally realizes the number detection/collation core 51, the vehicle type/vehicle color detection core 52, the face detection/collation core 53, and the number-of-occupants measurement core 54. Details of the number detection/collation core 51, the vehicle type/vehicle color detection core 52, the face detection/collation core 53, and the number-of-occupants measurement core 54 have been described with reference to FIG. 1A, and thus description thereof will be omitted.

The memory 55 is configured by using, for example, a RAM and a ROM, and temporarily stores a program or data required to execute an operation of the video accumulation/analysis server 50, and information or data generated during an operation thereof. The RAM is, for example, a work memory used during an operation of the processor PRC1. The ROM stores in advance, for example, a program and data for controlling the processor PRC1.

The communication unit 56 perform communication with each of the vehicle imaging cameras 10, 10A, 10B, . . . connected thereto via the network NW1 such as a communication line of an intranet, and receives a captured video (for example, a video indicating a status of a vehicle entering an angle of view) sent from each vehicle imaging camera. The communication unit 56 performs communication with the client terminal 90 via a network such as an intranet provided in a police station, and receives a retrieval request sent from the client terminal 90 or returns a response to the retrieval request.

The database 57 is configured by using, for example, a hard disk drive or a solid state drive. The database 57 records the captured video sent from each of the vehicle imaging cameras 10, 10A, 10B, . . . in correlation with information regarding a camera ID of a camera having generated the captured video and the imaging date and time. The database 57 records road map data indicating positions where the respective vehicle imaging cameras 10, 10A, 10B, . . . are provided, and records updated road map data, for example, in a case where the road map data is updated due to construction of a new road or road maintenance work.

The database 57 stores various processing results of a detection process, a collation process, and a measurement process (analysis process) in the processor PRC1 in correlation with captured videos that are targets of the processes.

The database 57 preserves a number collation list (an example of a blacklist) in which a number of a vehicle that is a police investigation target is registered in correlation with attribute information of the investigation target vehicle (for example, a stolen vehicle). The number collation list may be referred to, for example, when the number detection/collation core 51 performs a number collation process, and a content thereof may be added, changed, or deleted to be updated as appropriate through an operation of the operator OP1.

The database 57 preserves a face collation list (an example of a blacklist) in which a face image of a person (for example, a suspect) who is a police investigation target is registered in correlation with attribute information of the investigation target person. The face collation list may be referred to, for example, when the face detection/collation core 53 performs a face image collation process, and a content thereof may be added, changed, or deleted to be updated as appropriate through an operation of the operator OP1.

Figure 5B:
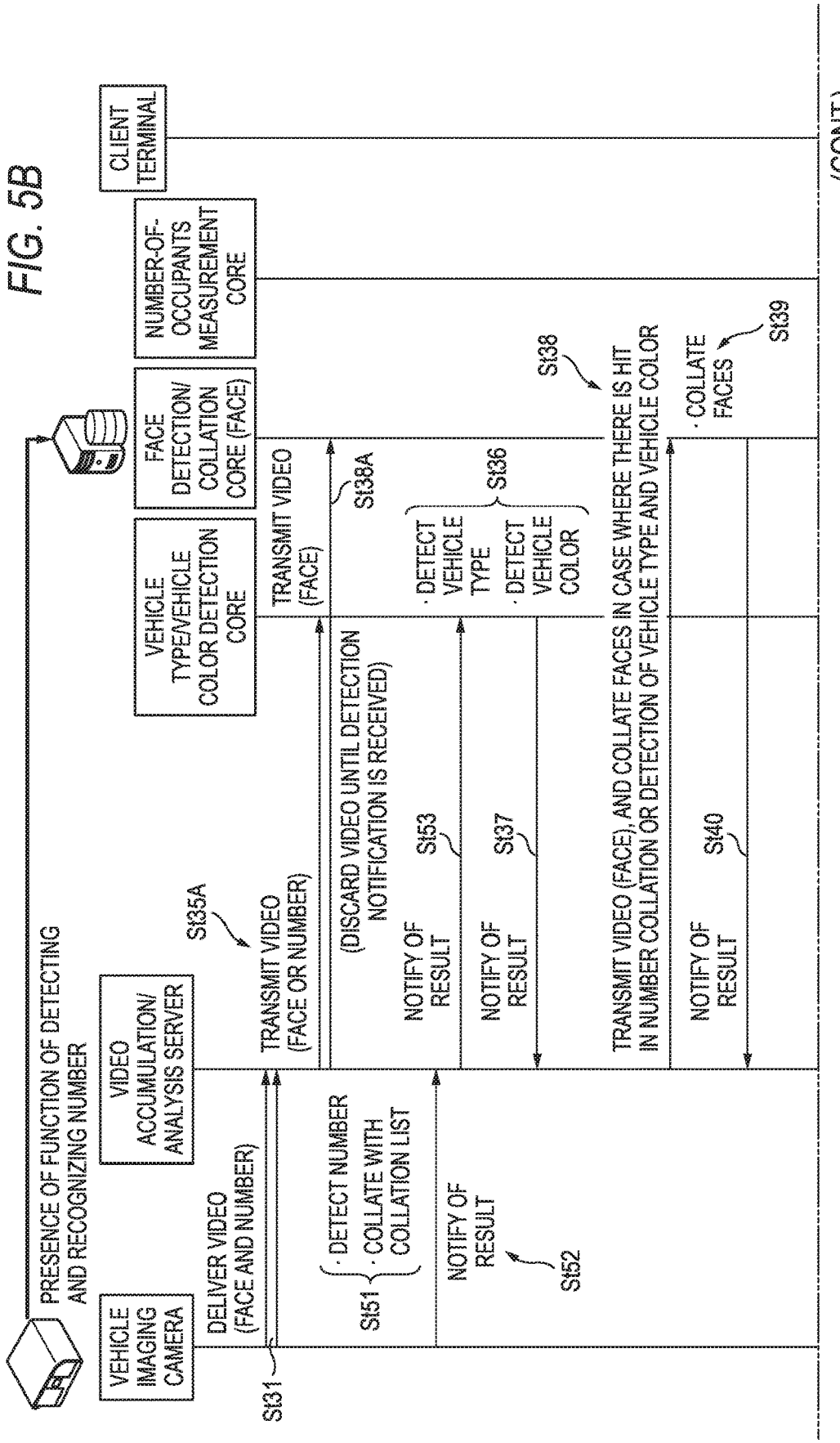
FIG. 5B is a sequence diagram illustrating a second example of an operation procedure regarding video analysis in the vehicle monitoring system.
Figure 5C:
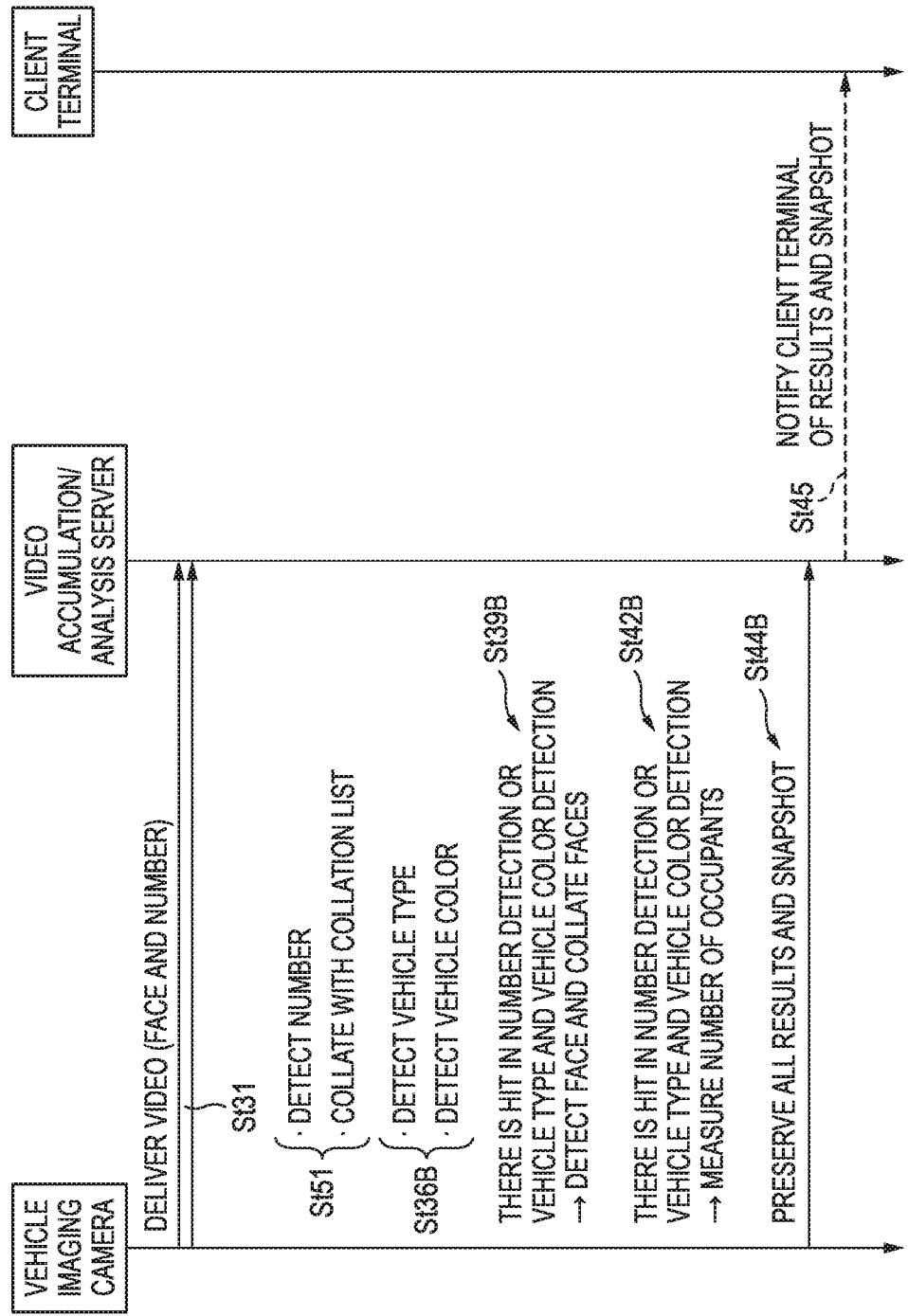
FIG. 5C is a sequence diagram illustrating a third example of an operation procedure regarding video analysis in the vehicle monitoring system.
Figure 5D:
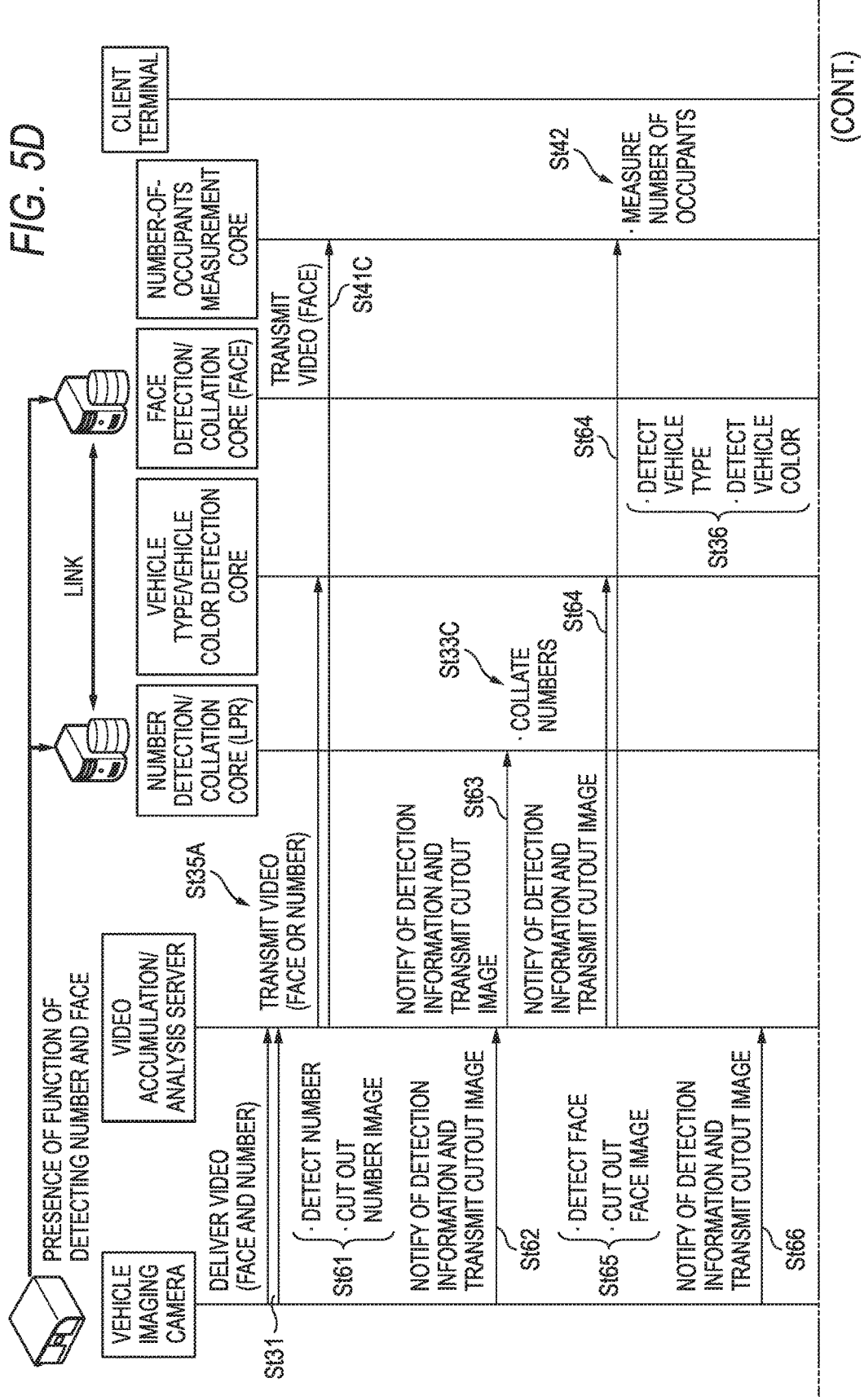
FIG. 5D is a sequence diagram illustrating a fourth example of an operation procedure regarding video analysis in the vehicle monitoring system.

Next, an operation procedure example regarding video analysis in the vehicle monitoring system 1 according to Embodiment 1 will be described with reference to FIGS. 5A, 5B, 5C, and 5D. FIG. 5A is a sequence diagram illustrating a first example of an operation procedure regarding video analysis in the vehicle monitoring system. FIG. 5B is a sequence diagram illustrating a second example of an operation procedure regarding video analysis in the vehicle monitoring system. FIG. 5C is a sequence diagram illustrating a third example of an operation procedure regarding video analysis in the vehicle monitoring system. FIG. 5D is a sequence diagram illustrating a fourth example of an operation procedure regarding video analysis in the vehicle monitoring system. In description of FIGS. 5A to 5D, the vehicle imaging camera 10 is exemplified in the same manner.

In the description of FIGS. 5A to 5D, for better understanding of the description, the configuration of the vehicle monitoring system 1 illustrated in FIG. 1A will be described as an example. In the description of FIGS. 5B to 5D, the same process as a process in FIG. 5A will be given the same step number, description thereof will be simplified or omitted, and different contents will be described.

In FIG. 5A, the vehicle imaging camera 10 does not have a function of detecting a number plate and a face reflected in a captured video. The vehicle imaging camera 10 delivers (transmits) captured videos (specifically, an in-vehicle face video and a number plate video) to the video accumulation/analysis server 50 (St31). In a case where the captured videos are received from the vehicle imaging camera 10, the video accumulation/analysis server 50 (for example, the processor PRC1) sends the number plate video to the number detection/collation core 51 (St32). The number detection/collation core 51 detects and recognizes a number plate reflected in the number plate video, and collates the number plate recognition result with the number collation list preserved in the database 57 (St33). The number detection/collation core 51 notifies the video accumulation/analysis server 50 of a result of the number plate collation process (St34).

The video accumulation/analysis server 50 sends the in-vehicle face video or the number plate video to the vehicle type/vehicle color detection core 52 (St35). The vehicle type/vehicle color detection core 52 detects a vehicle type and a vehicle color of a vehicle reflected in the in-vehicle face video or the number plate video (St36), and notifies the video accumulation/analysis server 50 of detection results of the vehicle type and the vehicle color (St37).

In a case where there is a hit in the result of the number plate collation process (that is, matching with any number in the number collation list) or there are hits in the detection results of the vehicle type and the vehicle color (for example, matching with a vehicle type and a vehicle color of a runaway vehicle of a suspect to which the operator OP1 has listened through an incoming call), the video accumulation/analysis server 50 sends the in-vehicle face video and an instruction for executing face collation to the face detection/collation core 53 (St38). The face detection/collation core 53 detects an occupant's face reflected in the in-vehicle face video, and collates a face detection result with the face collation list preserved in the database 57 (St39). The face detection/collation core 53 notifies the video accumulation/analysis server 50 of a result of the face collation process (St40).

In a case where there is a hit in the result of the number plate collation process (that is, matching with any number in the number collation list) or there are hits in the detection results of the vehicle type and the vehicle color (for example, matching with a vehicle type and a vehicle color of a runaway vehicle of a suspect to which the operator OP1 has listened through an incoming call), the video accumulation/analysis server 50 sends the in-vehicle face video and an instruction for measuring the number of occupants to the number-of-occupants measurement core 54 (St41). The number-of-occupants measurement core 54 measures the number of occupants reflected in the in-vehicle face video (St42), and notifies the video accumulation/analysis server 50 of a measurement result of the number of occupants (St43).

The video accumulation/analysis server 50 accumulates (stores) the various processing results (specifically, the result of the number plate collation process, the detection results of the vehicle type and the vehicle color, the result of the face collation process, and the measurement result of the number of occupants) of which notifications are sent in steps St34, St37, St40, and St43 in the database 57 in correlation with captured images (snapshots) configuring the captured video received in step St31 (St44). The video accumulation/analysis server 50 may send the various processing results and the snapshots accumulated in step St44, to the client terminal 90 (St45). Consequently, the operator OP1 operating the client terminal 90 can recognize that various results of processes such as analysis on a video captured by the vehicle imaging camera 10 are accumulated in the database 57 of the video accumulation/analysis server 50 and can thus also visually check contents thereof via the display unit 93 of the client terminal 90.

In FIG. 5B, the vehicle imaging camera 10 has a function of detecting a number plate reflected in a captured video. The video accumulation/analysis server 50 (for example, the processor PRC1) sends the in-vehicle face video or the number plate video sent in step St31 to the vehicle type/vehicle color detection core 52 and the face detection/collation core 53 (St35A and St38A). Each of the vehicle type/vehicle color detection core 52 and the face detection/collation core 53 discards the in-vehicle face video or the number plate video sent in step St31 until a notification (refer to step St53) of detection of a number plate matching any number in the number collation list is received from the video accumulation/analysis server 50 (for example, the processor PRC1).

After step St31, the vehicle imaging camera 10 detects and recognizes a number plate reflected in the number plate video (St51), and collates a number plate recognition result with the number collation list preserved in the memory 12 (St51). The vehicle imaging camera 10 notifies the video accumulation/analysis server 50 of a result of the number plate collation process (St52). The video accumulation/analysis server 50 sends a detection notification indicating that the number plate reflected in the number plate video matches any number in the number collation list, to the vehicle type/vehicle color detection core 52 on the basis of the result of the number plate collation process sent in step St52 (St53). The vehicle type/vehicle color detection core 52 detects a vehicle type and a vehicle color of a vehicle reflected in the in-vehicle face video or the number plate video on the basis of reception of the detection notification (St36). Consequently, the operator OP1 operating the client terminal 90 can recognize that various results of processes such as analysis on a video captured by the vehicle imaging camera 10 are accumulated in the database 57 of the video accumulation/analysis server 50 and can thus also visually check contents thereof via the display unit 93 of the client terminal 90. Since the number plate collation process can be executed in the vehicle imaging camera 10 compared with the operation procedure in FIG. 5A, various processes on a video captured by the vehicle imaging camera 10 can be distributed to the vehicle imaging camera 10 and the video accumulation/analysis server 50, and thus it is possible to reduce a processing load on the video accumulation/analysis server 50.

In FIG. 5C, the vehicle imaging camera 10 (for example, the processor 11) has a function of detecting a number plate reflected in a captured video, a vehicle color, and a face, and a function of measuring the number of occupants. After step St31, the vehicle imaging camera 10 detects and recognizes a number plate reflected in the number plate video, and collates a number plate recognition result with the number collation list preserved in the memory 12 (St51). The vehicle imaging camera 10 detects a vehicle type and a vehicle color of a vehicle reflected in the in-vehicle face video or the number plate video (St36B).

In a case where there is a hit in the result of the number plate collation process (that is, matching with any number in the number collation list) or there are hits in the detection results of the vehicle type and the vehicle color (for example, matching with a vehicle type and a vehicle color of a runaway vehicle of a suspect to which the operator OP1 has listened through an incoming call), the vehicle imaging camera 10 detects an occupant's face reflected in the in-vehicle face video (St39B). The vehicle imaging camera 10 collates a face detection result with the face collation list preserved in the database 57 (St39B).

In a case where there is a hit in the result of the number plate collation process (that is, matching with any number in the number collation list) or there are hits in the detection results of the vehicle type and the vehicle color (for example, matching with a vehicle type and a vehicle color of a runaway vehicle of a suspect to which the operator OP1 has listened through an incoming call), the vehicle imaging camera 10 measures the number of occupants reflected in the in-vehicle face video (St42B). The vehicle imaging camera 10 notifies the video accumulation/analysis server 50 of a result of the number plate collation process, detection results of the vehicle type and the vehicle color, a face dryness, and a measurement result of the number of occupants (St44B). Consequently, the operator OP1 operating the client terminal 90 can recognize that various results of processes such as analysis on a video captured by the vehicle imaging camera 10 are accumulated in the database 57 of the video accumulation/analysis server 50 and can thus also visually check contents thereof via the display unit 93 of the client terminal 90. Since various processes such as number plate collation, detection of a vehicle type and a vehicle color, face collation, and measurement of the number of occupants can be executed in the vehicle imaging camera 10 compared with the operation procedures in FIGS. 5A and 5B, the high performance vehicle imaging camera 10 is used, and thus it is possible to remarkably reduce a processing load on the video accumulation/analysis server 50.

In FIG. 5D, the vehicle imaging camera 10 (for example, the processor 11) has a function of detecting a number plate and a face reflected in a captured video. The video accumulation/analysis server 50 (for example, the processor PRC1) sends the in-vehicle face video or the number plate video sent in step St31 to the vehicle type/vehicle color detection core 52 (St35A), and sends the in-vehicle face video sent in step St31 to the number-of-occupants measurement core 54 (St41C). The vehicle imaging camera 10 detects a number plate reflected in the number plate video (St61), and generates a number plate image (hereinafter, referred to as a "number image" in some cases) obtained by cutting out the portion of the number plate reflected in the number plate video (St61). The vehicle imaging camera 10 generates a detection information notification indicating that the number plate reflected in the number plate video has been detected, and sends the detection information notification and the number plate image generated in step St61 to the video accumulation/analysis server 50 in correlation with each other (St62).

The video accumulation/analysis server 50 sends the detection information notification and the number plate image to the number detection/collation core 51 in correlation with each other (St63). The number detection/collation core 51 collates the number plate image (that is, the image of the cutout number plate) with the number collation list preserved in the database 57 (St33C).

The video accumulation/analysis server 50 sends the detection information notification and the number plate image to the vehicle type/vehicle color detection core 52 and the number-of-occupants measurement core 54 in correlation with each other (St64). The vehicle type/vehicle color detection core 52 detects a vehicle type and a vehicle color of a vehicle reflected in the number plate video or the in-vehicle face video sent in step St35A (St36). The number-of-occupants measurement core 54 measures the number of occupants reflected in the in-vehicle face video sent in step St41C (St42).

The vehicle imaging camera 10 detects an occupant's face reflected in the in-vehicle face video (St65), and generates a face image obtained by cutting out the portion of the face reflected in the in-vehicle face video (St65). The vehicle imaging camera 10 generates a detection information notification indicating that the occupant's face reflected in the in-vehicle face video has been detected, and sends the detection information notification and the face image generated in step St65 to the video accumulation/analysis server 50 in correlation with each other (St66).

The video accumulation/analysis server 50 sends the detection information notification and the face image to the face detection/collation core 53 in correlation with each other (St67). The face detection/collation core 53 collates the face image (that is, the image of the cutout occupant's face) with the face collation list preserved in the database 57 (St39). The face detection/collation core 53 notifies the video accumulation/analysis server 50 of a result of the face collation process (St40C). The number detection/collation core 51 notifies the video accumulation/analysis server 50 of a result of the number plate collation process (St34C). The vehicle type/vehicle color detection core 52 notifies the video accumulation/analysis server 50 of detection results of the vehicle type and the vehicle color (St37C). The number-of-occupants measurement core 54 notifies the video accumulation/analysis server 50 of a measurement result of the number of occupants (St43C).

The video accumulation/analysis server 50 accumulates (stores) the various processing results (specifically, the result of the number plate collation process, the detection results of the vehicle type and the vehicle color, the result of the face collation process, and the measurement result of the number of occupants) of which notifications are sent in steps St34C, St37C, St40C, and St43C in the database 57 in correlation with captured images (snapshots) configuring the captured video received in step St31 (St44). Consequently, the operator OP1 operating the client terminal 90 can recognize that various results of processes such as analysis on a video captured by the vehicle imaging camera 10 are accumulated in the database 57 of the video accumulation/analysis server 50 and can thus also visually check contents thereof via the display unit 93 of the client terminal 90. A number plate image and a face image that are targets of collation processes with the number collation list and the face collation list are generated by cutting out only a corresponding number plate and face from captured videos, and thus it is possible to reduce loads of a number plate collation process and a face collation process.

Figure 6A:
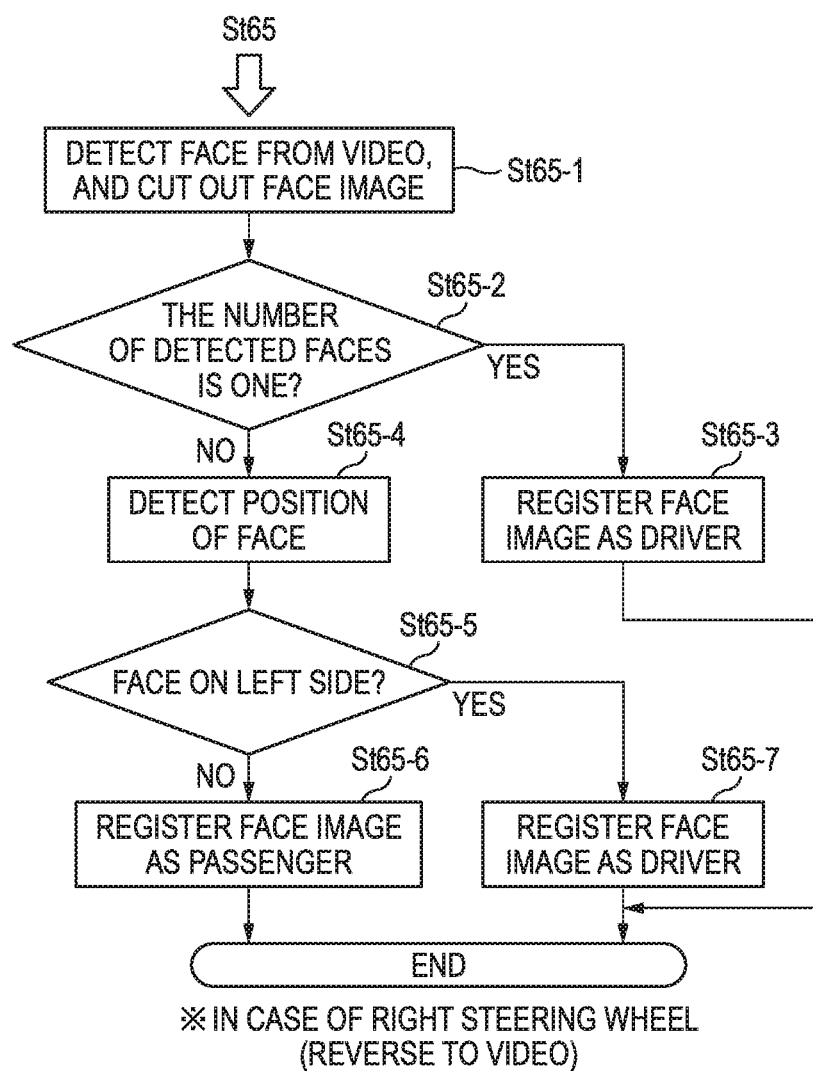
FIG. 6A is a flowchart illustrating a first example of an operation procedure of a process in which the vehicle imaging camera registers a driver and a passenger.
Figure 6B:
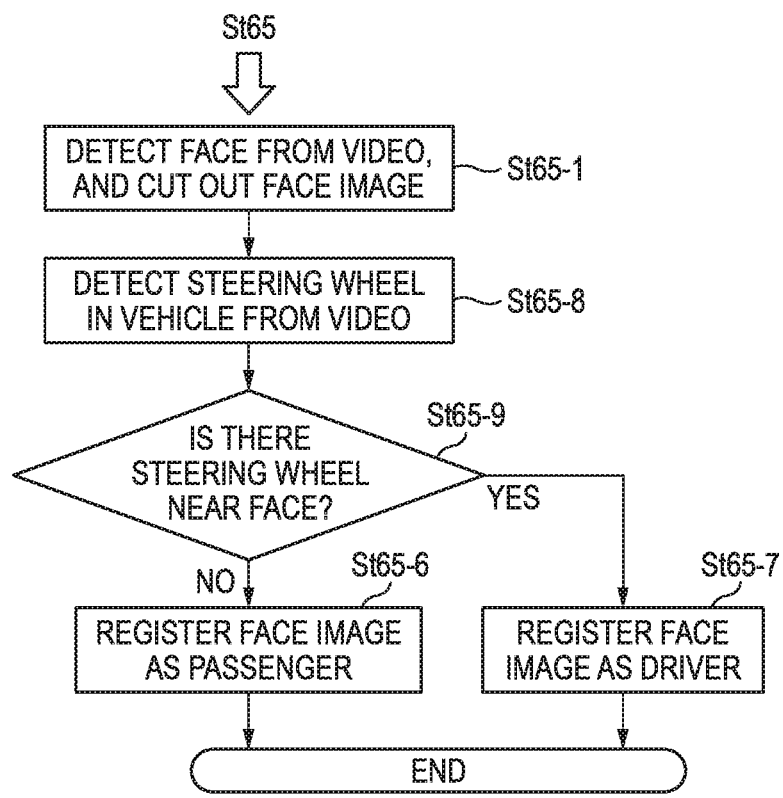
FIG. 6B is a flowchart illustrating a second example of an operation procedure of a process in which the vehicle imaging camera registers a driver and a passenger.

Next, with reference to FIGS. 6A and 6B, a description will be made of an example of a process in which the vehicle imaging camera 10 registers a driver and a passenger. FIG. 6A is a flowchart illustrating a first example of an operation procedure of a process in which the vehicle imaging camera 10 registers a driver and a passenger. FIG. 6B is a flowchart illustrating a second example of an operation procedure of a process in which the vehicle imaging camera 10 registers a driver and a passenger. The processes in FIGS. 6A and 6B will be described to be executed by, for example, the vehicle imaging camera 10 in the process in step St65 in FIG. 5D, but may be executed by the face detection/collation core 53 in the process in step St39 in FIGS. 5A and 5B, and may be executed by the vehicle imaging camera 10 in the process in step St39B in FIG. 5C. Similarly, in description of FIGS. 6A and 6B, the vehicle imaging camera 10 is exemplified, and an example is supposed in which a steering wheel is attached on the right side of a vehicle as a subject in an advancing direction.

In FIG. 6A, the vehicle imaging camera 10 (for example, the processor 11) detects an occupant's face from a captured video (in-vehicle face video), and generates a face image obtained by cutting out the portion of the face reflected in the in-vehicle face video (St65-1). The vehicle imaging camera 10 determines whether or not the number of detected faces is one (in other words, whether or not a plurality of persons are riding) on the basis of the processing result in step St65-1 (St65-2). In a case where it is determined that the number of detected faces is one (YES in St65-2), the vehicle imaging camera 10 registers the face image to have an attribute as a driver (St65-3). After step St65-3, the process illustrated in FIG. 6A is finished.

On the other hand, in a case where it is determined that the number of detected faces is not one (NO in St65-2), the vehicle imaging camera 10 detects positions of faces reflected in the in-vehicle face video (St65-4). The vehicle imaging camera 10 determines whether or not the detected face is a face on the left side when viewed from the vehicle imaging camera 10 (St65-5). In a case where it is determined that the detected face is not a face on the left side when viewed from the vehicle imaging camera 10 (NO in St65-5), the vehicle imaging camera 10 registers the face image to have an attribute as a passenger (for example, a person on a passenger seat) (St65-6). After step St65-6, the process illustrated in FIG. 6A is finished.

On the other hand, in a case where it is determined that the detected face is a face on the left side when viewed from the vehicle imaging camera 10 (YES in St65-5), the vehicle imaging camera 10 registers the face image to have an attribute as a driver (St65-7). After step St65-7, the process illustrated in FIG. 6A is finished.

In FIG. 6B, the vehicle imaging camera 10 (for example, the processor 11) detects an occupant's face from a captured video (in-vehicle face video), and generates a face image obtained by cutting out the portion of the face reflected in the in-vehicle face video (St65-1). The vehicle imaging camera 10 detects a steering wheel in the vehicle from the in-vehicle face video (St65-8), and determines whether or not the steering wheel detected in step St65-8 is present near the face detected in step St65-1 (St65-9).

In a case where it is determined that the steering wheel is not present near the face (NO in St65-9), the vehicle imaging camera 10 registers the face image to have an attribute as a passenger (for example, a person on a passenger seat) (St65-6). After step St65-6, the process illustrated in FIG. 6B is finished.

On the other hand, in a case where it is determined that the steering wheel is present near the face (YES in St65-9), the vehicle imaging camera 10 registers the face image to have an attribute as a driver (St65-7). After step St65-7, the process illustrated in FIG. 6B is finished. Consequently, through the process in FIG. 6A or 6B, it can be appropriately determined whether a face reflected in an in-vehicle face video is an occupant's face or a passenger's face in the analysis process (for example, FIGS. 5A to 5D) performed by the vehicle imaging camera 10 or the video accumulation/analysis server 50. Therefore, an effect is expected in which intensive retrieval can be performed in the video accumulation/analysis server 50, and thus the operator OP1 operating the client terminal 90 can easily narrow a suspect. For example, in a case where retrieval using retrieval conditions including attributes of a "driver" and a "passenger" cannot be performed, there is a high probability that both an in-vehicle face video in which a suspect is a "driver" and an in-vehicle face video in which the identical suspect is a "passenger" are retrieval targets such that a large number of retrieval results are extracted, and thus it takes time to narrow the suspect. However, since retrieval including attributes of a "driver" and a "passenger" as retrieval conditions can be performed, only an in-vehicle face video in a case where a suspected person is a "driver" can be narrowed to a retrieval target, and thus the accuracy of a retrieval result is improved.

Next, with reference to FIGS. 7 to 12, and 14 to 16B, description will be made of various screen examples displayed on the display unit 93 of the client terminal 90 in police investigation using the vehicle monitoring system 1. In description of FIGS. 7 to 12, and 14 to 16B, the same constituent element as a constituent element illustrated in the drawings will be given the same reference numeral, and description thereof will be simplified or omitted.

In police investigation, the client terminal 90 is starting and executing a vehicle monitoring application that is installed in advance, through an operator's operation. The vehicle monitoring application is store in, for example, the ROM of the memory 92 of the client terminal 90, and is executed by the processor PRC2 when started through the operator's operation. Data or information generated by the processor PRC2 during starting of the vehicle monitoring application is temporarily preserved in the RAM of the memory 92.

Figure 7:
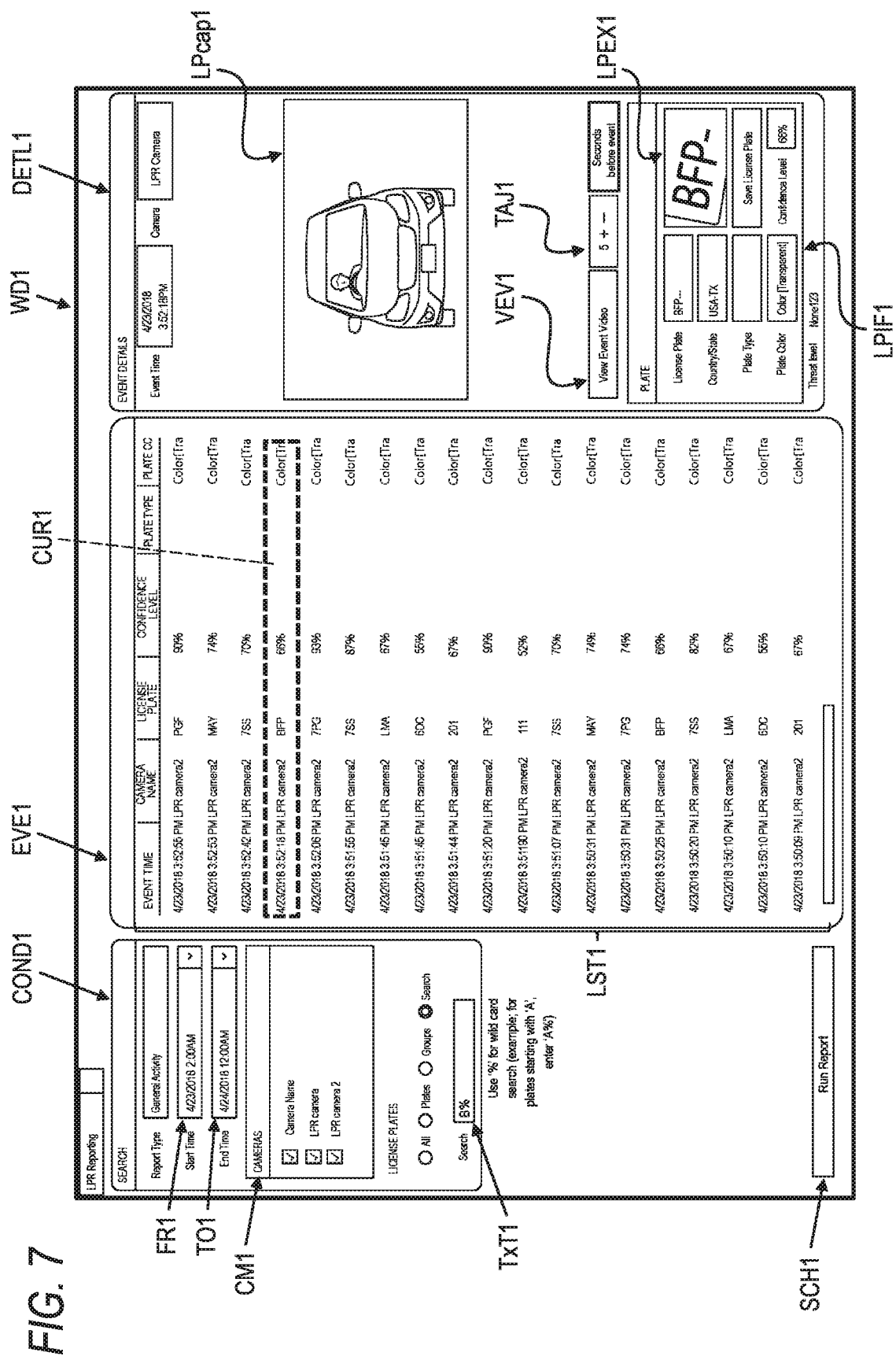
FIG. 7 is a diagram illustrating a monitoring screen example of a captured video in the daytime mode.

FIG. 7 is a diagram illustrating a monitoring screen example of a captured video in the daytime mode. As illustrated in FIG. 7, a monitoring screen WD1 includes at least a display region of an entry field COND1 to which a retrieval condition is entered, a display region of a list display field EVE1 in which retrieval results of events (for example, vehicles) satisfying a retrieval condition are displayed in a list form, a display region of a details display field DETL1 in which details of an event selected with a cursor CUR1 are displayed, and a retrieval icon SCH1.

The entry field COND1 includes, for example, a start time entry field FR1, an end time entry field TO1, a camera selection field CM1, and a text entry field TXT1 for a retrieval target number plate.

Figure 8:
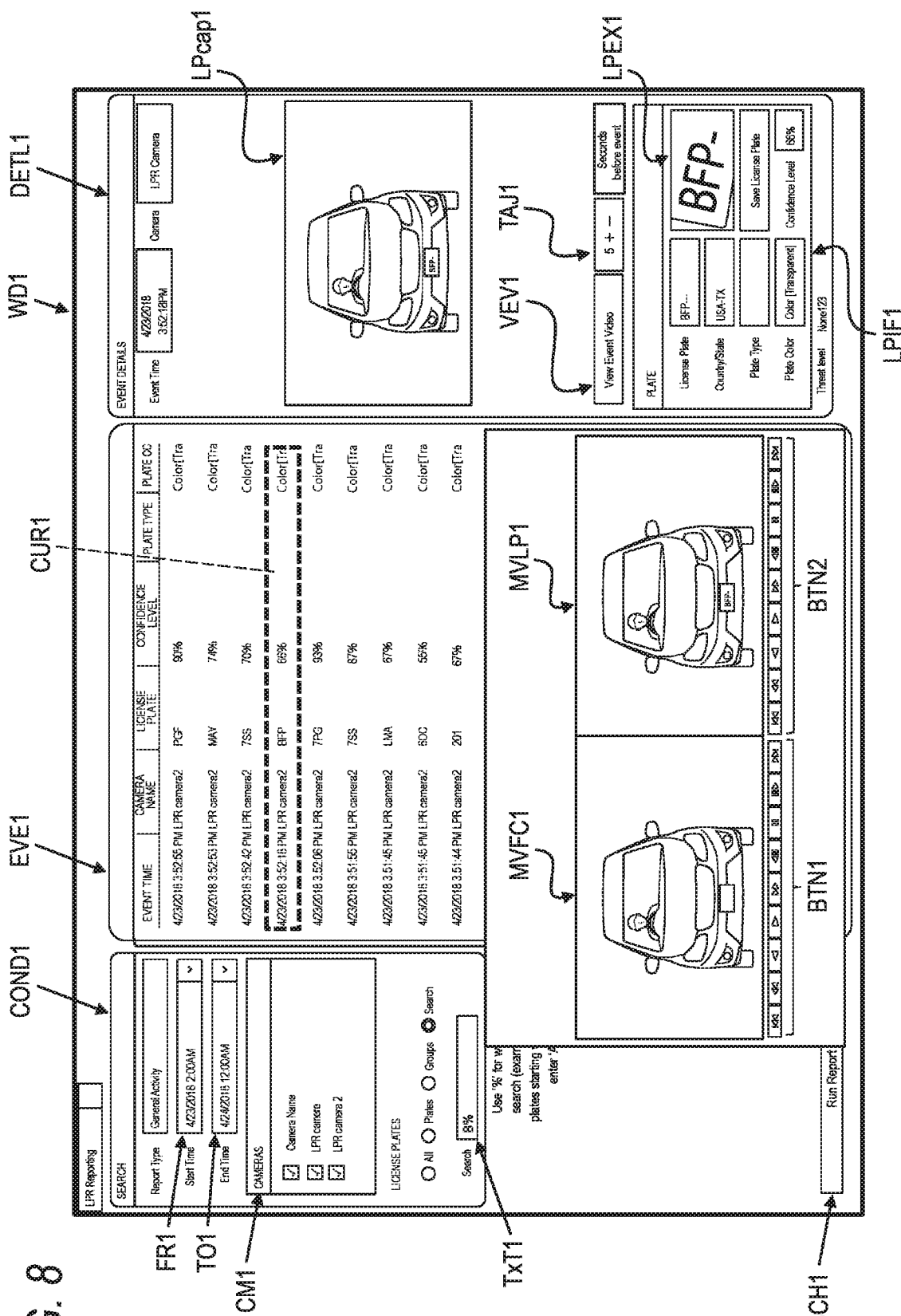
FIG. 8 is a diagram illustrating an example of a monitoring screen displaying a moving image reproduction screen in the daytime mode on which an in-vehicle occupant is clearly reflected and a moving image reproduction screen in the daytime mode on which a number plate is clearly reflected.
Figure 9:
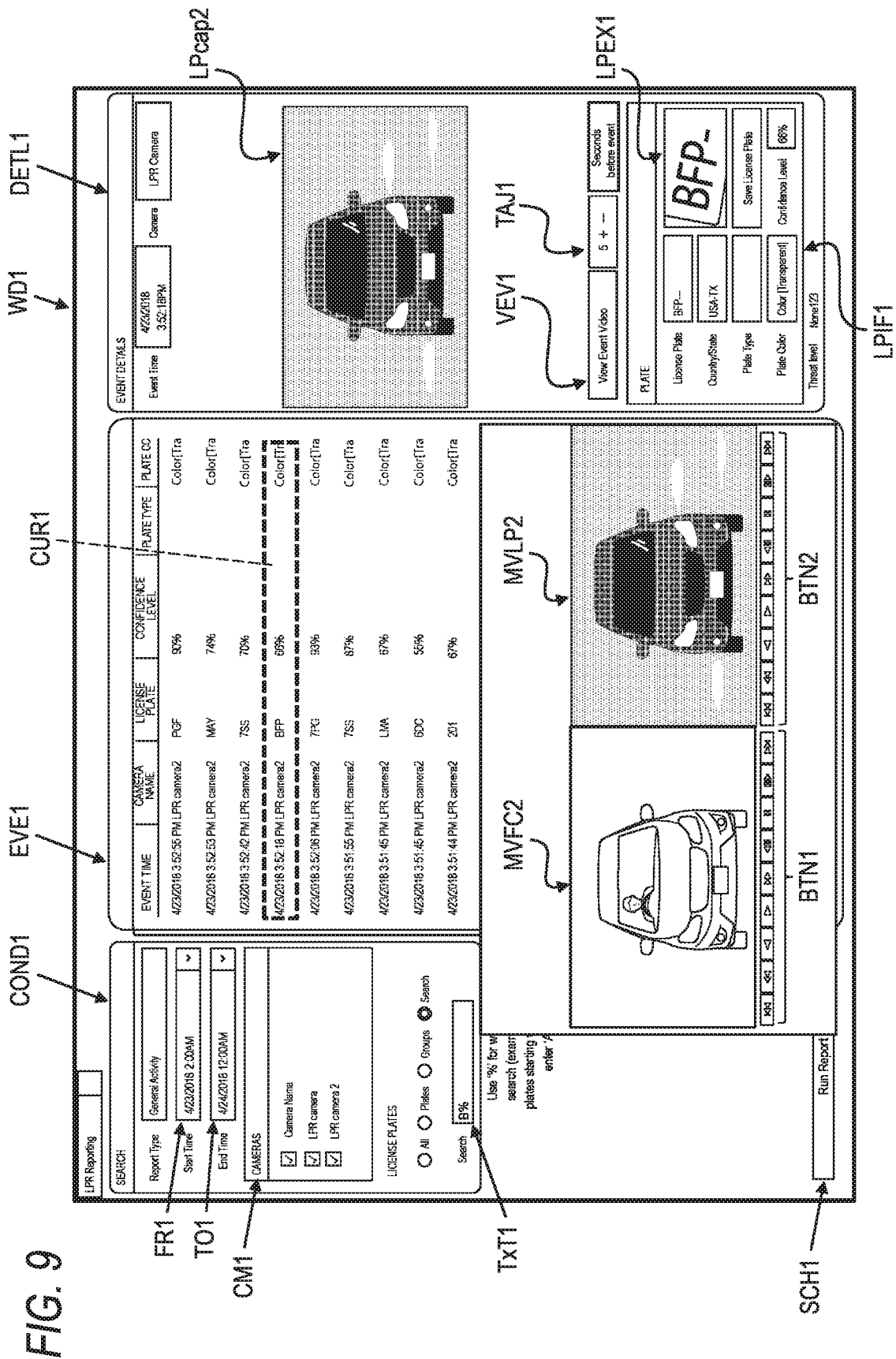
FIG. 9 is a diagram illustrating an example of a monitoring screen displaying a moving image reproduction screen in the nighttime mode on which an occupant in a vehicle is clearly reflected and a moving image reproduction screen in the nighttime mode on which a number plate is clearly reflected.

The date and time of starting of the presence of a retrieval target runaway vehicle are entered to the start time entry field FR1 through an operation of the operator OP1 in order to cause the video accumulation/analysis server 50 to retrieve the runaway vehicle of a suspect. For example, the date and time of the occurrence of a case or the like or the date and time immediately before the date and time are entered to the start time entry field FR1. FIGS. 7 to 9 illustrate an example in which "2:00 AM on Apr. 23, 2018" is entered to the start time entry field FR1. In a case where the date and time are entered through an operation of the operator OP1, the vehicle monitoring application sets the date and time entered to the start time entry field FR1 as a retrieval condition (for example, start date and time).

The date and time of ending of the presence of a retrieval target runaway vehicle are entered to the end time entry field TO1 through an operation of the operator OP1 in order to cause the video accumulation/analysis server 50 to retrieve the runaway vehicle of a suspect. For example, end date and time of a retrieval period for a runaway vehicle are entered to the end time entry field TO1. FIGS. 7 to 9 illustrate an example in which "12:00 AM on Apr. 24, 2018" is entered to the end time entry field TO1. In a case where the date and time are entered through an operation of the operator OP1, the vehicle monitoring application sets the date and time entered to the end time entry field TO1 as a retrieval condition (for example, end date and time).

In the camera selection field CM1, a vehicle imaging camera at a location where the retrieval target runaway vehicle is predicted to be reflected is designated through an operation of the operator OP1 in order to cause the video accumulation/analysis server 50 to retrieve the runaway vehicle of the suspect.

Text data regarding a number plate of the retrieval target runaway vehicle is entered to the text entry field TXT1 through an operation of the operator OP1 in order to cause the video accumulation/analysis server 50 to retrieve the number plate of the runaway vehicle of the suspect. As illustrated in FIG. 7, in the text entry field TXT1, the character "%" may be used for wild card search, and, for example, a note is displayed in which "A%" is entered in retrieval of a number plate starting with the character "A".

The retrieval icon SCH1 is displayed by the vehicle monitoring application to be able to be pressed at the time at which various retrieval conditions in the entry field COND1 entered through the operations of the operator OP1 are all appropriately entered. In a case where the retrieval icon SCH1 is pressed through an operation of the operator OP1, the vehicle monitoring application detects the pressing, generates a vehicle number plate retrieval request including the entered various retrieval conditions, and sends the request to the video accumulation/analysis server 50 via the communication unit 91. The vehicle monitoring application receives number plate retrieval results from the video accumulation/analysis server 50, and displays the retrieval results in the list display field EVE1.

A plurality of retrieval results each including at least, for example, the date and time on which the number plate was detected by the number detection/collation core 51, the name of a camera used to detect the number plate, and a reading result (text data) of the number plate (license plate) are arranged in a list form in the list display field EVE1.

In a case where any one is selected with the cursor CUR1 from among the plurality of retrieval results arranged in a list form through an operation of the operator OP1, the vehicle monitoring application displays details information (including a number plate image) regarding the selected retrieval result in the details display field DETL1. Specifically, the vehicle monitoring application displays the date and time of detection of the number plate selected with the cursor CUR1, the name of the camera used to detect the number plate, a number plate image LPcap1 in which the whole vehicle corresponding to the detected number plate is reflected, number plate attribute information LPIF1 including a number plate cutout image LPEX1, an event moving image viewer icon VEV1 (refer to FIGS. 8 and 9), and a period designation icon TAJ1 (refer to FIGS. 8 and 9) in correlation with each other.

The number plate attribute information LPIF1 includes the number plate reading result (text data) and the number plate cutout image LPEX1, a country name or a state name, a color of the number plate, and a score (similarity) during retrieval (specifically, number plate collation). Consequently, the operator OP1 just selects a suspected number plate from the list display field EVE1, and can thus visually recognize detailed information regarding the number plate along with the number plate image LPcap1 in which a vehicle attached with the number plate is reflected such that the efficiency of investigation can be improved.

FIG. 8 is a diagram illustrating a monitoring screen example of displaying a moving image reproduction screen MVFC1 in the daytime mode in which an in-vehicle occupant is clearly reflected and a moving image reproduction screen MVLP1 in the daytime mode in which a number plate is clearly reflected. FIG. 9 is a diagram illustrating a monitoring screen example of displaying a moving image reproduction screen MVFC2 in the nighttime mode in which an in-vehicle occupant is clearly reflected and a moving image reproduction screen MVLP2 in the nighttime mode in which a number plate is clearly reflected. The monitoring screen WD1 illustrated in FIGS. 8 and 9 are also displayed on the display unit 93 of the client terminal 90 in the same manner as the monitoring screen WD1 illustrated in FIG. 7.

The vehicle monitoring application displays the moving image reproduction screens MVFC1 and MVLP1 for an in-vehicle face video and a number plate video captured at the substantially same time (for example, during the daytime mode) by the same vehicle imaging camera 10 corresponding to the number plate image LPcap1 through the operator's operation of pressing the event moving image viewer icon VEV1 in a state in which any one retrieval result (that is, the number plate) is selected with the cursor CUR1 (refer to FIG. 8). The vehicle monitoring application can set moving image reproduction periods for the in-vehicle face video and the number plate video with the period designation icon TAJ1, and FIG. 8 illustrates that "5 seconds" is displayed as a moving image reproduction period. The vehicle monitoring application displays operation control icons BTN1 and BTN2 such as a play, a pause, a fast forward, and a fast rewind of the moving image reproduction screens MVFC1 and MVLP1.

In FIG. 8, the moving image reproduction screens MVFC1 and MVLP1 for videos (specifically, an in-vehicle face video and a number plate video) captured by the vehicle imaging camera 10 in the daytime mode are displayed. Consequently, the in-vehicle face video in the moving image reproduction screen MVFC1 is reproduced such that a face of an in-vehicle occupant (for example, a driver) is clearly reflected even though the surrounding is bright in a daytime period, and thus it is possible to efficiently assist the operator OP1 in recognizing the face of the occupant in an early stage. On the other hand, the number plate video in the moving image reproduction screen MVLP1 is reproduced such that a number plate of a vehicle is clearly reflected even though the surrounding is bright in a daytime period, and thus it is possible to efficiently assist the operator OP1 in recognizing the number plate in an early stage.

The vehicle monitoring application displays the moving image reproduction screens MVFC2 and MVLP2 for an in-vehicle face video and a number plate video captured at the substantially same time (for example, during the nighttime mode) by the same vehicle imaging camera 10 corresponding to the number plate image LPcap2 through the operator's operation of pressing the event moving image viewer icon VEV1 in a state in which any one retrieval result (that is, the number plate) is selected with the cursor CUR1 (refer to FIG. 9). The vehicle monitoring application can set moving image reproduction periods for the in-vehicle face video and the number plate video with the period designation icon TAJ1, and FIG. 9 illustrates that "5 seconds" is displayed as a moving image reproduction period. The vehicle monitoring application displays the operation control icons BTN1 and BTN2 such as a play, a pause, a fast forward, and a fast rewind of the moving image reproduction screens MVFC2 and MVLP2.

In FIG. 9, the moving image reproduction screens MVFC2 and MVLP2 for videos (specifically, an in-vehicle face video and a number plate video) captured by the vehicle imaging camera 10 in the nighttime mode are displayed. Consequently, the in-vehicle face video in the moving image reproduction screen MVFC2 is reproduced such that a face of an in-vehicle occupant (for example, a driver) is clearly reflected even though the surrounding is dark in a nighttime period, and thus it is possible to efficiently assist the operator OP1 in recognizing the face of the occupant in an early stage. The number plate video in the moving image reproduction screen MVLP2 is reproduced such that a number plate of a vehicle is clearly reflected even though the surrounding is dark in a nighttime period, and thus it is possible to efficiently assist the operator OP1 in recognizing the number plate in an early stage.

(Retrieval of Face Image Based on Number Plate)

Figure 10:
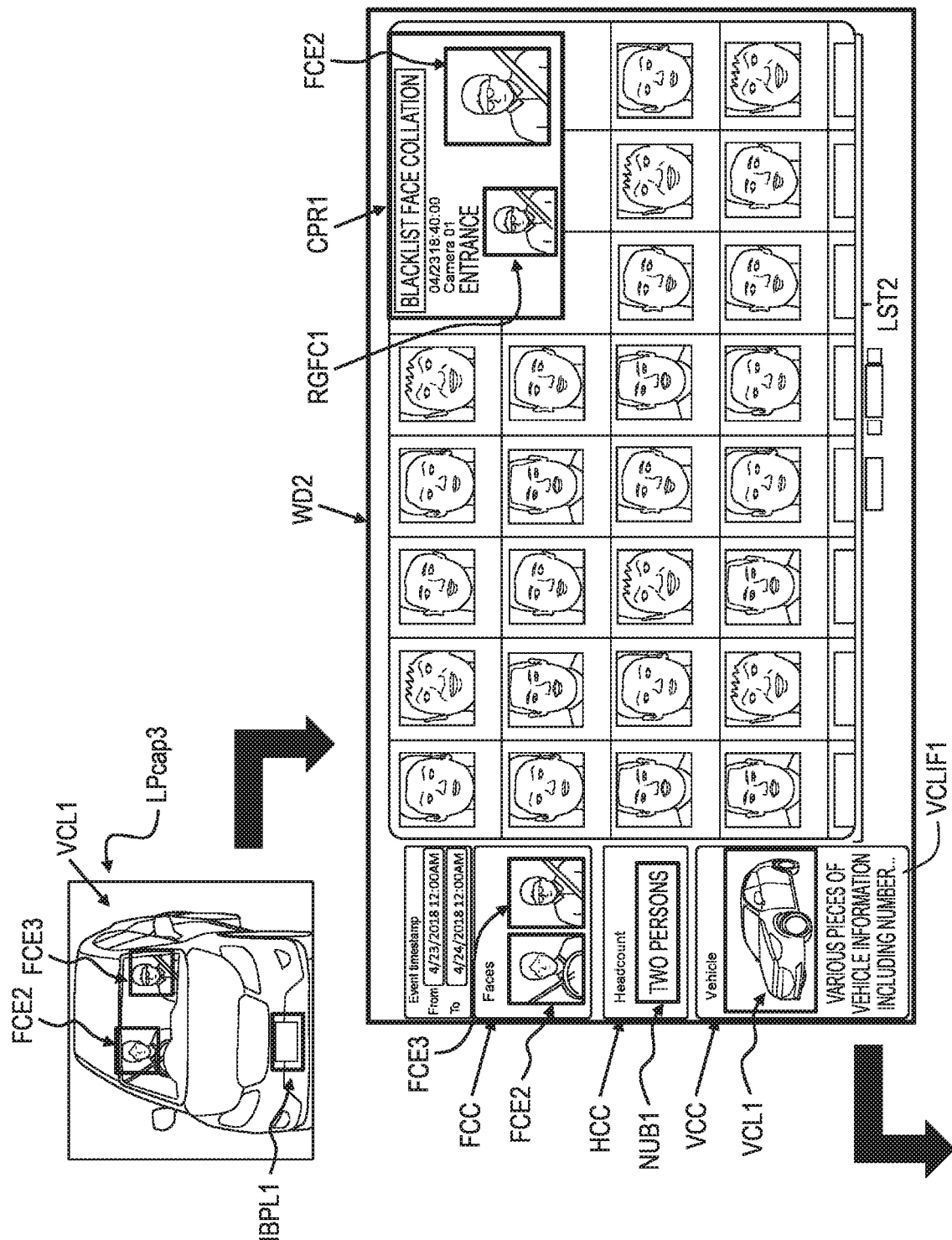
FIG. 10 is a diagram illustrating an example of a monitoring screen displaying a retrieval result of a face image of an in-vehicle occupant using a number plate that is input as a retrieval condition.
Figure 11A:
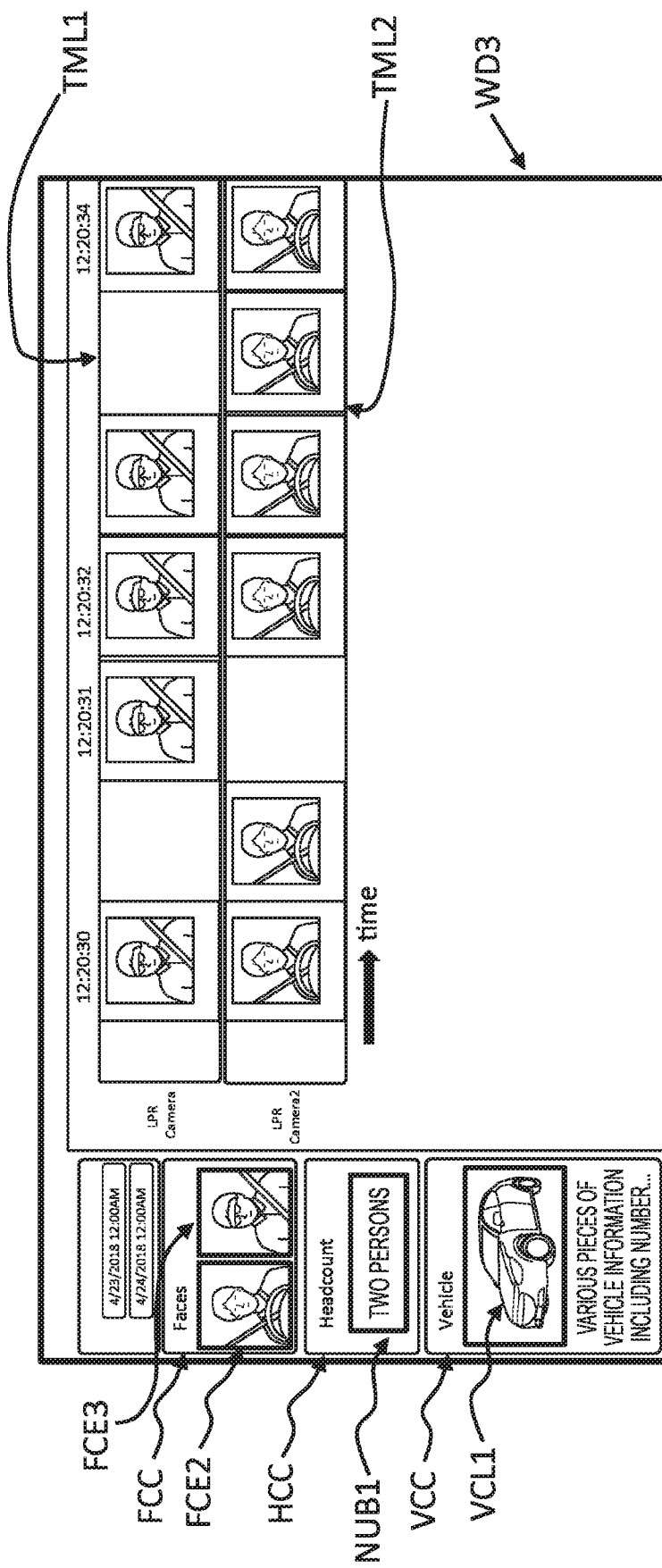
FIG. 11A is a diagram illustrating a first example of a retrieval result screen displayed subsequently to the monitoring screen in FIG. 10.
Figure 11B:
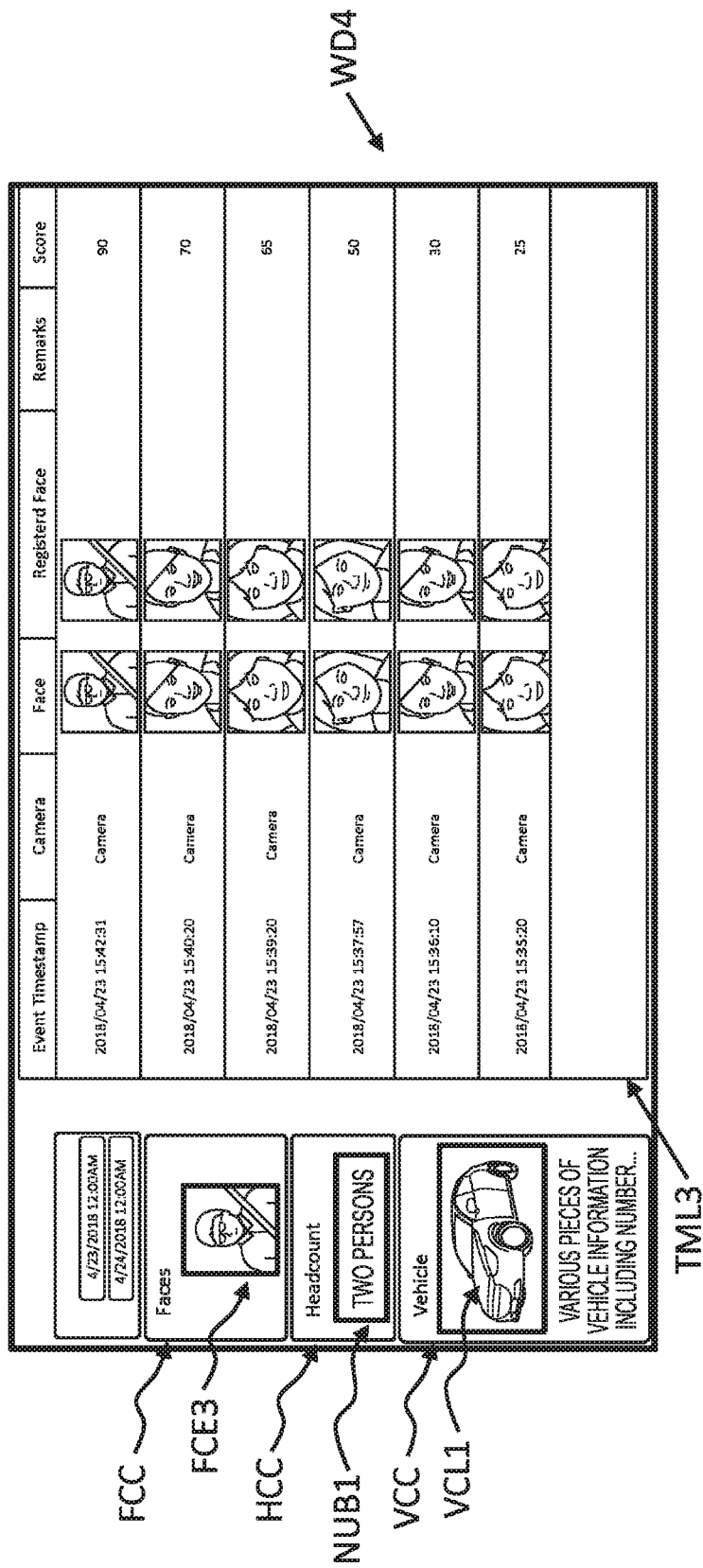
FIG. 11B is a diagram illustrating a second example of a retrieval result screen displayed subsequently to the monitoring screen in FIG. 10.
Figure 12:
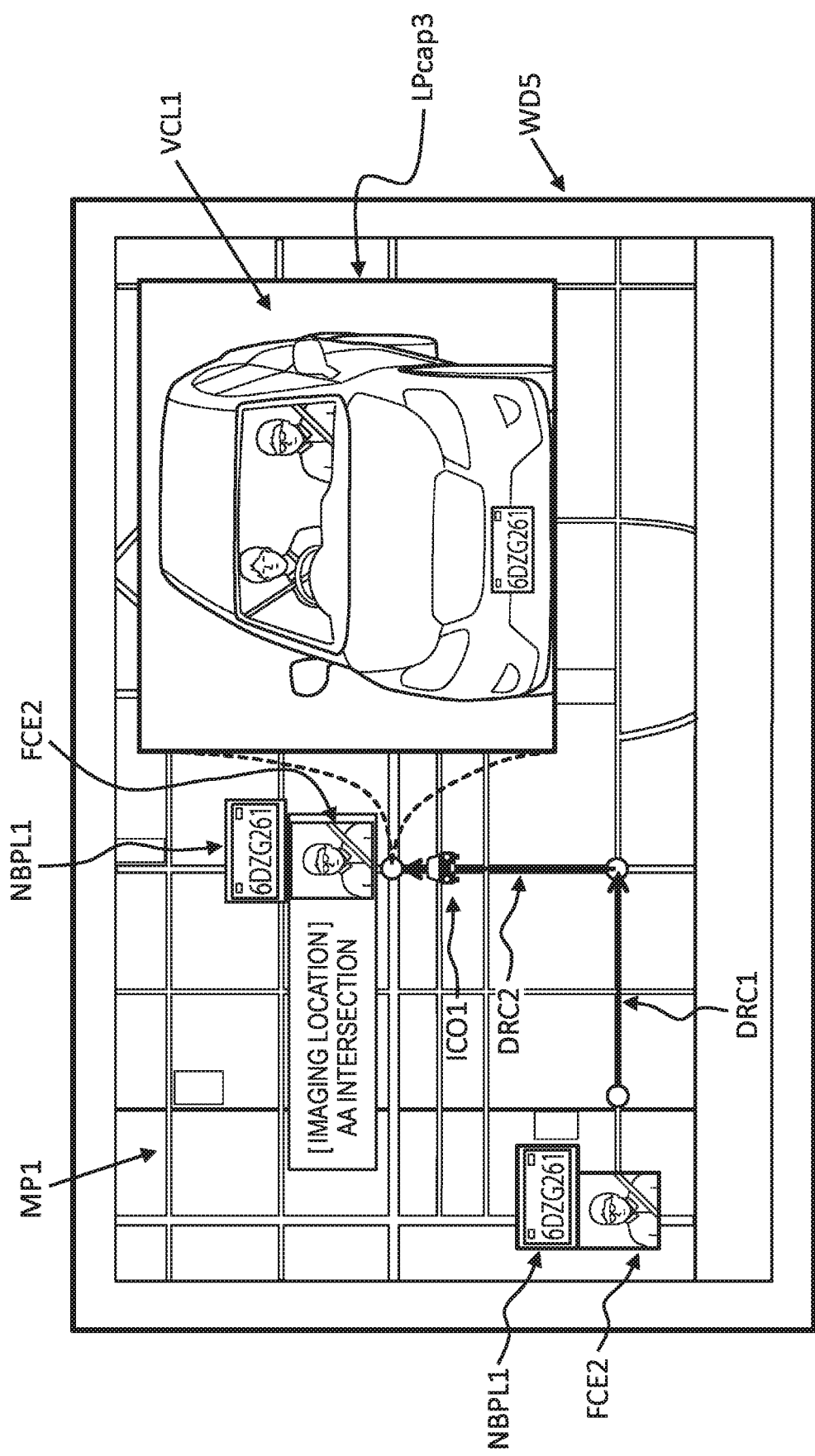
FIG. 12 is a diagram illustrating a third example of a retrieval result screen displayed subsequently to the monitoring screen in FIG. 10.

FIG. 10 is a diagram illustrating an example of a monitoring screen displaying a retrieval result of a face image of an in-vehicle occupant using a number plate that is input as a retrieval condition. FIG. 11A is a diagram illustrating a first example of a monitoring screen displayed subsequently to the monitoring screen in FIG. 10. FIG. 11B is a diagram illustrating a second example of a monitoring screen displayed subsequently to the monitoring screen in FIG. 10. FIG. 12 is a diagram illustrating a third example of a monitoring screen displayed subsequently to the monitoring screen in FIG. 10. The monitoring screens respectively illustrated FIGS. 10 to 12 are examples of retrieval result screens displayed on the client terminal 90 in a sequence diagram of FIG. 13.

A captured video illustrated in FIG. 10 is a number plate image LPcap3 captured under a first imaging condition appropriate for imaging a number plate NBPL1, and is used to retrieve a face image based on a number plate. For example, two occupants (specifically, a driver and a passenger) are riding on the vehicle VCL1 reflected in the number plate image LPcap3.

In a case where the number plate image LPcap3 displayed on the display unit 93 of the client terminal 90 is viewed, the operator OP1 may want to retrieve face images FCE2 and FCE3 of the occupants riding on the vehicle VCL1 having the number plate NBPL1. An operation procedure in the vehicle monitoring system 1 in a case of retrieving the face images FCE2 and FCE3 of the occupants in the vehicle VCL1 by using the number plate NBPL1 will be described in detail with reference to FIG. 13 which will be described later. In a case where such retrieval is performed, a retrieval result screen WD2 illustrated in FIG. 10 is displayed on the display unit 93 of the client terminal 90.

The retrieval result screen WD2 illustrated in FIG. 10 includes at least a start time entry field for start date and time and an end time entry field for end date and time, the start date-and-time information and the end date and time being used for retrieval, a face image display field FCC displaying face images as retrieval results, a number-of-occupants measurement result display field HCC displaying the number of occupants as a retrieval result, a vehicle details information display field VCC, and a plurality of candidate persons' face images list display field LST2. The start time entry field and the end time entry field are respectively the same as the start time entry field FR1 and the end time entry field TO1 illustrated in FIG. 7, and thus description thereof will be omitted here.

A face image of a person having the highest score (that is, similarity) as a result of retrieving a face image of an occupant of a vehicle by using a number plate is displayed in the face image display field FCC. In the example illustrated in FIG. 10, the face images FCE2 and FCE3 of occupants of the vehicle VCL1 in the number plate image LPcap3 are displayed.

A measurement result NUB1 of the number of occupants of the vehicle VCL1 in the number plate image LPcap3 is displayed in the number-of-occupants measurement result display field HCC. In the example illustrated in FIG. 10, "two persons" is displayed to correspond to the number of face images displayed in the face image display field FCC.

A snapshot (for example, a captured image configuring the number plate image LPcap3) of the vehicle VCL1 in the number plate image LPcap3 and various pieces of vehicle information VCLIF1 (including the number plate NBPL1) regarding the vehicle VCL1 are displayed in the vehicle details information display field VCC. The vehicle information VCLIF1 includes, for example, data (hereinafter, referred to as "vehicle registration information") such as an owner of a vehicle registered in the Land Transport Bureau or the like, information indicating whether or not the vehicle is a stolen vehicle, information indicating the presence or absence of the past accident, and vehicle inspection information, and is not limited thereto.

A list of face images of a plurality of candidate persons which may be the occupant of the vehicle VCL1 in the number plate image LPcap3 is displayed in the candidate persons' face images list display field LST2. In a case where a matching face image is identified from the face collation list (refer to the database 57) in the process of collating face images of the occupant of the vehicle VCL1 in the number plate image LPcap3 with each other (refer to FIG. 13), the vehicle monitoring application may display a popup screen CPR1. The popup screen CPR1 displays a face image RGFC1 registered in the face collation list, the face image FCE2 reflected in the number plate image LPcap3, the imaging date and time and a camera ID (in other words, information regarding an installation position of the corresponding vehicle imaging camera 10) of the vehicle imaging camera 10 having captured the number plate image LPcap3, in order to present, to the operator OP1, that the face image FCE2 is registered in the face collation list (for example, a blacklist in which face images of ex-convicts or the like are registered).

A retrieval result screen WD3 illustrated in FIG. 11A is displayed by the vehicle monitoring application due to an operation of the operator OP1 on the retrieval result screen WD2. The retrieval result screen WD3 includes at least a start time entry field for start date and time and an end time entry field for end date and time, the start date-and-time information and the end date and time being used for retrieval, the face image display field FCC displaying face images as retrieval results, the number-of-occupants measurement result display field HCC displaying the number of occupants as a retrieval result, the vehicle details information display field VCC, and time line display fields TML1 and TML2.

The time line display field TML1 displays, in a time series, the date and time on which a person corresponding to a face image (for example, the face image FCE3) displayed in the face image display field FCC was detected by the vehicle imaging camera. In the example illustrated in FIG. 11A, the person corresponding to the face image FCE3 is detected between "12:20:30" and "12:20:34" by a vehicle imaging camera having the name of "LPR Camera".

The time line display field TML2 displays, in a time series, the date and time on which a person corresponding to a face image (for example, the face image FCE2) displayed in the face image display field FCC was detected by the vehicle imaging camera. In the example illustrated in FIG. 11A, the person corresponding to the face image FCE2 is detected between "12:20:30" and "12:20:34" by a vehicle imaging camera having the name of "LPR Camera2".

A retrieval result screen WD4 illustrated in FIG. 11B is displayed by the vehicle monitoring application due to an operation of the operator OP1 on the retrieval result screen WD2. The retrieval result screen WD4 includes at least a start time entry field for start date and time and an end time entry field for end date and time, the start date-and-time information and the end date and time being used for retrieval, the face image display field FCC displaying face images as retrieval results, the number-of-occupants measurement result display field HCC displaying the number of occupants as a retrieval result, the vehicle details information display field VCC, and a time line display field TML3. The retrieval result screen WD4 exemplifies a case where only the face image FCE3 is identified as a face image as a retrieval result.

The time line display field TML3 displays, in a time series, the date and time on which a person corresponding to a face image (for example, the face image FCE3) displayed in the face image display field FCC was detected by each of a plurality of vehicle imaging cameras, a face image (limited to a case where the face image is registered) registered in the face collation list, and a score (similarity) regarding the detection in correlation with each other. In the example illustrated in FIG. 11B, the person corresponding to the face image FCE3 is detected with the score "90" by a vehicle imaging camera having the name of "LPR Camera" at "15:42:31 on Apr. 23, 2018". The person corresponding to the face image FCE3 is detected with the score "70" by a vehicle imaging camera having the name of "LPR Camera2" at "15:40:20 on Apr. 23, 2018". The person corresponding to the face image FCE3 is detected with the score "65" by the vehicle imaging camera having the name of "LPR Camera" at "15:30:20 on Apr. 23, 2018". The person corresponding to the face image FCE3 is detected with the score "50" by the vehicle imaging camera having the name of "LPR Camera2" at "15:37:57 on Apr. 23, 2018". The person corresponding to the face image FCE3 is detected with the score "30" by the vehicle imaging camera having the name of "LPR Camera" at "15:36:10 on Apr. 23, 2018". The person corresponding to the face image FCE3 is detected with the score "25" by the vehicle imaging camera having the name of "LPR Camera" at "15:35:20 on Apr. 23, 2018".

A retrieval result screen WD5 illustrated in FIG. 12 is displayed by the vehicle monitoring application due to an operation of the operator OP1 on the retrieval result screen WD2. The retrieval result screen WD5 displays escape routes DRC1 and DRC2 of the vehicle VCL1 in the number plate image LPcap3 to be superimposed on road map data MP1 along with a vehicle icon ICO1 indicating the vehicle VCL1. In a case where it is detected that any one of intersections (refer to circular marks in FIG. 12) where the vehicle imaging cameras are provided is designated through an operation of the operator OP1, the vehicle monitoring application may display a moving image reproduction screen for the number plate image LPcap3 immediately before the vehicle passes through the designated intersection to be superimposed on the retrieval result screen WD5.

In a case where it is detected that the escape route DRC1 is designated through an operation of the operator OP1, the vehicle monitoring application may display the number plate NBPL1 and the face image FCE2 of the driver reflected in the number plate image LPcap3 captured by a vehicle imaging camera provided at an intersection corresponding to a start point or an end point of the escape route DRC1 to be superimposed on each other. Similarly, in a case where it is detected that the escape route DRC2 is designated through an operation of the operator OP1, the vehicle monitoring application may display the number plate NBPL1 and the face image FCE2 of the driver reflected in the number plate image LPcap3 captured by a vehicle imaging camera provided at an intersection corresponding to a start point or an end point of the escape route DRC2 to be superimposed on each other. In this case, the vehicle monitoring application may display a balloon indicating the name of an imaging location corresponding to an installation location of the vehicle imaging camera on the road map data MP1.

Figure 13:
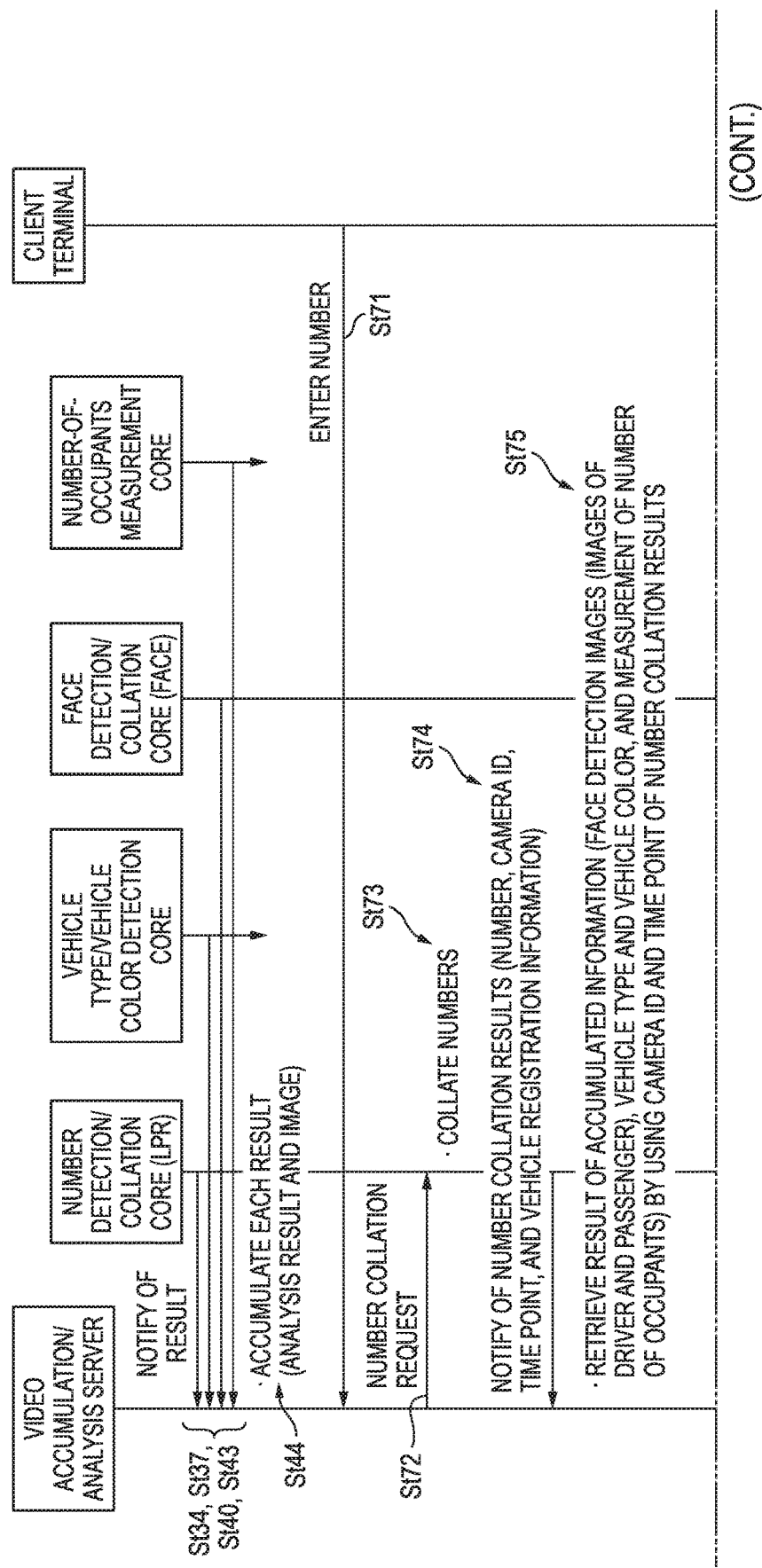
FIG. 13 is a sequence diagram illustrating an example of a series of operation procedures of retrieving a face image of an in-vehicle occupant by using a number plate that is input as a retrieval condition.

Next, with reference to FIG. 13, a description will be made of a series of operation procedures of retrieving a face image of an in-vehicle occupant by using a number plate in the vehicle monitoring system 1 according to Embodiment 1. FIG. 13 is a sequence diagram illustrating an example of a series of operation procedures of retrieving a face image of an in-vehicle occupant by using a number plate that is input as a retrieval condition. In the description of FIG. 13, similarly, a configuration of a vehicle imaging camera exemplifies the configuration of the vehicle monitoring system 1 illustrated in FIG. 1A, and a configuration of a vehicle imaging camera exemplifies the configuration of the vehicle imaging camera 10. In the description of FIG. 13, it is assumed that, for example, as illustrated in FIG. 5A, whenever a number plate video or an in-vehicle face video is received, the video accumulation/analysis server 50 acquires a result of a number plate collation process, detection results of a vehicle type and a vehicle color, a result of a face collation process, and a measurement result of the number of occupants, based on the number plate video or the in-vehicle face video (St34, St37, St40, and St43), and accumulates the results (St44).

In FIG. 13, in a case where a number plate (for example, the number plate NBPL1) that is input through an operation of the operator OP1 is input as a retrieval condition (St71), the video accumulation/analysis server 50 receives a retrieval request (including an image of the number plate NBPL1) sent from the client terminal 90. In response to the reception of the retrieval request, the video accumulation/analysis server 50 (for example, the processor PRC1) sends a number collation request for instructing a collation process for the number plate NBPL1 to be executed to the number detection/collation core 51 (St72). The number detection/collation core 51 collates the number plate NBPL1 with the number collation list preserved in the database 57 (St73). The number detection/collation core 51 notifies the video accumulation/analysis server 50 of results (for example, the number plate NBPL1, a camera ID, an imaging time point, and vehicle registration information (refer to the above description)) of the number plate collation process (St74).

The video accumulation/analysis server 50 retrieves (extracts) corresponding accumulated information (for example, the face image of the detected driver or passenger, the vehicle type and the vehicle color, and the result of the number of occupants) from the accumulated results of the various processes accumulated in step St44 on the basis of the camera ID and the imaging time point included in the processing results obtained in step St74 (St75).

The video accumulation/analysis server 50 sends the face image of the driver or the passenger extracted in step St75 and a face collation request to the face detection/collation core 53 (St76). The face detection/collation core 53 collates the face image of the driver or the passenger with the face collation list preserved in the database 57 (St77). The face detection/collation core 53 notifies the video accumulation/analysis server 50 of results (for example, a score, a camera ID, and a list of imaging time points) of the face collation process (St78).

The video accumulation/analysis server 50 lists scores and accumulated results associated with the camera IDs and the imaging time points of which notifications are sent in steps St74 and St78 (St79). The video accumulation/analysis server 50 sends a result list including the accumulated results (for example, number information, vehicle registration information, a face image, a face collation result, information regarding a vehicle type and a vehicle color, and information regarding the number of occupants) to the client terminal 90 as a retrieval result along with the scores (St80). The client terminal 90 displays the retrieval result screen WD2 (for example, refer to FIG. 10) by using the retrieval result sent in step St80 (St81).

(Retrieval of Number Plate Based on Face Image)

Figure 14:
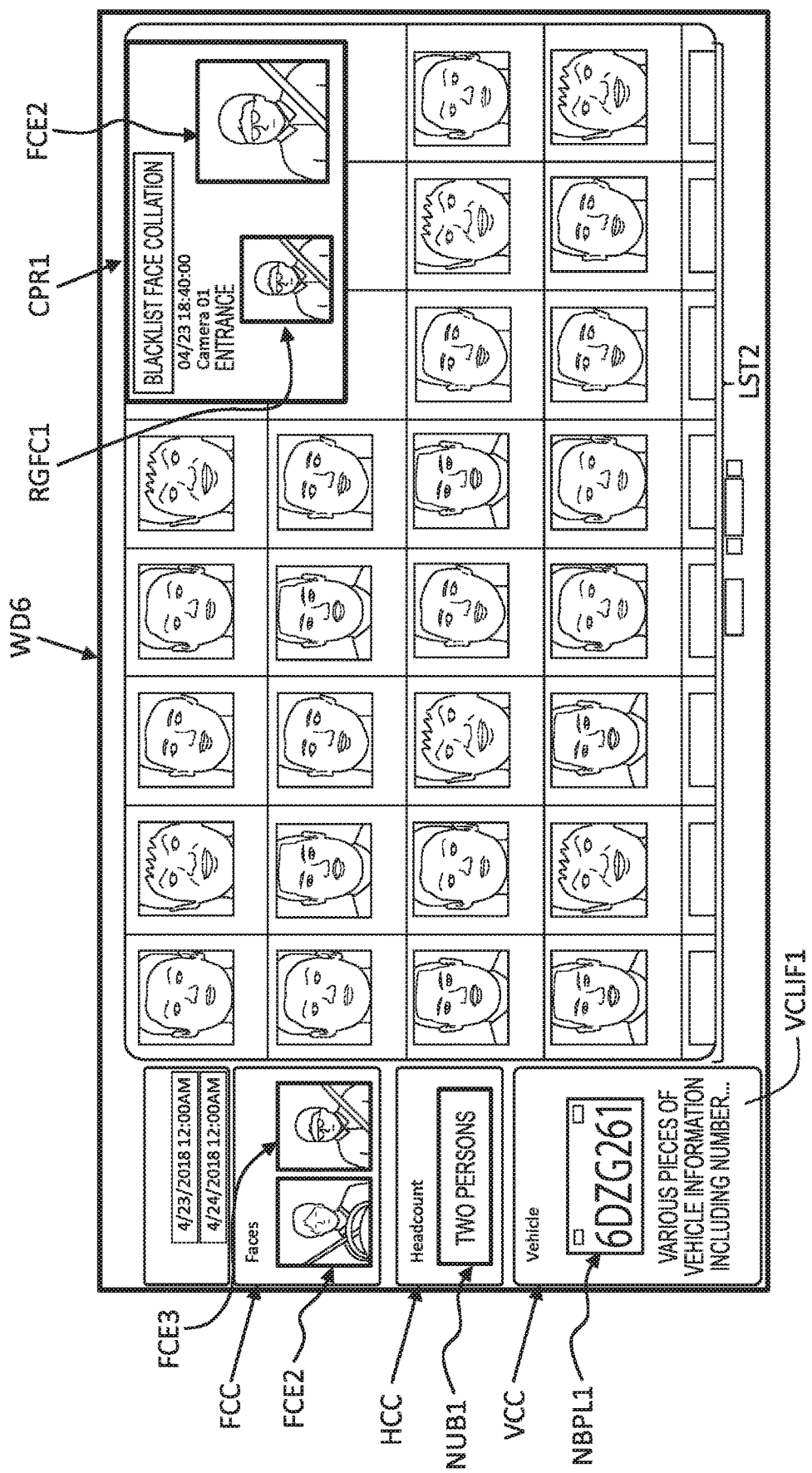
FIG. 14 is a diagram illustrating an example of a retrieval result screen displaying a retrieval result of a number plate that is retrieved by using a face image of an in-vehicle occupant that is input as a retrieval condition.
Figure 15:
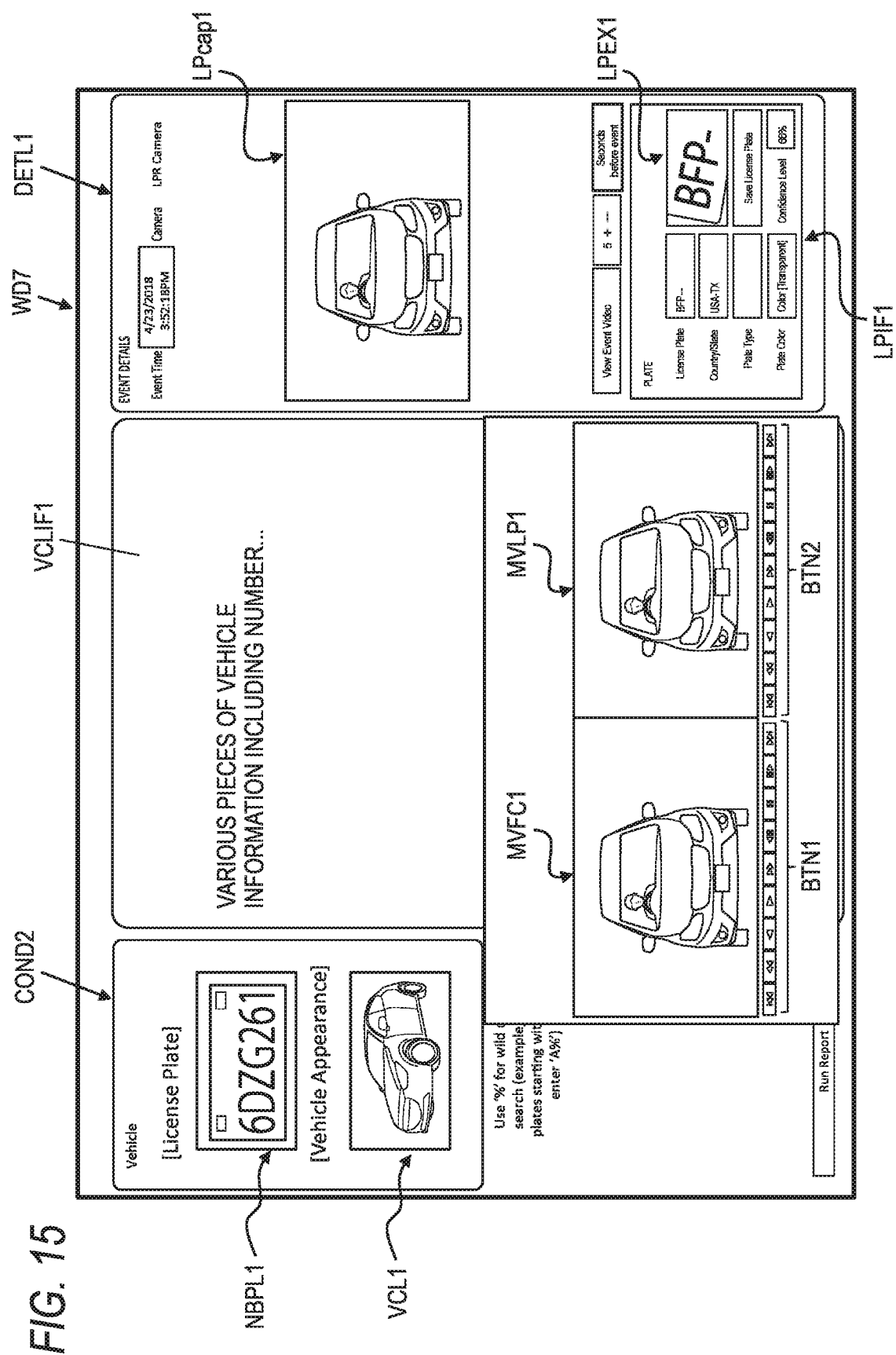
FIG. 15 is a diagram illustrating a first example of a retrieval result screen displayed subsequently to the retrieval result screen in FIG. 14.

FIG. 14 is a diagram illustrating an example of a retrieval result screen displaying a retrieval result of a number plate that is retrieved by using a face image of an in-vehicle occupant that is input as a retrieval condition. FIG. 15 is a diagram illustrating a first example of a retrieval result screen displayed subsequently to the retrieval result screen in FIG. 14. FIG. 16A is a diagram illustrating a second example of a retrieval result screen displayed subsequently to the retrieval result screen in FIG. 14. FIG. 16B is a diagram illustrating a third example of a retrieval result screen displayed subsequently to the retrieval result screen in FIG. 14. Monitoring screens respectively illustrated in FIGS. 14 to 16B are examples of retrieval result screens displayed on the client terminal 90 in a sequence diagram of FIG. 17.

A captured video illustrated in FIG. 14 may be an in-vehicle face video captured under a second imaging condition appropriate for capturing a face image, and the in-vehicle face video is used to retrieve a number plate based on a face image. For example, two occupants (specifically, a driver and a passenger) are riding on the vehicle VCL1 reflected in the in-vehicle face video.

In a case where the in-vehicle face video displayed on the display unit 93 of the client terminal 90 is viewed, the operator OP1 may want to retrieve a number plate of the vehicle VCL1 including the face images FCE2 and FCE3. An operation procedure in the vehicle monitoring system 1 in a case of retrieving the number plate NBPL1 of the vehicle VCL1 by using the face images FCE2 and FCE3 will be described in detail with reference to FIG. 17 which will be described later. In a case where such retrieval is performed, a retrieval result screen WD6 illustrated in FIG. 14 is displayed on the display unit 93 of the client terminal 90.

Figure 17:
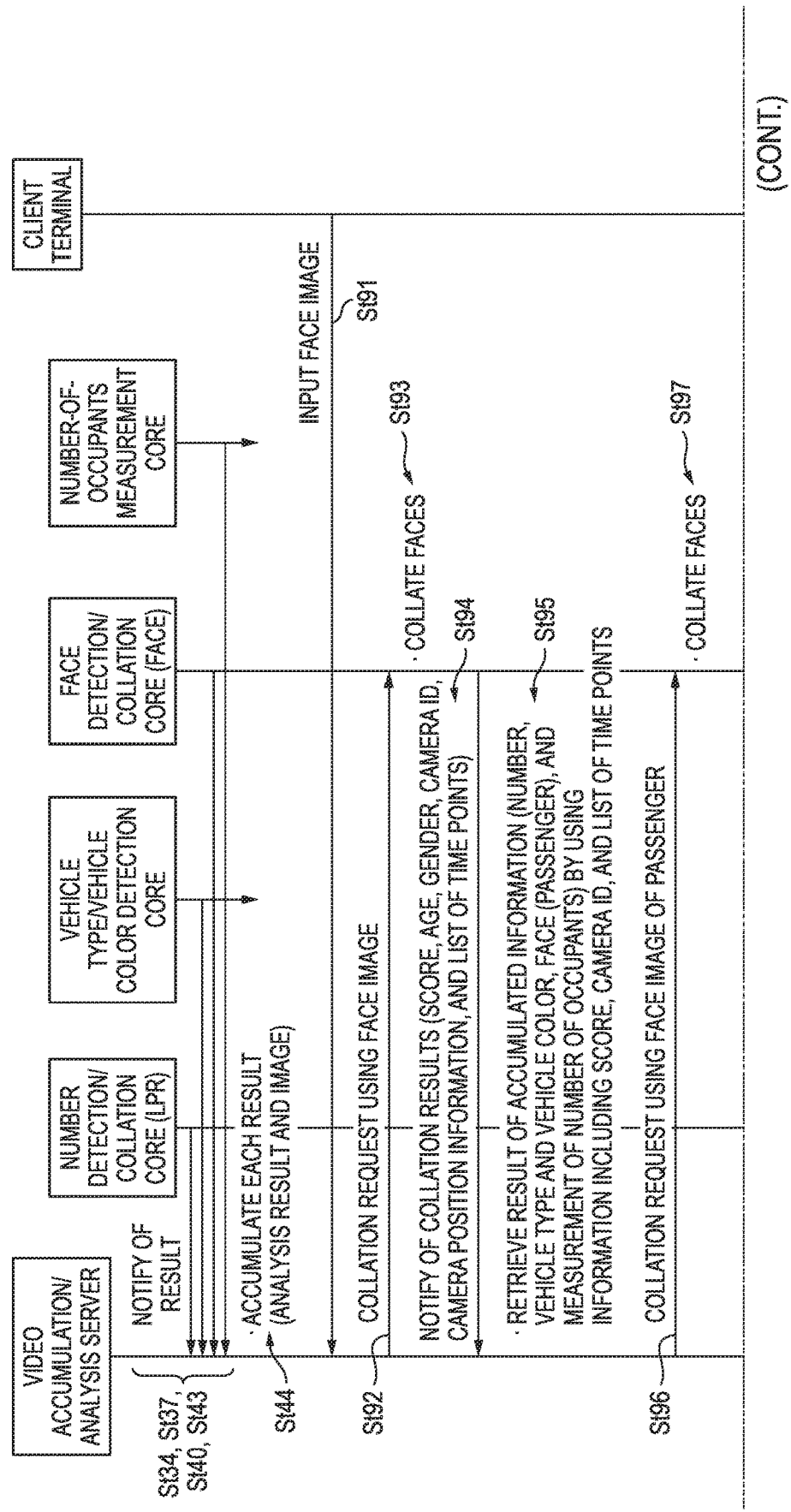
FIG. 17 is a sequence diagram illustrating an example of a series of operation procedures of retrieving a number plate by using a face image of an in-vehicle occupant that is input as a retrieval condition.

The retrieval result screen WD6 illustrated in FIG. 14 includes at least a start time entry field for start date and time and an end time entry field for end date and time, the start date-and-time information and the end date and time being used for retrieval, a face image display field FCC displaying face images that are input as retrieval conditions, a number-of-occupants measurement result display field HCC displaying the number of occupants as a retrieval result, a vehicle details information display field VCC, and a plurality of candidate persons' face images list display field LST2 displaying face images of a plurality of candidate persons extracted in a face collation process (refer to FIG. 17). The start time entry field and the end time entry field are respectively the same as the start time entry field FR1 and the end time entry field TO1 illustrated in FIG. 7, and thus description thereof will be omitted here.

The face image display field FCC displays a face image that is image data which is input as a retrieval condition. In the example illustrated in FIG. 14, the face images FCE2 and FCE3 of the occupants of the vehicle VCL1 in the in-vehicle face video (refer to the above description) are displayed.

The vehicle details information display field VCC displays various pieces of vehicle information VCLIF1 regarding the vehicle VCL1 reflected in the in-vehicle face video, including the number plate NBPL1 as a retrieval result of a number plate using the face images.

A list of face images of a plurality of candidate persons which may be the occupant of the vehicle VCL1 in the in-vehicle face video (refer to the above description) is displayed in the candidate persons' face images list display field LST2. In the same manner as in FIG. 10, in a case where a matching face image is identified from the face collation list (refer to the database 57) in the process of collating face images of the occupant of the vehicle VCL1 in the in-vehicle face video with each other (refer to FIG. 17), the vehicle monitoring application may display the popup screen CPR1. Details of the popup screen CPR1 have been described with reference to FIG. 10, and thus description thereof will be omitted here.

A retrieval result screen WD7 illustrated in FIG. 15 is displayed by the vehicle monitoring application due to an operation of the operator OP1 on the retrieval result screen WD6. The retrieval result screen WD7 includes at least a vehicle basic information display field COND2 including the number plate NBPL1 and the vehicle VCL1 as retrieval results, the vehicle information VCLIF1, a number plate details display field DETL1, and the moving image reproduction screens MVFC1 and MVLP1. In the same manner as in FIG. 7, an image (refer to the number plate image LPcap1) of the vehicle VCL1 attached with the number plate NBPL1 is displayed in the number plate details display field DETL1. A content of the number plate attribute information LPIF1 is the same as the content described with reference to FIG. 7, and thus description thereof will be omitted here. Similarly, contents of the moving image reproduction screens MVFC1 and MVLP1 are the same as the contents described with reference to FIG. 8 (or FIG. 9), and thus description thereof will be omitted here.

A retrieval result screen WD8 illustrated in FIG. 16A is displayed by the vehicle monitoring application due to an operation of the operator OP1 on the retrieval result screen WD6. The retrieval result screen WD8 displays the vehicle basic information display field COND2 including the number plate NBPL1 and the vehicle VCL1 as retrieval results, and a vehicle list display field LST3 for images of vehicles respectively attached with a plurality of number plate candidates extracted in a number plate collation process (refer to FIG. 17). In a case where it is detected that any one vehicle image is designated from the vehicle list display field LST3 through an operation of the operator OP1, the vehicle monitoring application may display various pieces of vehicle information regarding the designated vehicle image with a balloon.

A retrieval result screen WD9 illustrated in FIG. 16B is displayed by the vehicle monitoring application due to a designation operation of the operator OP1 on any vehicle image in the retrieval result screen WD8. The retrieval result screen WD9 includes at least a start time entry field for start date and time and an end time entry field for end date and time, the start date-and-time information and the end date and time being used for retrieval, the face image display field FCC displaying face images that are input as retrieval conditions, the number-of-occupants measurement result display field HCC displaying the number of occupants as a retrieval result, the vehicle details information display field VCC, and the time line display fields TML1 and TML2.

The time line display field TML1 displays, in a time series, the date and time on which a vehicle corresponding to any one vehicle image designated on the retrieval result screen WD8 is detected by the vehicle imaging camera. In the example illustrated in FIG. 16B, the vehicle in the selected vehicle image is detected between "12:20:30" and "12:20:34" by a vehicle imaging camera having the name of "LPR Camera".

The time line display field TML2 displays, in a time series, the date and time on which a vehicle corresponding to any one vehicle image designated on the retrieval result screen WD8 is detected by the vehicle imaging camera. In the example illustrated in FIG. 16B, the vehicle in the selected vehicle image is detected between "12:20:30" and "12:20:34" by a vehicle imaging camera having the name of "LPR Camera2". The vehicle monitoring application may display the same screen as the retrieval result screen WD5 in FIG. 12 on the display unit 93 due to an operation of the operator OP1 on the retrieval result screen WD6.

Next, with reference to FIG. 17, a description will be made of a series of operation procedures of retrieving a number plate by using a face image of an in-vehicle occupant in the vehicle monitoring system 1 according to Embodiment 1. FIG. 17 is a sequence diagram illustrating an example of a series of operation procedures of retrieving a number plate by using a face image of an in-vehicle occupant that is input as a retrieval condition. In the description of FIG. 17, similarly, a configuration of a vehicle imaging camera exemplifies the configuration of the vehicle monitoring system 1 illustrated in FIG. 1A, and a configuration of a vehicle imaging camera exemplifies the configuration of the vehicle imaging camera 10. In the description of FIG. 17, it is assumed that, for example, as illustrated in FIG. 5A, whenever a number plate video or an in-vehicle face video is received, the video accumulation/analysis server 50 acquires a result of a number plate collation process, detection results of a vehicle type and a vehicle color, a result of a face collation process, and a measurement result of the number of occupants, based on the number plate video or the in-vehicle face video (St34, St37, St40, and St43), and accumulates the results (St44).

In FIG. 17, in a case where a face image (for example, the face image FCE2) that is input through an operation of the operator OP1 is input as a retrieval condition (St91), the video accumulation/analysis server 50 receives a retrieval request (including the face image FCE2) sent from the client terminal 90. In response to the reception of the retrieval request, the video accumulation/analysis server 50 (for example, the processor PRC1) sends a face collation request for instructing a collation process for the face image FCE2 to be executed to the face detection/collation core 53 (St92). The face detection/collation core 53 collates the face image FCE2 with the face collation list preserved in the database 57 (St93). The face detection/collation core 53 notifies the video accumulation/analysis server 50 of a list of results (for example, a score, an age, a gender, a camera ID, camera position information, and an imaging time point) of the face collation process (St94). The age and the gender may be determined in a face detection process.

The video accumulation/analysis server 50 retrieves (extracts) corresponding accumulated information (for example, the number plate, the vehicle type and the vehicle color, the face image of the passenger in a case where there is the passenger, and the result of the number of occupants) from the accumulated results of the various processes accumulated in step St44 on the basis of the score, the camera ID, and the imaging time point included in the processing results obtained in step St94 (St95).

The video accumulation/analysis server 50 sends the face image of the passenger extracted in step St95 and a face collation request to the face detection/collation core 53 (St96). The face detection/collation core 53 collates the face image of the passenger with the face collation list preserved in the database 57 (St97). The face detection/collation core 53 notifies the video accumulation/analysis server 50 of results (for example, a score, an age, a gender, a camera ID, camera position information, and a list of imaging time points) of the face collation process (St98).

The video accumulation/analysis server 50 sends a number collation request for instructing a collation process for the number plate extracted in step St95 to be executed to the number detection/collation core 51 (St99). The number detection/collation core 51 collates the number plate with the number collation list preserved in the database 57 (St100). The number detection/collation core 51 notifies the video accumulation/analysis server 50 of results (for example, the number plate, a camera ID, an imaging time point, and vehicle registration information (refer to the above description)) of the number plate collation process (St101).

The video accumulation/analysis server 50 (for example, the processor PRC1) lists scores and accumulated results associated with the camera IDs and the imaging time points of which notifications are sent in steps St94, St98, and St101 (St102). The video accumulation/analysis server 50 sends a result list including the accumulated results (for example, number information, vehicle registration information, information regarding the number of occupants, and the face image of the passenger) to the client terminal 90 as a retrieval result along with the scores (St103). The client terminal 90 displays the retrieval result screen WD6 (for example, refer to FIG. 14) by using the retrieval result sent in step St103 (St104).

As mentioned above, the vehicle monitoring system 1 according to Embodiment 1 includes at least one vehicle imaging camera 10, and the video accumulation/analysis server 50 that is communicably connected to the client terminal 90. The vehicle imaging camera 10 can image a number and an occupant's face of a vehicle entering an angle of view thereof, and transmits a captured video in which the number of the vehicle and the occupant's face are reflected to the video accumulation/analysis server 50. The video accumulation/analysis server 50 acquires an analysis result of the number, analysis results of the type and a color of the vehicle, an analysis result of the occupant's face, and an analysis result of the number of occupants on the basis of the captured video, and accumulates as analysis results of the captured video. The video accumulation/analysis server 50 sends the analysis result of the number, the analysis results of the type and a color of the vehicle, the analysis result of the occupant's face, and the analysis result of the number of occupants to the client terminal 90 in correlation with a snapshot of the captured video of the vehicle.

Consequently, the vehicle monitoring system 1 can identify unique features (for example, a number plate of a vehicle, a face image of an occupant of the vehicle, a vehicle type and a vehicle color of the vehicle, and the number of occupants) of a runaway vehicle on which a suspect having caused a case or the like is riding with high efficiency. Therefore, the vehicle monitoring system 1 can assist prompt identification of a suspect on the basis of an appearance of the suspect and the features of the runaway vehicle by using the unique features (refer to the above description) of the runaway vehicle, and can thus improve convenience of police investigation.

The video accumulation/analysis server 50 includes the database 57 preserving the number collation list in which a number of an investigation target vehicle is registered, and collates whether or not number information is registered in the number collation list in a case where the number information that is input as a retrieval condition is received from the client terminal 90. The video accumulation/analysis server 50 extracts a face image of an occupant of a vehicle, the type and a color of the vehicle, and the number of occupants corresponding to the number information by using a collation result of the number information and an analysis result of the captured video, and displays the extracted results on the client terminal 90. Consequently, the client terminal 90 can present a face image of an occupant riding on a vehicle corresponding to a number plate to the operator OP1 on the basis of information regarding the number plate that is input through an operation of the operator OP1 by using the vehicle imaging camera 10 that can substantially simultaneously image the number plate and a face of the in-vehicle occupant of the vehicle as a subject.

The video accumulation/analysis server 50 extracts a face image of each of a driver and a passenger of a vehicle, and displays the face images on the client terminal 90. Consequently, the client terminal 90 can present not only a driver (for example, a main culprit in a case or the like) but also a passenger (for example, an accomplice in the case or the like) on a passenger seat as occupants riding on a vehicle corresponding to a number plate that is input as a retrieval condition, to the operator OP1, without omission, and can thus improve investigation efficiency.

The video accumulation/analysis server 50 preserves the face collation list in which a face image and person information of an investigation target person are registered in the database 57, and displays person information of an occupant corresponding to a face image on the client terminal 90 in a popup form according to a collation result indicating that the face image of the occupant of a vehicle corresponding to number information is registered in the face collation list. Consequently, in a case where an occupant of a vehicle corresponding to a number plate that is input as a retrieval condition is identified as a criminal such as an ex-convict registered in a blacklist, the client terminal 90 can explicitly present such a fact to the operator OP1.

The video accumulation/analysis server 50 includes the database 57 preserving the face collation list in which a face image and person information of an investigation target person are registered, and collates whether or not a face image is registered in the face collation list in a case where the face image that is input as a retrieval condition is received from the client terminal 90. The video accumulation/analysis server 50 extracts a number of a vehicle, the type and a color of the vehicle, and the number of occupants corresponding to a face image by using a collation result of the face image and an analysis result of a captured video, and displays the extracted results on the client terminal 90. Consequently, the client terminal 90 can present a number plate of a vehicle on which a person corresponding to a face image is riding to the operator OP1 on the basis of the face image that is input through an operation of the operator OP1 by using the vehicle imaging camera 10 that can substantially simultaneously image the number plate and a face of the in-vehicle occupant of the vehicle as a subject.

The video accumulation/analysis server 50 collates whether or not a face image of a passenger of a vehicle corresponding to a face image is registered in the face collation list, and displays a collation result on the client terminal 90 along with a number of a vehicle, the type and a color of the vehicle, and the number of occupants. Consequently, the video accumulation/analysis server 50 can collect a larger number of number plate candidates by also taking into consideration a case where a main culprit (for example, a driver) and an accomplice (for example, a passenger) of a case or the like perform driving by turns on the run, and can thus extract number plates of runaway vehicles of a suspect group (main culprits and accomplices) without omission.

The video accumulation/analysis server 50 includes the database 57 preserving the number collation list in which a number of an investigation target vehicle is registered, and collates whether or not a detection result of a number of a vehicle is registered in the number collation list. In a case where the detection result of the number of the vehicle is registered in the number collation list, or analysis results of the type and a color of the vehicle satisfy a predetermined condition (for example, in a case where there is the hit), the video accumulation/analysis server 50 analyzes an occupant's face and the number of occupants on the basis of a captured video. Consequently, the operator OP1 can recognize that various results of processes such as analysis on a video captured by the vehicle imaging camera 10 are accumulated in the database 57 of the video accumulation/analysis server 50 and can thus also visually check contents thereof via the display unit 93 of the client terminal 90.

The vehicle imaging camera 10 includes a database (for example, the memory 12) preserving the number collation list in which a number of an investigation target vehicle is registered, and collates whether or not a detection result of a number of a vehicle is registered in the number collation list. The video accumulation/analysis server 50 receives a notification of a collation result from the vehicle imaging camera 10, then analyzes the type and a color of the vehicle on the basis of a captured video, and analyzes an occupant's face and the number of occupants on the basis of a captured video in a case where the detection result of the number of the vehicle is registered in the number collation list, or analysis results of the type and a color of the vehicle satisfy a predetermined condition (for example, in a case where there is the hit). Consequently, the operator OP1 operating the client terminal 90 can recognize that various results of processes such as analysis on a video captured by the vehicle imaging camera 10 are accumulated in the database 57 of the video accumulation/analysis server 50 and can thus also visually check contents thereof via the display unit 93 of the client terminal 90. Since the number plate collation process can be executed in the vehicle imaging camera 10 compared with the operation procedure in FIG. 5A, various processes on a video captured by the vehicle imaging camera 10 can be distributed to the vehicle imaging camera 10 and the video accumulation/analysis server 50, and thus it is possible to reduce a processing load on the video accumulation/analysis server 50.

The vehicle imaging camera 10 includes a database (for example, the memory 12) preserving the number collation list in which a number of an investigation target vehicle is registered, and collates whether or not a detection result of a number of a vehicle is registered in the number collation list. The vehicle imaging camera 10 analyzes the type and a color of the vehicle on the basis of a captured video, and analyzes an occupant's face and the number of occupants on the basis of a captured video in a case where the detection result of the number of the vehicle is registered in the number collation list, or analysis results of the type and a color of the vehicle satisfy a predetermined condition (for example, in a case where there is the hit), and transmits an analysis result of the button, analysis results of the type and the color of the vehicle, an analysis result of the occupant's face, and an analysis result of the number of occupants to the video accumulation/analysis server 50. Consequently, the operator OP1 operating the client terminal 90 can recognize that various results of processes such as analysis on a video captured by the vehicle imaging camera 10 are accumulated in the database 57 of the video accumulation/analysis server 50 and can thus also visually check contents thereof via the display unit 93 of the client terminal 90. Since various processes such as number plate collation, detection of a vehicle type and a vehicle color, face collation, and measurement of the number of occupants can be executed in the vehicle imaging camera 10 compared with the operation procedures in FIGS. 5A and 5B, the high performance vehicle imaging camera 10 is used, and thus it is possible to remarkably reduce a processing load on the video accumulation/analysis server 50.

The vehicle imaging camera 10 detects a number of a vehicle on the basis of a captured video, sends a number image obtained by cutting out the number of the vehicle to the video accumulation/analysis server 50, detects an occupant's face of the vehicle on the basis of the captured video, and sends a face image obtained by cutting out the occupant's face to the video accumulation/analysis server 50. The video accumulation/analysis server 50 includes the database 57 preserving the number collation list in which a number of an investigation target vehicle is registered, and collates whether or not the number image is registered in the number collation list and analyzes the type and a color of the vehicle and the number of occupants on the basis of the captured video in response to reception of the number image, and analyzes the occupant's face on the basis of the captured video in response to reception of the face image. Consequently, the operator OP1 operating the client terminal 90 can recognize that various results of processes such as analysis on a video captured by the vehicle imaging camera 10 are accumulated in the database 57 of the video accumulation/analysis server 50 and can thus also visually check contents thereof via the display unit 93 of the client terminal 90. A number plate image and a face image that are targets of collation processes with the number collation list and the face collation list are generated by cutting out only a corresponding number plate and face from captured videos, and thus it is possible to reduce loads of a number plate collation process and a face collation process.

In the vehicle monitoring system 1 according to Embodiment 1, the vehicle imaging camera 10 performs imaging while switching a first imaging condition including an image parameter appropriate for imaging a number of a vehicle entering an angle of view thereof and a second imaging condition including an image parameter appropriate for imaging an occupant's face of the vehicle. The vehicle imaging camera 10 transmits a first captured video (for example, a number plate video) under the first imaging condition and a second captured video (for example, an in-vehicle face video) under the second imaging condition, to the video accumulation/analysis server 50. The video accumulation/analysis server 50 arranges reproduction screens for the first captured video and the second captured video that are reproduceable in the client terminal 90 and displays the reproduction screens on the client terminal 90 on the basis of the first captured video and the second captured video (for example, refer to FIG. 8 or 9).

Consequently, the vehicle monitoring system 1 displays the moving image reproduction screen MVLP1 for a number plate video and the moving image reproduction screen MVFC1 for an in-vehicle face video, the number plate video and the in-vehicle face video captured at the substantially same time by the vehicle imaging camera 10, on the client terminal 90, and can thus assisting a police officer in identifying unique features (for example, a number plate of a vehicle, a face image of an occupant of the vehicle, a vehicle type and a vehicle color of the vehicle, and the number of occupants) of a runaway vehicle on which a suspect having caused a case or the like is riding in an early stage and visually. Therefore, the vehicle monitoring system 1 can improve convenience of police investigation.

The video accumulation/analysis server 50 arranges and displays reproduction screens for the first captured video and the second captured video on which a reproduction operation and a temporary stop operation are possible in the client terminal 90, on the client terminal 90. Consequently, the operator OP1 can perform temporary stop during reproduction of moving images of a number plate video, an in-vehicle face video, or both thereof by operating the client terminal 90, and can thus stop the moment suspected by the operator OP1 to check details thereof.

The video accumulation/analysis server 50 further displays a number analysis result including a cutout number image obtained by cutting out the number on the basis of the first captured video, and a snapshot of the first captured video on the client terminal 90. Consequently, the operator OP1 can check details of a number plate at first sight to immediately understand information regarding a runaway vehicle of a suspect, and thus it is possible to improve investigation efficiency.

An image parameter in the first imaging condition is an exposure time equal to or less than a first reference value (default value) or a gain value equal to or smaller than a second reference value. An image parameter in the second imaging condition is an exposure time more than the first reference value (default value) or a gain value greater than the second reference value. Consequently, the vehicle imaging camera 10 uses the image parameter in the first imaging condition, and can thus capture a high resolution number plate video under the first imaging condition appropriate for characteristics (for example, the use of a highly reflective material) of a number plate. Similarly, the vehicle imaging camera 10 uses the image parameter in the second imaging condition, and can thus capture a high resolution in-vehicle face video under the second imaging condition appropriate for characteristics (for example, an occupant's face viewed through a windshield) of the in-vehicle face video.

The vehicle imaging camera 10 includes the illuminance sensor S1 that can detect the brightness of the surrounding, and the nighttime short-wavelength lighting 16 that irradiates the surrounding with IR light, and switches an operation mode to a daytime mode or a nighttime mode on the basis of a detection result from the illuminance sensor S1. During the nighttime mode, the vehicle imaging camera 10 applies IR light having an intensity less than a third reference value (default value) from the nighttime short-wavelength lighting 16, and also applies IR light having an intensity more than the third reference value (default value) from the nighttime short-wavelength lighting 16. Consequently, a face of an in-vehicle occupant (for example, a driver) is clearly reflected even though the surrounding is dark in a nighttime period, and thus it is possible to efficiently assist the operator OP1 in recognizing the face of the occupant in an early stage. The number plate video in the moving image reproduction screen MVLP2 is reproduced such that a number plate of a vehicle is clearly reflected even though the surrounding is dark in a nighttime period, and thus it is possible to efficiently assist the operator OP1 in recognizing the number plate in an early stage.

In a case where an instruction for updating the image parameter in the first imaging condition or the second imaging condition is received in response to a user's operation on the client terminal 90 on which a reproduction screen for the first captured video and a reproduction screen for the second captured video are displayed, the video accumulation/analysis server 50 sends the instruction for updating the image parameter to the vehicle imaging camera 10. The vehicle imaging camera 10 updates the corresponding image parameter in response to the instruction for updating the image parameter. Consequently, the vehicle imaging camera 10 can generate an in-vehicle face image captured on the basis of image parameters appropriate for imaging a face of an occupant in a vehicle and can generate a number plate image captured on the basis of image parameters appropriate for imaging a number plate by switching the image parameters for the in-vehicle face image and the image parameters for the number plate image every frame.

The video accumulation/analysis server 50 causes the client terminal 90 to reproduce the first captured video and the second captured video generated by the vehicle imaging camera 10 at the substantially same time (including the same time). Consequently, an in-vehicle face video in the moving image reproduction screen MVFC1 is reproduced such that a face of an in-vehicle occupant (for example, a driver) is clearly reflected regardless of the daytime or the nighttime, and thus it is possible to efficiently assist the operator OP1 in recognizing the face of the occupant in an early stage. On the other hand, the number plate video in the moving image reproduction screen MVLP1 is reproduced such that a number plate of a vehicle is clearly reflected regardless of the daytime or the nighttime, and thus it is possible to efficiently assist the operator OP1 in recognizing the number plate in an early stage.

As mentioned above, various embodiments have been described with reference to the drawings, but, needless to say, the present disclosure is not limited to the embodiments. It is obvious for a person skilled in the art to conceive of various modifications, alterations, replacements, additions, deletions, and equivalents within the category disclosed in the claims, and it is understood that they are also naturally included in the technical scope of the present disclosure. The respective constituent elements in the various embodiments may be optionally combined with each other within the scope without departing from the spirit of the invention.

In Embodiment 1, a vehicle has been exemplified as a detection target in a video captured by the vehicle imaging camera 10, but a detection target is not limited to a vehicle, and may be other objects (for example, a moving object such as a vehicle). Other objects may be a flying object such as a drone operated by a person such as a suspect having caused a case or the like.

The present disclosure is useful as a vehicle monitoring system and a vehicle monitoring method capable of assisting a police officer in identifying unique features of a runaway vehicle on which a suspect having caused a case or the like is riding in an early stage and visually, and thus improving convenience of police investigation.

The present application is based upon Japanese Patent Application (Patent Application No. 2019-094824 filed on May 20, 2019), the content of which is incorporated herein by reference.

What is claimed is:

1. A vehicle monitoring system comprising:
at least one camera; and
a server that is communicably connected to a client terminal,
wherein the camera
performs capturing video data of a vehicle while sequentially switching between a first capturing condition and a second capturing condition, the first capturing condition including an image parameter for capturing a number provided on the vehicle entering an angle of view of the camera, and the second capturing condition including an image parameter for capturing a face of an occupant in the vehicle, and
transmits, to the server, a first captured video under the first capturing condition and a second captured video under the second capturing condition, and
wherein the server
arranges reproduction screens for the first captured video and the second captured video that are reproduceable in the client terminal, and
displays the reproduction screens on the client terminal based on the first captured video and the second captured video, and
wherein the image parameter in the first capturing condition is an exposure time equal to or less than a first reference value or a gain value equal to or smaller than a second reference value, and
the image parameter in the second capturing condition is an exposure time more than the first reference value or a gain value greater than the second reference value.

2. The vehicle monitoring system according to claim 1, wherein the server arranges the reproduction screens for the first captured video and the second captured video on which a reproduction operation and a temporary stop operation are possible in the client terminal and displays the reproduction screens on the client terminal.

3. The vehicle monitoring system according to claim 1, wherein the server further displays a number analysis result including a cutout number image obtained by cutting out the number based on the first captured video, and a snapshot of the first captured video on the client terminal.

4. The vehicle monitoring system according to claim 1, wherein the camera
includes a sensor that detects a brightness of a surrounding, and an IR lighting unit that irradiates the surrounding with IR light, and switches an operation mode to a daytime mode or a nighttime mode based on a detection result from the sensor, and
during the nighttime mode, applies IR light having an intensity less than a third reference value from the IR lighting unit, and applies IR light having an intensity more than the third reference value from the IR lighting unit.

5. A vehicle monitoring system comprising:

at least one camera; and a server that is communicably connected to a client terminal, wherein the camera performs capturing video data of a vehicle while switching a first capturing condition including an image parameter for capturing a number provided on the vehicle entering an angle of view of the camera, and a second capturing condition including an image parameter for capturing a face of an occupant in the vehicle, and transmits, to the server, a first captured video under the first capturing condition and a second captured video under the second capturing condition, and wherein the server arranges reproduction screens for the first captured video and the second captured video that are reproduceable in the client terminal, and displays the reproduction screens on the client terminal based on the first captured video and the second captured video, wherein, in a case where an instruction for updating the image parameter in the first capturing condition or the second capturing condition is received in response to a user's operation on the client terminal on which a reproduction screen for the first captured video and a reproduction screen for the second captured video are displayed, the server sends the instruction for updating the image parameter to the camera, and wherein the camera updates a corresponding image parameter in response to the instruction for updating the image parameter.

6. The vehicle monitoring system according to claim 1, wherein the server causes the client terminal to reproduce the first captured video and the second captured video generated by the camera at the same time.

7. A vehicle monitoring method performed by a vehicle monitoring system including at least one camera, and a server that is communicably connected to a client terminal, the vehicle monitoring method comprising:

by the camera, performing capturing video data of a vehicle while sequentially switching between a first capturing condition and a second capturing condition, the first capturing condition including an image parameter for capturing a number provided on the vehicle entering an angle of view of the camera, and the second capturing condition including an image parameter for capturing a face of an occupant in the vehicle, and transmit, to the server, a first captured video under the first capturing condition and a second captured video under the second capturing condition; and by the server, arranging reproduction screens for the first captured video and the second captured video that are reproduceable in the client terminal, and displaying the reproduction screens on the client terminal based on the first captured video and the second captured video, wherein the image parameter in the first capturing condition is an exposure time equal to or less than a first reference value or a gain value equal to or smaller than a second reference value, and the image parameter in the second capturing condition is an exposure time more than the first reference value or a gain value greater than the second reference value.

8. The vehicle monitoring system according to claim 1, wherein the camera encodes the video data at a compression ratio according to an exposure time.

* * * * *